US012663359B2

(12) United States Patent
Asada et al.

(10) Patent No.: US 12,663,359 B2
(45) Date of Patent: Jun. 23, 2026

(54) CELL ANALYSIS METHOD AND CELL ANALYZER

(71) Applicant: Sysmex Corporation, Kobe (JP)

(72) Inventors: Shoichiro Asada, Kobe (JP); Konobu Kimura, Kobe (JP); Masamichi Tanaka, Kobe (JP); Kenichiro Suzuki, Kobe (JP); Kohei Nango, Kobe (JP)

(73) Assignee: SYSMEX CORPORATION, Hyogo (JP)

( * ) Notice: Subject to any disclaimer, the term of this patent is extended or adjusted under 35 U.S.C. 154(b) by 51 days.

(21) Appl. No.: 18/185,814

(22) Filed: Mar. 17, 2023

(65) Prior Publication Data

US 2023/0221238 A1     Jul. 13, 2023

Related U.S. Application Data

(63) Continuation of application No. PCT/JP2021/031655, filed on Aug. 30, 2021.

(30) Foreign Application Priority Data

Sep. 18, 2020     (JP) ................................. 2020-157931

(51) Int. Cl.
G01N 15/14        (2024.01)
G01N 15/1433      (2024.01)
(52) U.S. Cl.
CPC ..... G01N 15/1459 (2013.01); G01N 15/1433 (2024.01)
(58) Field of Classification Search
None
See application file for complete search history.

(56) References Cited

U.S. PATENT DOCUMENTS

| | | | | | |
|---|---|---|---|---|---|
| 406,913 | A | * | 7/1889 | Ivers | ........................ G10C 3/12 |
| | | | | | 84/440 |
| 1,594,167 | A | * | 7/1926 | Fuller | ...................... G06C 7/10 |
| | | | | | 235/2 |

(Continued)

FOREIGN PATENT DOCUMENTS

| | | | |
|---|---|---|---|
| CN | 209485938 | U | 10/2019 |
| EA | 013659 | B1 | 6/2010 |

(Continued)

OTHER PUBLICATIONS

Russian Office Action issued on Jul. 11, 2024 in a counterpart Russian patent application No. 2023106378, 10 pages.

(Continued)

*Primary Examiner* — Kara E. Geisel
*Assistant Examiner* — Chad Andrew Reverman
(74) *Attorney, Agent, or Firm* — Crowell & Moring LLP

(57)     ABSTRACT

In a configuration for analyzing data of cells measured by a cell measuring apparatus, accuracy of cell classification is improved without requiring the cell measuring apparatus to have high information processing capability. A cell analysis method, using a cell analyzer for analyzing cells in accordance with an artificial intelligence algorithm, includes: obtaining the data regarding the cells measured by the cell measuring apparatus; analyzing the data to generate information regarding a cell type of each of the cells; and transmitting the information to the cell measuring apparatus.

16 Claims, 37 Drawing Sheets

(56) References Cited

U.S. PATENT DOCUMENTS

| | | | |
|---|---|---|---|
| 1,643,862 A * | 9/1927 | Travnicek | B63H 11/12 |
| | | | 60/39.35 |
| 1,915,125 A * | 6/1933 | Floraday | F21S 9/02 |
| | | | 362/394 |
| 2,268,869 A * | 1/1942 | Given | F16C 33/24 |
| | | | 384/283 |
| 2,297,698 A * | 10/1942 | Freeman | D21H 17/49 |
| | | | 524/46 |
| 2,308,853 A * | 1/1943 | Barnes | B24D 3/28 |
| | | | 51/298 |
| 2,356,128 A * | 8/1944 | Thomas | C08F 210/00 |
| | | | 585/12 |
| 2,396,487 A * | 3/1946 | Blake | C07C 329/00 |
| | | | 558/243 |
| 2,437,795 A * | 3/1948 | Walling | C07F 9/5077 |
| | | | 568/8 |
| 2,441,105 A * | 5/1948 | Socolofsky | B05D 5/062 |
| | | | 106/222 |
| 2,534,309 A * | 12/1950 | Sheffield | C10L 1/1811 |
| | | | 44/322 |
| 2,693,577 A * | 11/1954 | Cluwen | H04B 1/68 |
| | | | 330/109 |
| 2,876,288 A * | 3/1959 | Brooks | H04Q 3/0004 |
| | | | 379/288 |
| 3,258,639 A * | 6/1966 | Birdsall et al. | H01P 9/00 |
| | | | 333/236 |
| 5,891,733 A * | 4/1999 | Inoue | G01N 15/14 |
| | | | 436/63 |
| 7,309,581 B2 * | 12/2007 | Sakai | G01N 1/30 |
| | | | 435/40.5 |
| 2009/0204557 A1 * | 8/2009 | Zhang | G06V 20/698 |
| | | | 702/19 |
| 2009/0276186 A1 | 11/2009 | Salinas et al. | |
| 2010/0228491 A1 * | 9/2010 | Gutierrez | G01N 15/147 |
| | | | 702/19 |
| 2016/0169786 A1 * | 6/2016 | Albitar | G06F 18/24323 |
| | | | 702/19 |
| 2017/0052106 A1 * | 2/2017 | Hennig | G06V 20/698 |
| 2018/0247195 A1 * | 8/2018 | Kumar | G16B 40/10 |
| 2018/0356328 A1 | 12/2018 | Kumura | |
| 2019/0347467 A1 * | 11/2019 | Ohsaka | G06F 18/2431 |
| 2019/0360910 A1 | 11/2019 | Tsuji | |
| 2020/0105376 A1 * | 4/2020 | Lai | G16B 50/30 |
| 2020/0150022 A1 | 5/2020 | Ugawa et al. | |

FOREIGN PATENT DOCUMENTS

| | | | |
|---|---|---|---|
| EP | 1136563 A2 | 9/2001 |
| EP | 3620983 A1 | 3/2020 |
| EP | 3828761 A1 | 6/2021 |
| JP | 07-043307 A | 2/1995 |
| JP | 08-086736 A | 4/1996 |
| JP | H08-506179 A | 7/1996 |
| JP | 2003-512605 A | 4/2003 |
| JP | 2011-515655 A | 5/2011 |
| JP | 2012-519848 A | 8/2012 |
| JP | 2018-505392 A | 2/2018 |
| JP | 6685057 B1 | 4/2020 |
| RU | 2096827 C1 | 11/1997 |
| RU | 2303812 C2 | 7/2007 |
| RU | 2416797 C2 | 4/2011 |
| WO | WO 2001/28700 A1 | 4/2001 |
| WO | 2015/065697 A1 | 5/2015 |
| WO | 2018/203568 A1 | 11/2018 |
| WO | 2019/072181 A1 | 4/2019 |
| WO | 2020/054080 A1 | 3/2020 |

OTHER PUBLICATIONS

Russian Search Report issued on Jul. 11, 2024 in a counterpart Russian patent application No. 2023106378, 4 pages.

International Search Report ("ISR") mailed on Oct. 19, 2021 for PCT/JP2021/031655.

Written Opinion ("WO") mailed on Oct. 19, 2021 for PCT/JP2021/031655.

International Preliminary Report on Patentability (Chapter I of the Patent Cooperation Treaty) ("IPRP") issued on Mar. 21, 2023 for PCT/JP2021/031655.

Extended European search report issued on Jul. 19, 2024 in a counterpart European patent application No. 21869155.8, 11 pages.

International Search Report in International Application No. PCT/JP2021/031651, dated Oct. 12, 2021 (3 pages).

Written Opinion in International Application No. PCT/JP2021/031651, dated Oct. 12, 2021 (3 pages).

International Preliminary Report on Patentability in International Application No. PCT/JP2021/031651, dated Mar. 21, 2023 (4 pages).

Extended European Search Report in Application No. 21869154, dated Jul. 18, 2024 (9 pages).

Office Action in Russian Patent Application No. 2023106372, dated Aug. 27, 2024 (13 pages).

Search Report in Russian Patent Application No. 2023106372, dated Aug. 26, 2024 (4 pages).

Office Action in Russian Patent Application No. 2023106372, dated Apr. 18, 2023 (5 pages).

Naoki Kanayama, "Flow Cytometry "Stay in front of me" line up and count in order", Bioengineering, 2012, pp. 785-789, vol. 90, Issue 12.

Japanese Office Action issued on Feb. 27, 2024 in a counterpart Japanese patent application No. 2020-157931.

Patent Opposition Statement, re U.S. Pat. No. 7,543,048, submitted by Keiko Yamauchi to the Commissioner of the Japan Patent Office, Feb. 28, 2025 (74 pages).

Patent Opposition Statement, re U.S. Pat. No. 7,543,048, filed Feb. 28, 2025, before the Japanese Patent Office (118 pages).

Notice of Reasons for Cancellation Re U.S. Pat. No. 7,543,048, Patent Opposition No. 2025-700247, dated Jun. 17, 2025, before the Japan Patent Office (21 pages).

Japanese Decision on Opposition Issued on Nov. 7, 2025, in a Counterpart Japanese Patent No. 7543048, Patent Opposition No. 2025-700247 (English and Japanese languages) (71 pages).

Written Opinion dated Aug. 7, 2025, in a counterpart Japanese Patent No. 7543048, Patent Opposition No. 2025-700247 (English and Japanese languages) (16 pages).

* cited by examiner

CONVENTIONAL METHOD

FSC     FORWARD SCATTERED
LIGHT INTENSITY

SIDE
SCATTERED
SSC  LIGHT
INTENSITY

SFL     SIDE
FLUORESCENCE
INTENSITY

SIDE FLUORESCENCE

SIDE
SCATTERED
LIGHT

THE PRESENT METHOD

CELL DETERMINATION

NEUT

MONO

LYMPH

ANALYSIS TARGET

FSC

SSC

SFL 50,60

DEEP LEARNING
ALGORITHM

POINT WHERE SIGNAL LEVEL HAS BECOME
NOT LESS THAN PREDETERMINED THRESHOLD

ANALOG SIGNAL

SAMPLING

START
POINT

END
POINT

DIGITAL SIGNAL
(EXAMPLE OF SAMPLING RATE: 1024 POINTS AT 10 NANOSECOND INTERVAL)

FIG. 4

| CELL TYPE | LABEL VALUE |
|---|---|
| NOT APPLICABLE | 0 |
| NEUTROPHIL (NEUT) | 1 |
| LYMPHOCYTE (LYMPH) | 2 |
| MONOCYTE (MONO) | 3 |
| EOSINOPHIL (EO) | 4 |
| BASOPHIL (BASO) | 5 |
| IMMATURE GRANULOCYTE (IG) | 6 |
| ABNORMAL CELL (BLOOD-DERIVED CELL OTHER THAN FIVE CLASSIFICATIONS) | 7 |

Figure 13:
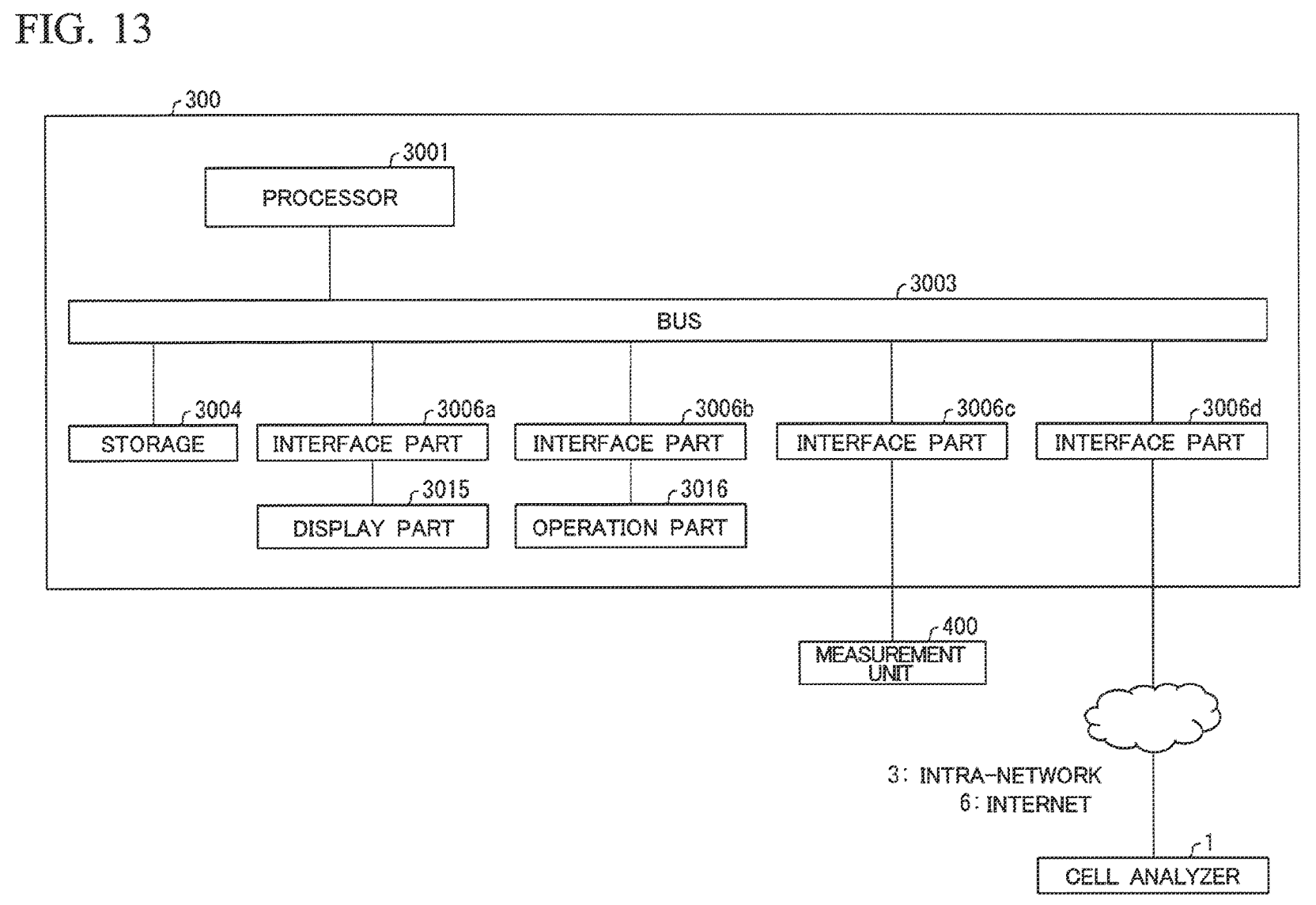

PROCESSOR 3001

BUS 3003

STORAGE 3004

INTERFACE PART 3006a

DISPLAY PART 3015

INTERFACE PART 3006b

OPERATION PART 3016

INTERFACE PART 3006c

MEASUREMENT UNIT 400

INTERFACE PART 3006d

3: INTRA-NETWORK
6: INTERNET

CELL ANALYZER 1

CALCULATION OF PRODUCT OF MATRIX $$c_{ij} = \sum_{k=1}^{n} a_{ik} \times b_{kj}$$

```
for(int i=0; i<n; i++) {
    for(int j=0; j<n; j++) {
        for(int k=0; k<n; k++) {
            c[i][j] += a[i][k]*b[k][j]
        }
    }
}
```

FIG. 21B

CALCULATION PROCESS BY PARALLEL-PROCESSING PROCESSOR

```
for(int k=0; k<n; k++) {
    c[0][0] += a[0][k]*b[k][0]
}
```

```
for(int k=0; k<n; k++) {
    c[1][0] += a[1][k]*b[k][0]
}
```

```
for(int k=0; k<n; k++) {
    c[0][1] += a[0][k]*b[k][1]
}
```

```
for(int k=0; k<n; k++) {
    c[1][1] += a[1][k]*b[k][1]
}
```

FORWARD SCATTERED LIGHT SIGNAL

SIDE SCATTERED LIGHT SIGNAL

FLUORESCENCE SIGNAL

FIG. 33

| REFERENCE METHOD (*) | | | | | | | | |
|---|---|---|---|---|---|---|---|---|
| NEUT | 3450 | 0 | 1 | 0 | 0 | 2 | 0 | 0 |
| LYMPH | 1 | 1852 | 1 | 0 | 0 | 0 | 1 | 0 |
| MONO | 1 | 1 | 195 | 0 | 0 | 1 | 0 | 0 |
| EO | 6 | 0 | 0 | 41 | 0 | 0 | 0 | 0 |
| BASO | 0 | (27) | 0 | 0 | 4 | 0 | 0 | 0 |
| IG | 1 | 0 | 0 | 0 | 0 | 13 | 0 | 0 |
| CONT | 0 | 4 | 2 | 0 | 0 | 0 | 649 | 0 |
| GST | 7 | 1 | 0 | 0 | (19) | 0 | 0 | 0 |
| | NEUT | LYMPH | MONO | EO | BASO | IG | CONT | GST |

DEEP LEARNING

| TARGET CELL | NUMBER OF CELLS |
|---|---|
| NEUT | 3453 |
| LYMPH | 1855 |
| MONO | 198 |
| EO | 47 |
| BASO | 31 |
| IG | 14 |
| CONTROL BLOOD CELL | 655 |

FIG. 39

| CELL TYPE | LABEL VALUE | CELL TYPE | FEATURE | | LABEL VALUE |
|---|---|---|---|---|---|
| NOT APPLICABLE | 0 | BLAST | MORPHOLOGICAL DYSKARYOSIS | PRESENT | 21 |
| SEGMENTED NEUTROPHIL | 1 | | | ABSENT | 22 |
| BAND NEUTROPHIL | 2 | | VACUOLATION | PRESENT | 23 |
| METAMYELOCYTE | 3 | | | ABSENT | 24 |
| MYELOCYTE | 4 | | GRANULAR | PRESENT | 25 |
| PROMYELOCYTE | 5 | | | ABSENT | 26 |
| BLAST | 6 | BAND NEUTROPHIL | GIANT | PRESENT | 27 |
| LYMPHOCYTE | 7 | | | ABSENT | 28 |
| PLASMA CELL | 8 | | NUCLEUS MORPHOLOGY ABNORMALITY (INCLUDING SPHERICAL/ELLIPTICAL NUCLEUS) | PRESENT | 29 |
| ATYPICAL LYMPHOCYTE | 9 | | | ABSENT | 30 |
| MONOCYTE | 10 | | GRANULE DISTRIBUTION ABNORMALITY (INCLUDING "AGRANULAR") | PRESENT | 31 |
| EOSINOPHIL | 11 | | | ABSENT | 32 |
| BASOPHIL | 12 | SEGMENTED NEUTROPHIL | GIANT | PRESENT | 33 |
| ERYTHROBLAST | 13 | | | ABSENT | 34 |
| MEGA-THROMBOCYTE | 14 | | NUCLEUS MORPHOLOGY ABNORMALITY (INCLUDING RING-SHAPED NUCLEUS) | PRESENT | 35 |
| PLATELET AGGREGATE | 15 | | | ABSENT | 36 |
| MEGAKARYOCYTE | 16 | | PSEUDO-PELGER (HYPOSEGMENTED NUCLEUS) | PRESENT | 37 |
| smudge | 17 | | | ABSENT | 38 |
| Artifact | 18 | | HYPERSEGMENTATION | PRESENT | 39 |
| | | | | ABSENT | 40 |
| | | | GRANULE DISTRIBUTION ABNORMALITY (INCLUDING "AGRANULAR") | PRESENT | 41 |
| | | | | ABSENT | 42 |
| | | ERYTHRO-BLAST | GIANT | PRESENT | 43 |
| | | | | ABSENT | 44 |
| | | MEGA-KARYOCYTE | BARE NUCLEUS | PRESENT | 45 |
| | | | | ABSENT | 46 |

FIG. 41

| CELL TYPE | NUMBER OF CELLS |
|---|---|
| NEUTROPHIL (NEUT) | 3500 |
| LYMPHOCYTE (LYMPH) | 1800 |
| MONOCYTE (MONO) | 200 |
| EOSINOPHIL (EO) | 50 |
| BASOPHIL (BASO) | 30 |
| IMMATURE GRANULOCYTE (IG) | 15 |
| ABNORMAL CELL | 10  ! |

CELL ANALYSIS METHOD AND CELL ANALYZER

RELATED APPLICATIONS

This application is a continuation of International Application PCT/JP2021/031655 filed on Aug. 30, 2021, which claims priority to Japanese patent application JP 2020-157931 filed on Sep. 18, 2020, both of which are incorporated herein by reference in their entireties.

BACKGROUND OF THE INVENTION

1. Field of the Invention

The present invention relates to a cell analysis method and a cell analyzer.

2. Description of the Related Art

Japanese Laid-open Patent Publication No. 2012-519848 (translation of PCT International Application) describes a method in which data obtained by measuring blood cells by a flow cytometer is analyzed in a data processing system having installed therein a processor, and the cells are classified according to type.

In an apparatus described in Japanese Laid-open Patent Publication No. 2012-519848 (translation of PCT International Application), cells are classified by using an algorithm set in a data processing system. In the existing algorithm, cells are classified based on limited parameters obtained from the cells. Therefore, the system is not required to have high information processing capability, but there is a limit on accuracy of classification.

SUMMARY OF THE INVENTION

In order to solve the above problem, a cell analysis method according to an aspect of the present invention, using a cell analyzer (1) for analyzing cells in accordance with an artificial intelligence algorithm (50, 60), includes: obtaining data regarding cells measured by a cell measuring apparatus (4000, 4000', 4000", 4000"'); analyzing the data to generate information regarding a cell type of each of the cells; and transmitting the information to the cell measuring apparatus (4000, 4000', 4000", 4000"').

In order to solve the above problem, a cell analyzer (1) according to an aspect of the present invention is a cell analyzer (1) for analyzing cells in accordance with an artificial intelligence algorithm (50, 60), and the cell analyzer (1) includes a processing part (10). The processing part (10) is configured to: obtain data regarding cells measured by a cell measuring apparatus (4000, 4000', 4000", 4000"'); analyze the data to generate information regarding a cell type of each of the cells; and transmit the information to the cell measuring apparatus (4000, 4000', 4000", 4000"').

In order to solve the above problem, a cell analysis method according to another aspect of the present invention includes: measuring cells by a cell measuring apparatus (4000, 4000', 4000", 4000"') to obtain data of the cells; transmitting the data to a cell analyzer (1) that analyzes cells in accordance with an artificial intelligence algorithm (50, 60); and obtaining information regarding a cell type of each of the cells, the information having been obtained by the cell analyzer (1) analyzing the data in accordance with the artificial intelligence algorithm (50, 60).

In order to solve the above problem, a cell analysis method according to another aspect of the present invention is an analysis method of analyzing cells included in a specimen by a cell analyzer (1). The method includes: obtaining, from a plurality of cell measuring apparatuses (4000, 4000', 4000", 4000"'), data regarding cells in association with identification information; analyzing the data in parallel processing by a parallel-processing processor (12); and, based on a result of the parallel processing, generating information regarding a cell type with respect to each of a plurality of cells, in association with the identification information.

BRIEF DESCRIPTION OF THE DRAWINGS

FIG. 4 shows an example of a label value;

FIG. 6 shows a configuration example of a system including a cell analyzer;

FIG. 7 shows another configuration example of the system including the cell analyzer;

FIG. 8 shows another configuration example of the system including the cell analyzer;

FIG. 13 shows a configuration example of a processing unit;

FIG. 20 shows an outline of operation in which a processor executes arithmetic processes of matrix data by using the parallel-processing processor;

FIG. 21A shows a calculation formula of the product of a matrix;

FIG. 21B shows an example of arithmetic processes executed in parallel in the parallel-processing processor;

FIG. 33 shows a mix matrix of a determination result according to a reference method and a determination result using the deep learning algorithm;

FIG. 39 shows an example of a label value;

FIG. 41 shows an embodiment of an analysis result.

DETAILED DESCRIPTION OF THE PREFERRED EMBODIMENTS

Figure 1A:
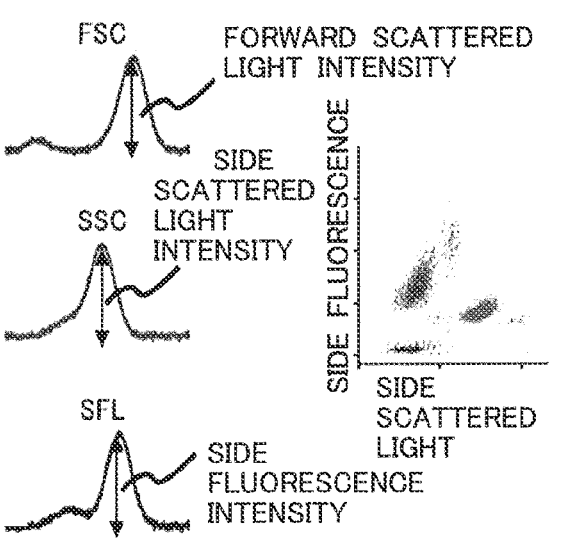
FIG. 1A shows an example of white blood cell classification according to a conventional method.

Hereinafter, outlines and embodiments of the present invention will be described in detail with reference to the attached drawings. In the following description and drawings, the same reference characters denote the same or similar components, and thus, description of the same or similar components is omitted.

1. Cell Analysis Method

The present embodiment relates to a cell analysis method, in a cell analyzer for analyzing cells in accordance with an artificial intelligence algorithm, including: obtaining data regarding cells measured by a cell measuring apparatus; analyzing the data to generate information regarding a cell type of each of the cells; and transmitting the information to the cell measuring apparatus.

According to the analysis method, analysis of data measured by the cell measuring apparatus is performed not by the cell measuring apparatus but by the cell analyzer. The cell analyzer analyzes data regarding cells in accordance with the artificial intelligence algorithm to generate information regarding a cell type of each cell, and the generated information is returned to the cell measuring apparatus. Therefore, according to the analysis method, the cell measuring apparatus need not be provided with a processor having high information processing capability for highly accurate cell classification based on the artificial intelligence algorithm. Therefore, the analysis method is applicable to analyzers in a wide range from an expensive analyzer having high processing capability to an inexpensive analyzer having low processing capability. Moreover, when the cell analyzer is connected to a plurality of cell measuring apparatuses, labor and cost required for update and operation of the artificial intelligence algorithm can be reduced, compared with the case where the artificial intelligence algorithm is updated and operated in each cell measuring apparatus. For example, since update of the artificial intelligence algorithm can be performed by the cell analyzer, labor and cost for the update can be reduced.

Figure 1B:
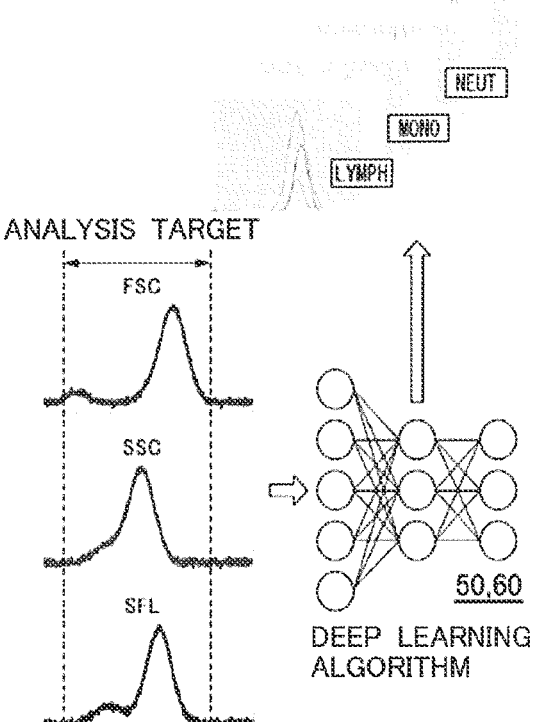
FIG. 1B shows an example of white blood cell classification according to the present method.

An example of an outline of the present embodiment will be described with reference to FIG. 1. FIG. 1A is a diagram schematically showing white blood cell classification according to a conventional method, and FIG. 1B is a diagram schematically showing white blood cell classification according to the present method. In FIG. 1A and FIG. 1B, FSC represents an analog signal indicating the signal intensity of forward scattered light, SSC represents an analog signal indicating the signal intensity of side scattered light, and SFL represents an analog signal indicating the signal intensity of side fluorescence. As shown in FIG. 1A, in the conventional method, each individual cell contained in a specimen is measured by a flow cytometer, and the peak heights of the pulses of the analog signals of the respective forward scattered light, side scattered light, and side fluorescence are obtained as a forward scattered light intensity, a side scattered light intensity, and a side fluorescence intensity. Next, on the basis of the forward scattered light intensity, the side scattered light intensity, and the side fluorescence intensity, each cell is classified into a specific type. The result of the classifications of the cells is displayed as a scattergram as shown in FIG. 1A. In the scattergram in FIG. 1A, the horizontal axis represents the intensity of the side scattered light and the vertical axis represents the intensity of the side fluorescence.

As shown in FIG. 1A, in the conventional white blood cell classification, the type of each blood cell is determined on the basis of only the information of the peak height of an analog waveform. In contrast to this, in the method according to the present embodiment, as data regarding cells in a specimen, as shown in FIG. 1B, the entirety of the waveform of an analog signal obtained from a single cell by a flow cytometer is analyzed as analysis target data, whereby the cell is classified. In FIG. 1B, a waveform obtained by drawing an analog signal obtained by a flow cytometer is shown. However, as described later, data regarding a cell in a specimen in the present embodiment means digital data (waveform data described later) which uses, as elements, the values indicating the signal intensity at a plurality of time points obtained by performing A/D conversion on this analog signal. This digital data group is matrix data, and in the present embodiment, is matrix data (i.e., one-dimensional array data) composed of one row×a plurality of columns, for example.

In the present embodiment, a deep learning algorithm 50 before being trained shown in FIG. 1B is caused to learn waveform data for each cell type. Then, waveform data of each cell of which the cell type is unknown and that is contained in the specimen is inputted to a trained deep learning algorithm 60, whereby a determination result of the cell type with respect to each cell is derived from the deep learning algorithm 60. The deep learning algorithm 50, 60 is one of artificial intelligence algorithms, and configured as a neural network that includes a middle layer composed of multiple layers. In the present embodiment, when processing regarding analysis of waveform data is to be executed according to the trained deep learning algorithm 60, a large number of matrix operations included in the deep learning algorithm 60 is executed by parallel processing, by using a parallel-processing processor installed in the cell analyzer. The cell analyzer includes: a parallel-processing processor capable of executing parallel processing; and an execution instruction processor (hereinafter, simply referred to as "processor") that causes the parallel-processing processor to execute parallel processing.

Hereinafter, each individual cell in a biological sample subject to analysis for the purpose of determining the cell type thereof will also be referred to as an "analysis target cell". In other words, a biological sample can contain a plurality of analysis target cells. A plurality of cells can include cells of a plurality of types to be analyzed.

An example of a biological sample is a biological sample collected from a subject. For example, the biological sample can include peripheral blood such as venous blood and arterial blood, urine, and a body fluid other than blood and urine. Examples of the body fluid other than blood and urine can include bone marrow aspirate, ascites, pleural effusion, cerebrospinal fluid, and the like. Hereinafter, the body fluid other than blood and urine may be simply referred to as a "body fluid". The blood sample may be any blood sample that is in a state where the number of cells can be counted and the cell types can be determined. Preferably, blood is peripheral blood. Examples of blood include peripheral blood collected using an anticoagulant agent such as ethylenediamine tetraacetate (sodium salt or potassium salt), heparin sodium, or the like. Peripheral blood may be collected from an artery or may be collected from a vein.

The cell types to be determined in the present embodiment are those according to the cell types based on morphological classification, and are different depending on the kind of the biological sample. When the biological sample is blood and the blood is collected from a healthy individual, the cell types to be determined in the present embodiment include, for example, red blood cell, nucleated cell such as white blood cell, platelet, and the like. Nucleated cells include, for example, neutrophils, lymphocytes, monocytes, eosinophils, and basophils. Neutrophils include, for example, segmented neutrophils and band neutrophils. Meanwhile, when blood is collected from an unhealthy individual, nucleated cells may include, for example, at least one type selected from the group consisting of immature granulocyte and abnormal cell. Such cells are also included in the cell types to be determined in the present embodiment. Immature granulocytes can include, for example, cells such as metamyelocytes, myelocytes, promyelocytes, and myeloblasts.

The nucleated cells may include, in addition to normal cells, abnormal cells that are not contained in peripheral blood of a healthy individual. Examples of abnormal cells are cells that appear when a person has a certain disease, and such abnormal cells are tumor cells, for example. In a case of the hematopoietic system, the certain disease can be a disease selected from the group consisting of, for example: myelodysplastic syndrome; leukemia such as acute myeloblastic leukemia, acute promyelocytic leukemia, acute myelomonocytic leukemia, acute monocytic leukemia, erythroleukemia, acute megakaryoblastic leukemia, acute myeloid leukemia, acute lymphocytic leukemia, lymphoblastic leukemia, chronic myelogenous leukemia, or chronic lymphocytic leukemia; malignant lymphoma such as Hodgkin's lymphoma or non-Hodgkin's lymphoma; and multiple myeloma.

Further, abnormal cells can include, for example, cells that are not usually observed in peripheral blood of a healthy individual, such as: lymphoblasts; plasma cells; atypical lymphocytes; reactive lymphocytes; erythroblasts, which are nucleated erythrocytes, such as proerythroblasts, basophilic erythroblasts, polychromatic erythroblasts, orthochromatic erythroblasts, promegaloblasts, basophilic megaloblasts, polychromatic megaloblasts, and orthochromatic megaloblasts; megakaryocytes including micromegakaryocytes; and the like.

When the biological sample is urine, the cell types to be determined in the present embodiment can include, for example, red blood cell, white blood cell, epithelial cell such as that of transitional epithelium, squamous epithelium, and the like. Examples of abnormal cells include, for example, bacteria, fungi such as filamentous fungi and yeast, tumor cells, and the like.

When the biological sample is a body fluid that usually does not contain blood components, such as ascites, pleural effusion, or spinal fluid, the cell types can include, for example, red blood cell, white blood cell, and large cell. The "large cell" here means a cell that is separated from an inner membrane of a body cavity or a peritoneum of a viscus, and that is larger than white blood cells. For example, mesothelial cells, histiocytes, tumor cells, and the like correspond to the "large cell".

When the biological sample is bone marrow aspirate, the cell types to be determined in the present embodiment can include, as normal cells, mature blood cells and immature hematopoietic cells. Mature blood cells include, for example, red blood cells, nucleated cells such as white blood cells, platelets, and the like. Nucleated cells such as white blood cells include, for example, neutrophils, lymphocytes, plasma cells, monocytes, eosinophils, and basophils. Neutrophils include, for example, segmented neutrophils and band neutrophils. Immature hematopoietic cells include, for example, hematopoietic stem cells, immature granulocytic cells, immature lymphoid cells, immature monocytic cells, immature erythroid cells, megakaryocytic cells, mesenchymal cells, and the like. Immature granulocytes can include cells such as, for example, metamyelocytes, myelocytes, promyelocytes, myeloblasts, and the like. Immature lymphoid cells include, for example, lymphoblasts and the like. Immature monocytic cells include monoblasts and the like. Immature erythroid cells include, for example, nucleated erythrocytes such as proerythroblasts, basophilic erythroblasts, polychromatic erythroblasts, orthochromatic erythroblasts, promegaloblasts, basophilic megaloblasts, polychromatic megaloblasts, and orthochromatic megaloblasts. Megakaryocytic cells include, for example, megakaryoblasts and the like.

Examples of abnormal cells that can be included in bone marrow include, for example, hematopoietic tumor cells of a disease selected from the group consisting of: myelodysplastic syndrome; leukemia such as acute myeloblastic leukemia, acute promyelocytic leukemia, acute myelomonocytic leukemia, acute monocytic leukemia, erythroleukemia, acute megakaryoblastic leukemia, acute myeloid leukemia, acute lymphocytic leukemia, lymphoblastic leukemia, chronic myelogenous leukemia, or chronic lymphocytic leukemia; malignant lymphoma such as Hodgkin's lymphoma or non-Hodgkin's lymphoma; and multiple myeloma, which have been described above, and metastasized tumor cells of a malignant tumor developed in an organ other than bone marrow.

FIG. 1 shows an example of using, as the signal obtained from each cell, a forward scattered light signal, a side scattered light signal, and a side fluorescence signal, which are optical signals obtained by applying light to the cell flowing in a flow cell. However, the signal is not limited in particular as long as the signal indicates a feature of each cell and allows classification of cells for each type.

The signal obtained from each cell may be any of a signal indicating a morphological feature of the cell, a signal indicating a chemical feature thereof, a signal indicating a physical feature thereof, and a signal indicating a genetic feature thereof, but, preferably, is a signal indicating a morphological feature of the cell. The signal indicating a morphological feature of the cell is, preferably, an optical signal obtained from the cell.

Preferably, the optical signal is a light signal obtained as an optical response as a result of application of light to the cell. The light signal can include at least one type selected from a signal based on light scattering, a signal based on light absorption, a signal based on transmitted light, and a signal based on fluorescence.

The signal based on light scattering can include a scattered light signal caused by light application and a light loss signal caused by light application. The scattered light signal serves as a parameter that indicates a feature of a cell and that is different in accordance with the light reception angle of scattered light with respect to the advancing direction of application light. The forward scattered light signal is used as a parameter that indicates the size of the cell. The side scattered light signal is used as a parameter that indicates complexity of the nucleus of the cell.

"Forward" of the forward scattered light means the advancing direction of light emitted from a light source. When the angle of application light is defined as 0 degrees, "forward" can include a forward low angle at which the light reception angle is about 0 to 5 degrees, and/or a forward high angle at which the light reception angle is about 5 to 20 degrees. "Side" is not limited as long as the "side" does not overlap "forward". When the angle of application light is defined as 0 degrees, "side" can include a light reception angle being about 25 degrees to 155 degrees, preferably about 45 degrees to 135 degrees, and more preferably about 90 degrees.

The signal based on light scattering may include polarized light or depolarized light as a component of the signal. For example, scattered light caused by application of light to a cell is received through a polarizing plate, whereby only scattered light polarized at a specific angle can be received. Meanwhile, when light is applied to a cell through a polarizing plate, and the resultant scattered light is received through a polarizing plate that allows passage therethrough of only polarized light having an angle different from that of the polarizing plate for light application, only depolarized scattered light can be received.

A light loss signal indicates the loss amount of received light based on decrease, of the received light amount at a light receiving part, which is caused by application of light to a cell and scattering of the light. Preferably, the light loss signal is obtained as a light loss (axial light loss) in the optical axis direction of the application light. The light loss signal can be expressed as a proportion of the received light amount at the time of flowing of a cell in the flow cell, when the received light amount at the light receiving part in a state where the cell is not flowing in the flow cell is defined a 100%. Similar to the forward scattered light signal, the axial light loss is used as a parameter that indicates the size of the cell, but the signal that is obtained differs depending on whether the cell has translucency or not.

The signal based on fluorescence may be fluorescence that is excited as a result of application of light to a cell labeled with a fluorescent substance, or may be an intrinsic fluorescence that occurs from a non-stained cell. The fluorescent substance may be a fluorescent dye that binds to nucleic acid or membrane protein, or may be a labeled antibody obtained by modifying, with a fluorescent dye, an antibody that binds to a specific protein of a cell.

The optical signal may be obtained in a form of image data obtained by applying light to a cell and capturing an image of the cell to which the light has been applied. The image data can be obtained by capturing, with an imaging element such as a TDI camera or a CCD camera, an image of each individual cell flowing in a flow path, by use of a so-called imaging flow cytometer. Alternatively, a specimen or a measurement sample containing cells is applied, sprayed, or spot-applied on a slide glass, and an image of the slide glass is captured by an imaging element, whereby image data of cells may be obtained.

The signal obtained from a cell is not limited to an optical signal, and may be an electrical signal obtained from the cell. As for the electrical signal, for example, DC current is applied to the flow cell, and change in impedance caused by a cell flowing in the flow cell may be used as the electrical signal. The thus obtained electrical signal serves as a parameter that reflects the volume of the cell. Alternatively, as for the electrical signal, change in impedance at the time of application of a radio frequency to a cell flowing in the flow cell may be used as the electrical signal. The thus obtained electrical signal serves as a parameter that reflects the electric conductivity of the cell.

The signal obtained from a cell may be a combination of a plurality of kinds of signals (at least two kinds of signals) out of the above-described signals obtained from a cell. Through combination of a plurality of signals, the features of a cell can be pleiotropically analyzed, and thus, cell classification with a higher accuracy is enabled. As for the combination, for example, at least two out of a plurality of optical signals, e.g., a forward scattered light signal, a side scattered light signal, and a fluorescence signal, may be combined. Alternatively, scattered light signals having different angles, e.g., a low angle scattered light signal and a high angle scattered light signal, may be combined. Still alternatively, an optical signal and an electrical signal may be combined. The kind and number of signals to be combined are not limited in particular.

<Outline of Cell Analysis Method>

Next, with reference to examples shown in FIG. 2, and FIG. 3 to FIG. 5, a generation method for training data 75 and an analysis method for waveform data will be described.

<Waveform Data>

Figure 2A:
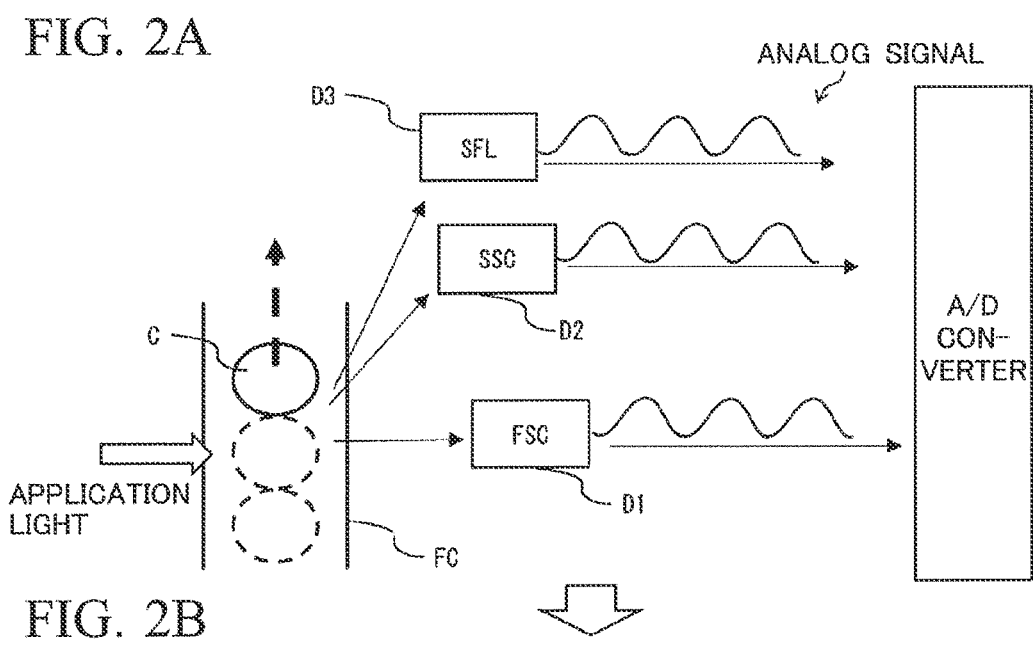
FIG. 2A shows an example of applying light to a cell flowing in a flow cell.

FIG. 2 is a schematic diagram for describing waveform data to be used in the present analysis method. As shown in FIG. 2A, when a specimen containing a cell C is caused to flow in a flow cell FC, and light is applied to the cell C flowing in the flow cell FC, forward scattered light FSC is generated in a forward direction with respect to the advancing direction of light. Similarly, side scattered light SSC and side fluorescence SFL are generated to a side direction with respect to the advancing direction of light. The forward scattered light is received by a first light receiving part D1, and a signal corresponding to the received light amount is outputted. The side scattered light is received by a second light receiving part D2, and a signal corresponding to the received light amount is outputted. The side fluorescence is received by a third light receiving part D3, and a signal corresponding to the received light amount is outputted. Accordingly, an analog signal representing change in the signal associated with a lapse of time is outputted from each of the light receiving parts D1 to D3. An analog signal corresponding to the forward scattered light will be referred to as a "forward scattered light signal", an analog signal corresponding to the side scattered light will be referred to as a "side scattered light signal", and an analog signal corresponding to the side fluorescence will be referred to as a "fluorescence signal". One pulse of each analog signal corresponds to one cell.

Figure 2B:
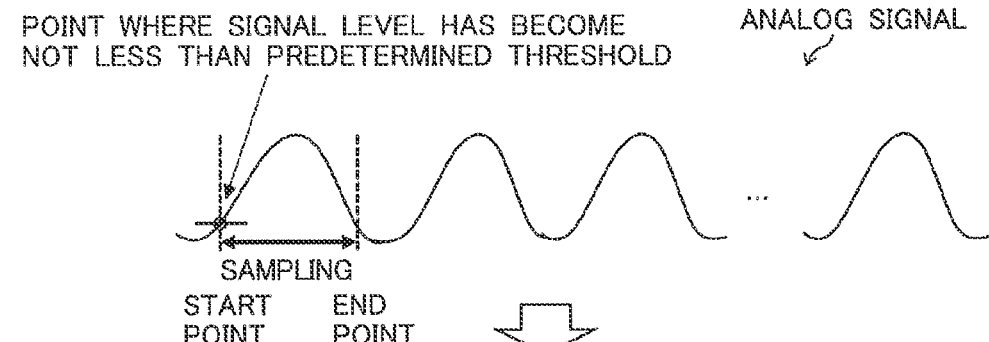
FIG. 2B shows an example of performing sampling of a forward scattered light signal, a side scattered light signal, and a fluorescence signal.

The analog signals are inputted to an A/D converter, to be converted to digital signals. FIG. 2B schematically shows conversion to a digital signal performed by the A/D converter. Here, in order to simplify description, the analog signal is depicted to be directly inputted to the A/D converter. The analog signal may be directly converted, without changing the level thereof, to a digital signal. However, processing such as noise removal, baseline correction, and normalization may be performed as necessary. As shown in FIG. 2B, from a start point, which is the time point when the level of the forward scattered light signal, among the analog signals inputted from the light receiving parts D1 to D3, has reached a level set as a predetermined threshold, the A/D converter samples the forward scattered light signal, the side scattered light signal, and the fluorescence signal. The A/D converter samples the respective analog signals at a predetermined sampling rate (e.g., sampling at 1024 points at a 10 nanosecond interval, sampling at 128 points at an 80 nanosecond interval, sampling at 64 points at a 160 nanosecond interval, or the like).

Figure 2C:
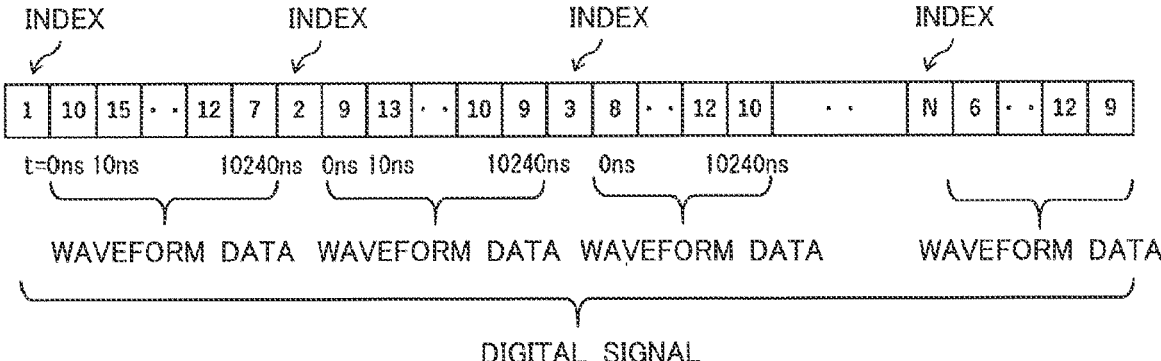
FIG. 2C shows an example of waveform data obtained by sampling.

FIG. 2C schematically shows waveform data obtained through sampling. Through the sampling, as waveform data corresponding to one cell, matrix data that has, as elements, values digitally indicating the analog signal level at a plurality of time points is obtained. In this manner, the A/D converter generates a digital signal of forward scattered light, a digital signal of side scattered light, and a digital signal of side fluorescence that correspond to one cell. The A/D conversion is repeated until the number of cells in the digital signal reaches a predetermined number, or until a predetermined time period has elapsed from the start of causing the specimen to flow in the flow cell. Accordingly, as shown in FIG. 2C, a digital signal obtained by combining waveform data of N cells contained in one specimen is obtained. A set of sampling data of each cell (in the example in FIG. 1A, the set of 1024 digital values obtained every 10 nanoseconds from t=0 ns to t=10240 ns) will be referred to as waveform data, and the set of waveform data obtained from one specimen will be referred to as a digital signal.

Each piece of waveform data generated by the A/D converter may be provided with an index for identifying the corresponding cell. As the indexes, for example, integers of 1 to N are provided in the sequential order of the generated pieces of waveform data, and the waveform data of forward scattered light, the waveform data of side scattered light, and the waveform data of side fluorescence that have been obtained from the same cell are each provided with the same index.

Since one piece of waveform data corresponds to one cell, the index corresponds to the cell that has been measured.

Since an identical index is provided to the pieces of the waveform data that correspond to the same cell, a deep learning algorithm described later can analyze, as one set, the waveform data of forward scattered light, the waveform data of side scattered light, and the waveform data of fluorescence that correspond to an individual cell, and can classify the type of the cell.

<Generation of Training Data>

Figure 3:
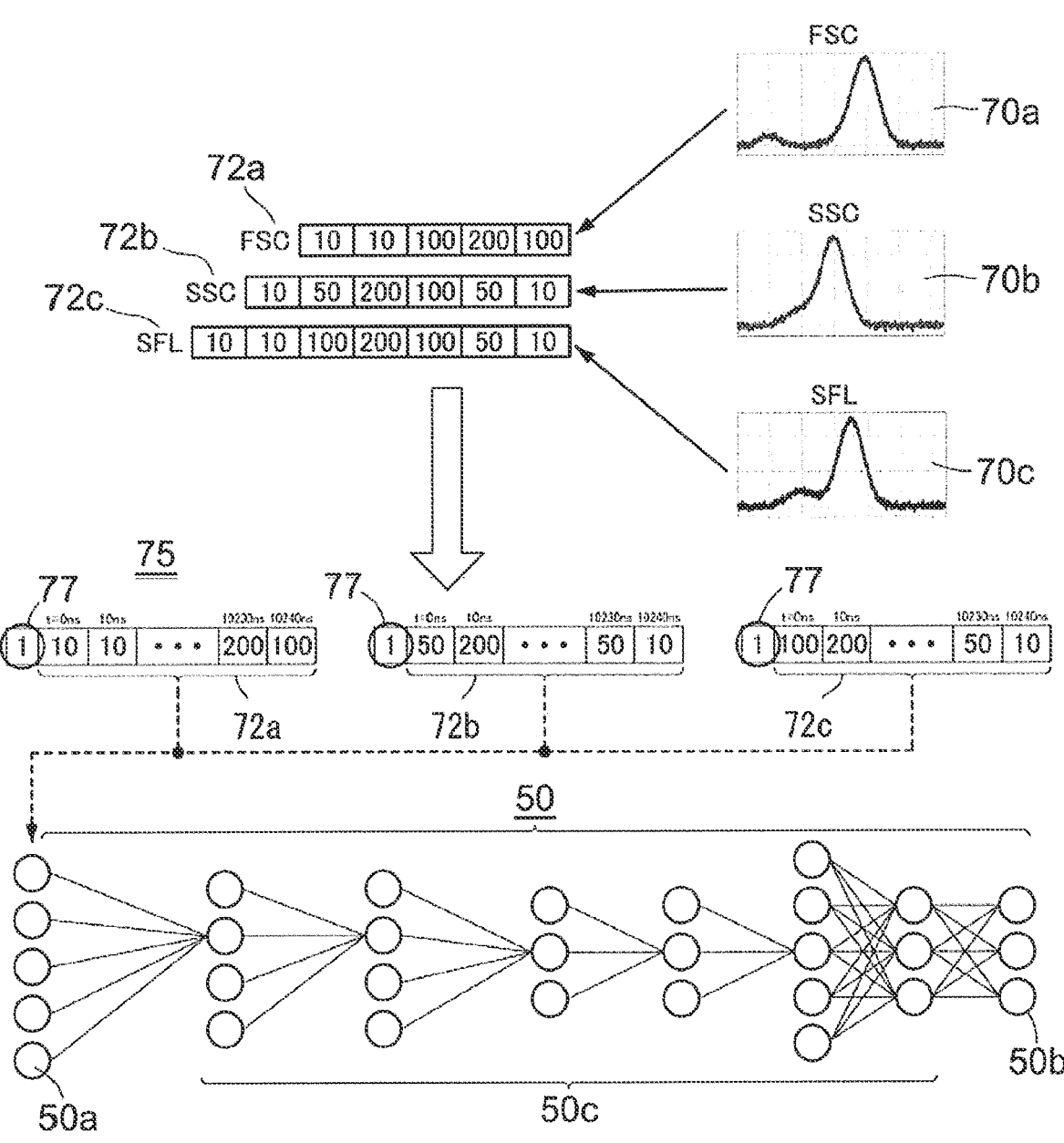
FIG. 3 shows an example of a generation method for training data.

FIG. 3 is a schematic diagram showing an example of a generation method for training data to be used for training a deep learning algorithm for determining the type of a cell. The training data 75 is waveform data generated on the basis of an analog signal 70a of forward scattered light (FSC), an analog signal 70b of side scattered light (SSC) and an analog signal 70c of side fluorescence (SFL) which have been obtained with respect to a cell contained in a specimen through measurement of the specimen performed by a flow cytometer. The method for obtaining the waveform data has been described above.

As for the training data 75, for example, a specimen is measured by a flow cytometer, and waveform data of a cell determined, as a result of analyzing cells contained in the specimen on the basis of a scattergram according to a conventional method, to have a high possibility of being a specific cell type can be used. An example using a blood cell counter will be described. First, a blood specimen is measured by a flow cytometer, and waveform data of forward scattered light, side scattered light, and fluorescence of each individual cell contained in the specimen is accumulated. On the basis of the side scattered light intensity (the height of the pulse of the side scattered light signal) and the fluorescence intensity (the height of the pulse of the fluorescence signal), each cell is classified into a group of neutrophil, lymphocyte, monocyte, eosinophil, basophil, immature granulocyte, or abnormal cell. A label value corresponding to the classified cell type is provided to the waveform data of the cell, whereby training data is obtained. For example, the mode, the average value, or the median of the side scattered light intensity and the side fluorescence intensity of cells included in the neutrophil group is obtained, representative cells are identified on the basis of the value, and a label value "1" corresponding to neutrophil is provided to the waveform data of these cells, whereby training data can be obtained. The generation method for the training data is not limited thereto. For example, only specific cells are recovered by a cell sorter, each cell is measured by a flow cytometer, and a label value for the cell is provided to the obtained waveform data, whereby training data may be obtained.

The analog signals 70a, 70b, 70c respectively represent a forward scattered light signal, a side scattered light signal, and a side fluorescence signal at the time when a neutrophil has been measured by a flow cytometer. When these analog signals are subjected to A/D conversion as described above, waveform data 72a of the forward scattered light signal, waveform data 72b of the side scattered light signal, and waveform data 72c of the side fluorescence signal are obtained. Cells adjacent each other in each of the waveform data 72a, 72b, 72c each store a signal level at an interval corresponding to the sampling rate, e.g., a 10 nanosecond interval. The pieces of the waveform data 72a, 72b, 72c are each combined with a label value 77 indicating the type of the cell being the source of the data, and the three pieces of waveform data corresponding to the cell, in other words, the data of the three signal intensities (the signal intensity of forward scattered light, the signal intensity of side scattered light, and the signal intensity of side fluorescence), are inputted, so as to form a set, as the training data 75 to the deep learning algorithm 50. In the example in FIG. 3, since the cell being the source of the training data is a neutrophil, "1" is provided as the label value 77 indicating that the cell is a neutrophil, to the waveform data 72$a$, 72$b$, 72$c$, whereby the training data 75 is generated. FIG. 4 shows an example of the label value 77. Since the training data 75 is generated for each cell type, as for the label value, a label value 77 different in accordance with the cell type is provided.

<Outline of Deep Learning>

Using FIG. 3 as an example, an outline of training of a neural network will be described. Preferably, a neural network 50 is a convolutional neural network having a convolution layer. The number of nodes of an input layer 50$a$ in the neural network 50 corresponds to the number of elements of the array included in the waveform data of the training data 75 to be inputted. The number of elements of the array is equal to the sum of the number of elements of the waveform data 72$a$, 72$b$, 72$c$ of forward scattered light, side scattered light, and side fluorescence which correspond to one cell. In the example in FIG. 3, each of the waveform data 72$a$, 72$b$, 72$c$ includes 1024 elements, and thus, the number of nodes of the input layer 50$a$ is 1024×3=3072. The waveform data 72$a$, 72$b$, 72$c$ is inputted to the input layer 50$a$ of the neural network 50. The label value 77 of each piece of the waveform data of the training data 75 is inputted to an output layer 50$b$ of the neural network, whereby the neural network 50 is trained. A reference character 50$c$ in FIG. 3 represents the middle layer.

<Analysis Method for Waveform Data>

Figure 5:
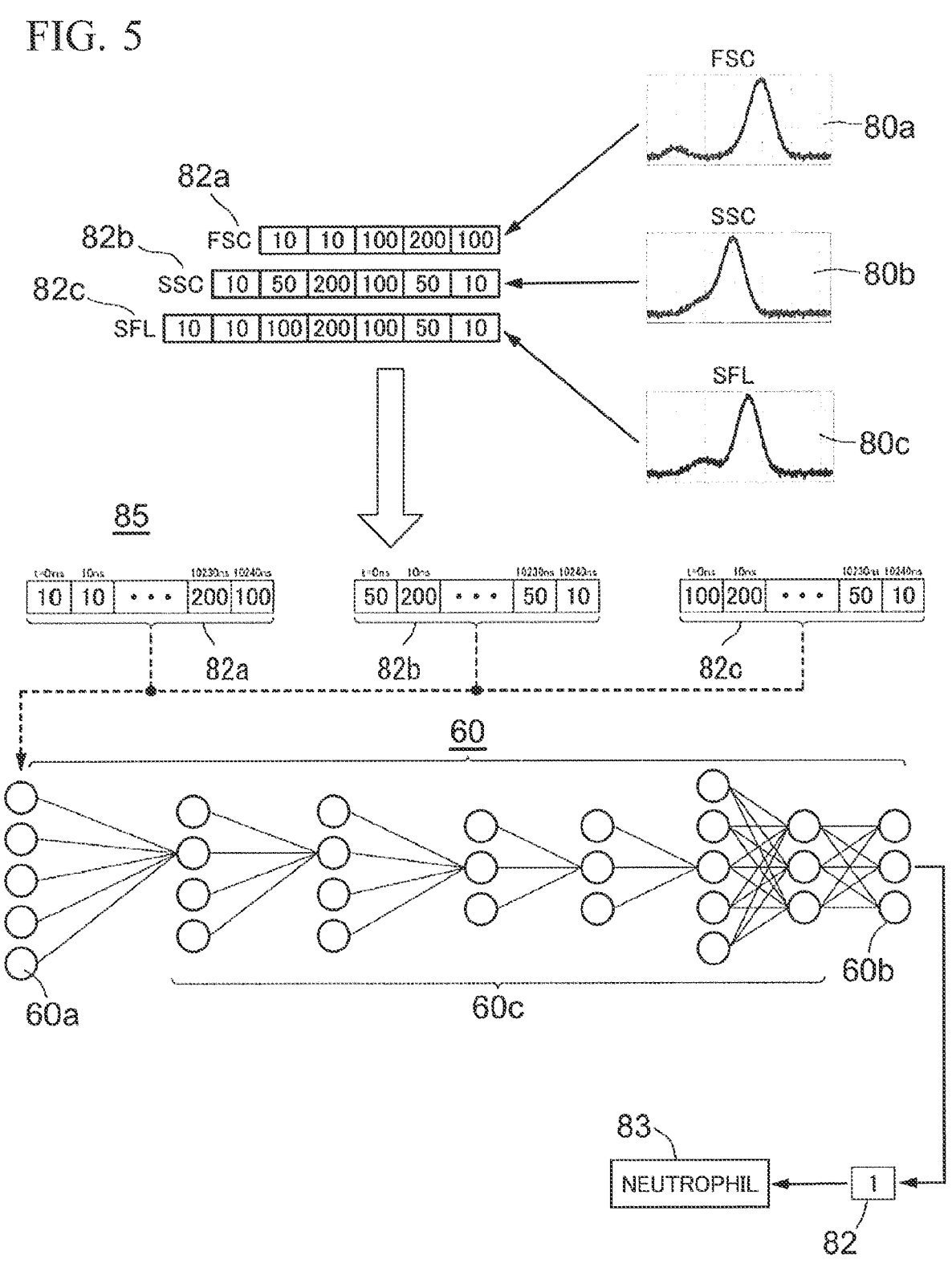
FIG. 5 shows an example of an analysis method for analysis data.

FIG. 5 shows an example of a method for analyzing waveform data of a cell being an analysis target. In the analysis method for the waveform data, from an analog signal 80$a$ of forward scattered light, an analog signal 80$b$ of side scattered light, and an analog signal 80$c$ of side fluorescence obtained from an analysis target cell by a flow cytometer, analysis data 85 composed of waveform data obtained by the above-described method is generated.

Preferably, the analysis data 85 and the training data 75 have the same obtaining condition at least. The obtaining condition includes conditions for measuring cells contained in a specimen by a flow cytometer, e.g., a preparation condition for a measurement sample, the flow speed at which the measurement sample is caused to flow in a flow cell, the intensity of light to be applied to the flow cell, the amplification factor at light receiving parts that receive scattered light and fluorescence, and the like. The obtaining condition further includes a sampling rate at the time of performing A/D conversion on an analog signal.

When the analysis target cell flows in a flow cell, the analog signal 80$a$ of forward scattered light, the analog signal 80$b$ of side scattered light, and the analog signal 80$c$ of side fluorescence are obtained. When these analog signals 80$a$, 80$b$, 80$c$ are subjected to A/D conversion as described above, the time points when the signal intensities have been obtained are synchronized for each cell, and waveform data 82$a$ of the forward scattered light signal, waveform data 82$b$ of the side scattered light signal, and waveform data 82$c$ of the side fluorescence signal are obtained. The pieces of the waveform data 82$a$, 82$b$, 82$c$ are combined such that the pieces of data of the three signal intensities (the signal intensity of forward scattered light, the signal intensity of side scattered light, and the signal intensity of side fluorescence) of each cell form a set, and the resultant set is inputted as the analysis data 85 to the deep learning algorithm 60.

When the analysis data 85 has been inputted to an input layer 60$a$ of a neural network 60 forming the trained deep learning algorithm 60, an analysis result 83 is outputted from an output layer 60$b$, as classification information regarding the type of the cell and corresponding to the analysis data 85. A reference character 60$c$ in FIG. 5 represents the middle layer. The classification information regarding the cell type is, for example, a probability at which the cell belongs to each of a plurality of cell types. Further, it may be determined that the analysis target cell for which the analysis data 85 has been obtained belongs to the classification that has the highest value among the probabilities, and the analysis result 83 may include a label value 82 or the like being an identifier representing the cell type thereof. The analysis result 83 may be the label value itself, or may be data obtained by replacing the label value with information (e.g., character string) that indicates the cell type. In the example in FIG. 5, on the basis of the analysis data 85, the deep learning algorithm 60 outputs a label value "1", which has the highest probability that the analysis target cell for which the analysis data 85 has been obtained belongs to the classification. Further, character data "neutrophil" corresponding to this label value is outputted as the analysis result 83. The output of the label value may be performed by the deep learning algorithm 60, but another computer program may output a most preferable label value on the basis of the probability calculated by the deep learning algorithm 60.

[2. Configurations of Cell Analyzer and Cell Measuring Apparatus] (Configuration Example 1)

Figure 6:
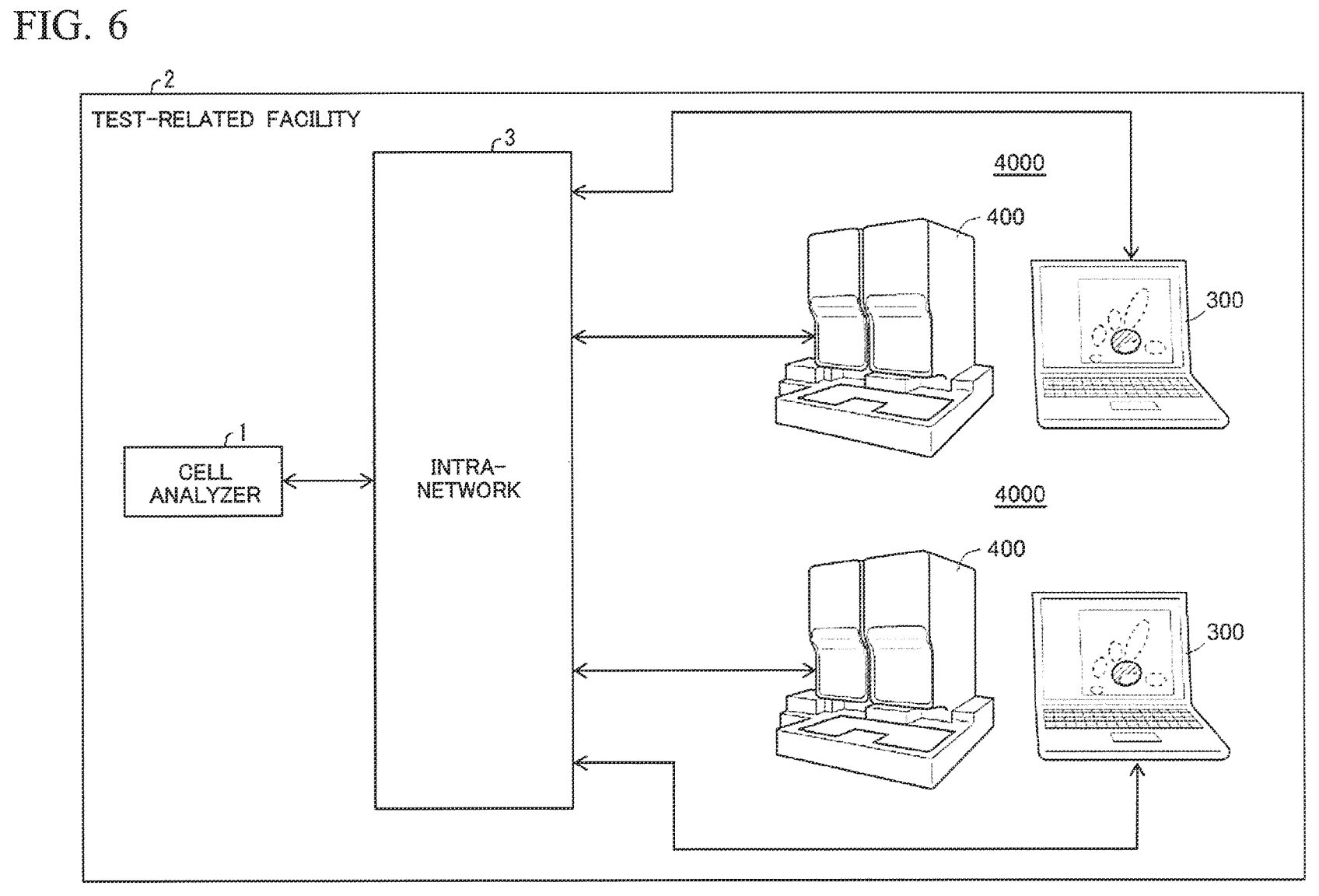
Figure 7:
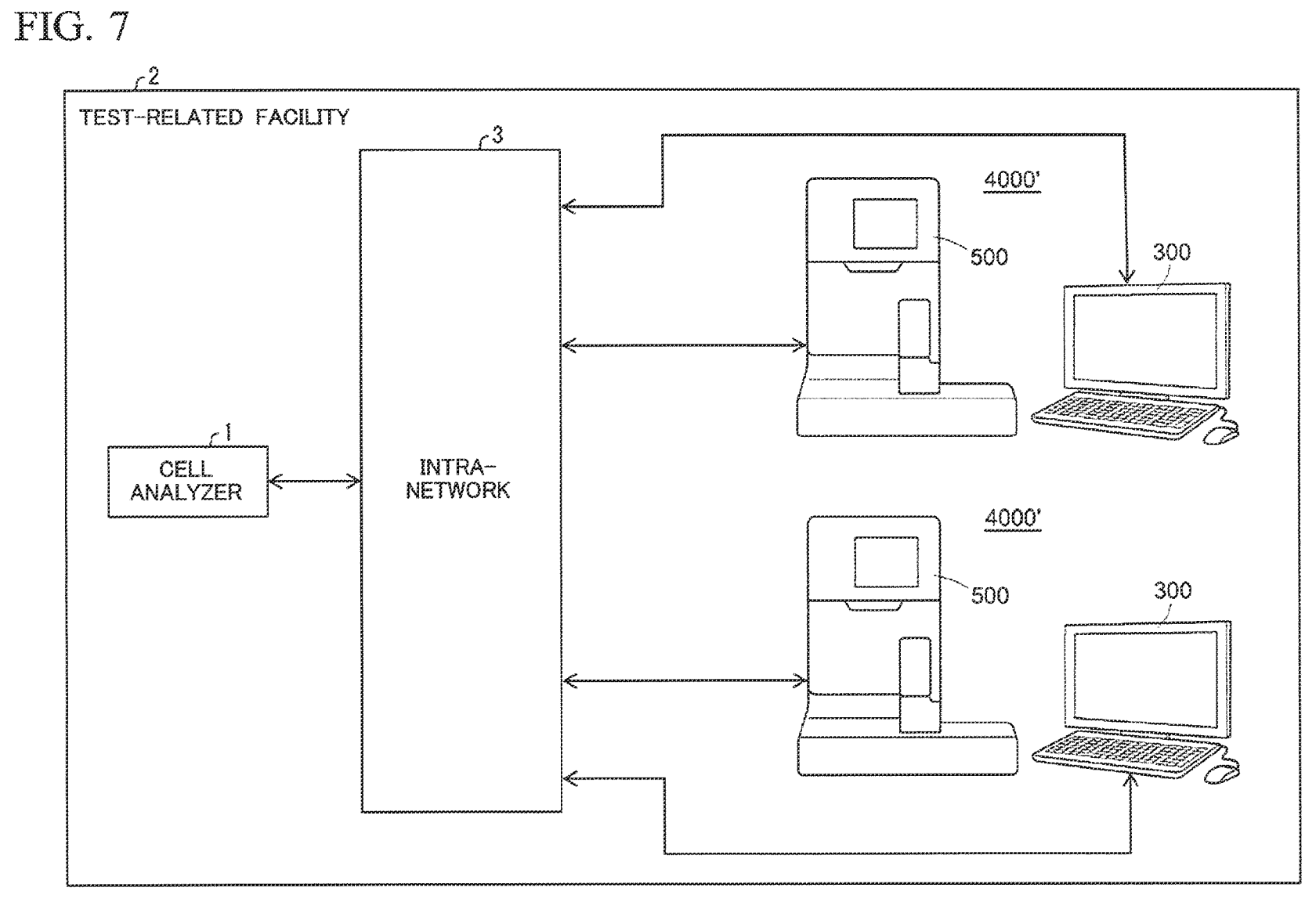

With reference to FIG. 6 and FIG. 7, configurations of a cell analyzer and cell measuring apparatuses will be described. FIG. 6 shows an example in which cell measuring apparatuses 4000 for measuring blood cells in blood are connected to a cell analyzer 1. FIG. 7 shows an example in which cell measuring apparatuses 4000' for measuring urine particles are connected to the cell analyzer 1. In the present embodiment, waveform data is obtained in the first cell measuring apparatus 4000 or the second cell measuring apparatus 4000'. Each cell measuring apparatus 4000 shown in FIG. 6 includes: a measurement unit 400; and a processing unit 300 for controlling setting of a measurement condition for a sample and measurement thereof in the measurement unit 400, and for analyzing measurement results. Each cell measuring apparatus 4000' shown in FIG. 7 includes: a measurement unit 500; and a processing unit 300 for controlling setting of a measurement condition for a sample and measurement thereof in the measurement unit 500, and for analyzing measurement results. The measurement unit 400, 500 and the processing unit 300 can be communicably connected to each other in a wired or wireless manner. The present embodiment should not be construed to be limited to a configuration example of the measurement unit 400, 500 shown below.

The cell analyzer 1 is a device for analyzing waveform data obtained in at least either of the cell measuring apparatuses 4000 and 4000' according to an artificial intelligence algorithm (e.g., deep learning algorithm 60). The cell analyzer 1 is an on-premise server, for example.

The cell analyzer 1, the cell measuring apparatus 4000, and the cell measuring apparatus 4000' are installed in the same facility such as a hospital or a test facility (hereinafter, referred to as a "test-related facility 2"), for example, as shown in FIG. 6, FIG. 7. The cell analyzer 1 is connected to the cell measuring apparatus 4000 and the cell measuring apparatus 4000' via an intra-network 3 as a communication network in the test-related facility 2 where the cell measur-
ing apparatus 4000 and the cell measuring apparatus 4000'
are installed. The intra-network 3 is a communication net-
work according to TCP/IP protocol, for example. The intra-
network 3 is a communication network having a transfer rate
of not less than 10 Gbps, for example. The cell analyzer 1,
the cell measuring apparatus 4000, and the cell measuring
apparatus 4000' are connectable to the intra-network 3 by at
least either of wired and wireless means. The cell analyzer
1 may be connected to either of the measurement unit 400
and the processing unit 300 in the cell measuring apparatus
4000 via the intra-network 3, or may be connected to both
the measurement unit 400 and the processing unit 300 in the
cell measuring apparatus 4000 via the intra-network 3.
Likewise, the cell analyzer 1 may be connected to either of
the measurement unit 500 and the processing unit 300 in the
cell measuring apparatus 4000' via the intra-network 3, or
may be connected to both the measurement unit 500 and the
processing unit 300 in the cell measuring apparatus 4000' via
the intra-network 3. The cell analyzer 1 may be connected to
a plurality of cell measuring apparatuses 4000 and a plural-
ity of cell measuring apparatuses 4000' installed in the
test-related facility 2 via the intra-network 3.

The cell analyzer 1 and the cell measuring apparatuses
4000, 4000' may be installed in the same network domain,
or may be installed in different network domains.

The cell analyzer 1 analyzes, according to the deep
learning algorithm 60, waveform data included in a digital
signal received from the measurement unit 400, the mea-
surement unit 500, or the processing unit 300 via the
intra-network 3, and determines a cell type corresponding to
the waveform data. The digital signal transmitted from the
measurement unit 400, the measurement unit 500, or the
processing unit 300 may be associated with a device ID of
the measurement unit 400, the measurement unit 500, or the
processing unit 300.

The cell analyzer 1 may update the deep learning algo-
rithm for analyzing the waveform data, through learning
based on training data. The cell analyzer 1 generates training
data on the basis of the waveform data obtained from the
measurement unit 400, the measurement unit 500, or the
processing unit 300. The cell analyzer 1 may obtain the
waveform data via the intra-network 3, or a storage medium.
The storage medium is a computer-readable non-transitory
tangible storage medium such as a DVD-ROM or a USB
(Universal Serial Bus) memory, for example.

A plurality of cell analyzers 1 may be installed in the
test-related facility 2. The plurality of cell analyzers 1 may
be separated, with respect to their respective roles, into cell
analyzers 1 for analyzing waveform data and cell analyzers
1 for performing learning based on training data.

Configuration Example 2

Figure 8:
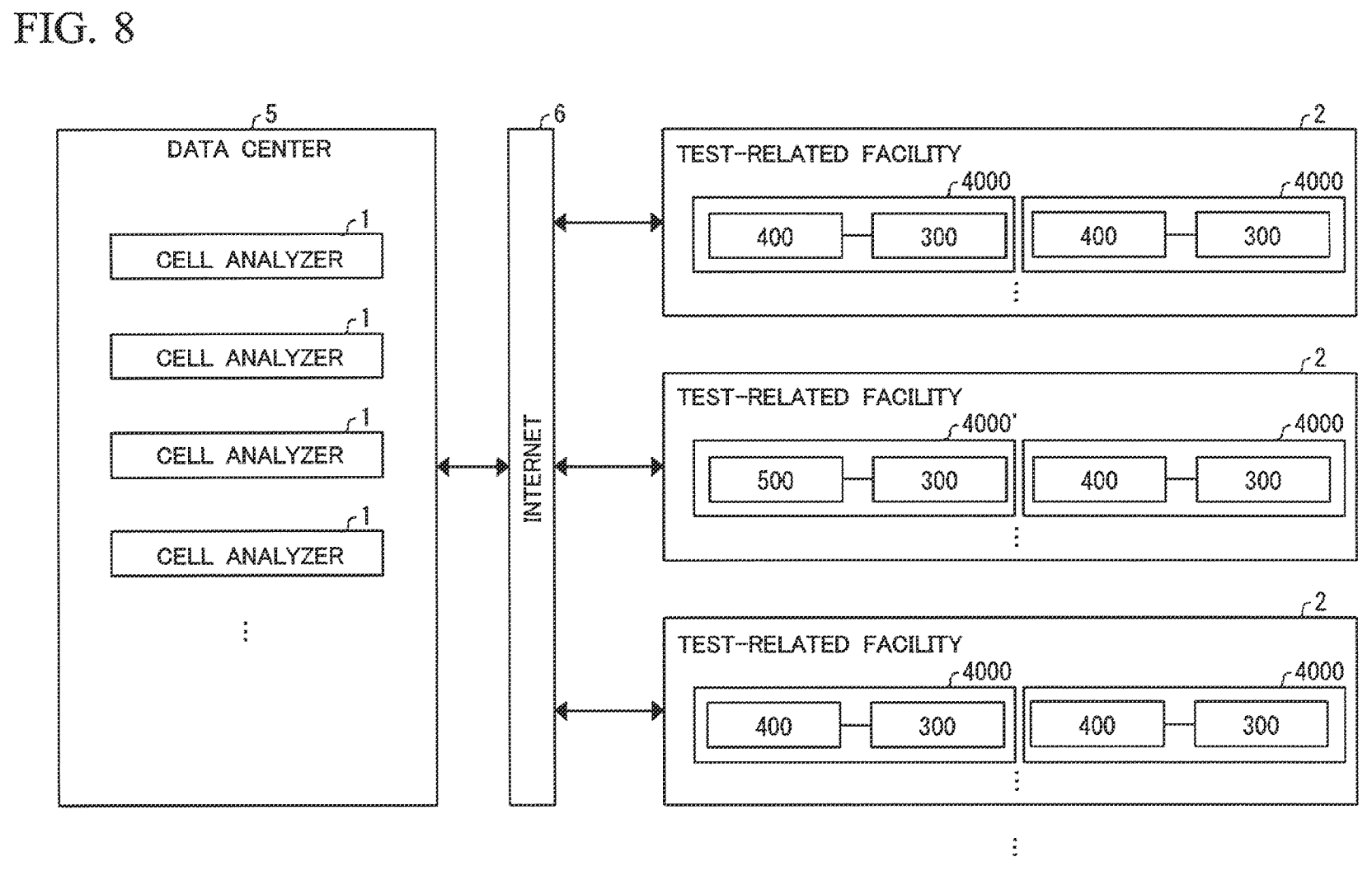

FIG. 8 shows another configuration example of the cell
analyzer 1 and the cell measuring apparatuses 4000, 4000'.
For example, the cell analyzer 1 is installed in a place
different from the test-related facility 2 where the cell
measuring apparatuses 4000, 4000' are installed. For
example, the cell analyzer 1 is installed in a data center 5 that
manages and operates the cell analyzer 1. The cell analyzer
1 is implemented as a cloud type server, for example. For
example, one or a plurality of servers installed in the data
center 5 implement the cell analyzer 1. The cell analyzer 1
is communicable with the cell measuring apparatus 4000,
4000' installed in the test-related facility 2 via the Internet 6,
for example. The cell analyzer 1 analyzes waveform data transmitted from the measurement unit 400, the measure-
ment unit 500, or the processing unit 300 via the Internet 6,
and determines the cell type corresponding to the waveform
data. The cell analyzer 1 may update the algorithm for
analyzing the waveform data, through learning based on
training data. The cell analyzer 1 generates training data on
the basis of the waveform data obtained from the measure-
ment unit 400, the measurement unit 500, or the processing
unit 300. The cell analyzer 1 may obtain the waveform data
via the Internet 6, or a storage medium. The storage medium
is a computer-readable non-transitory tangible storage
medium such as a DVD-ROM or a USB memory, for
example.

A plurality of cell analyzers 1 may be installed in the data
center 5. The plurality of cell analyzers 1 may be separated,
with respect to their respective roles, into cell analyzers 1 for
analyzing waveform data and cell analyzers 1 for perform-
ing learning based on training data.

Configuration Example 3

Figure 9:
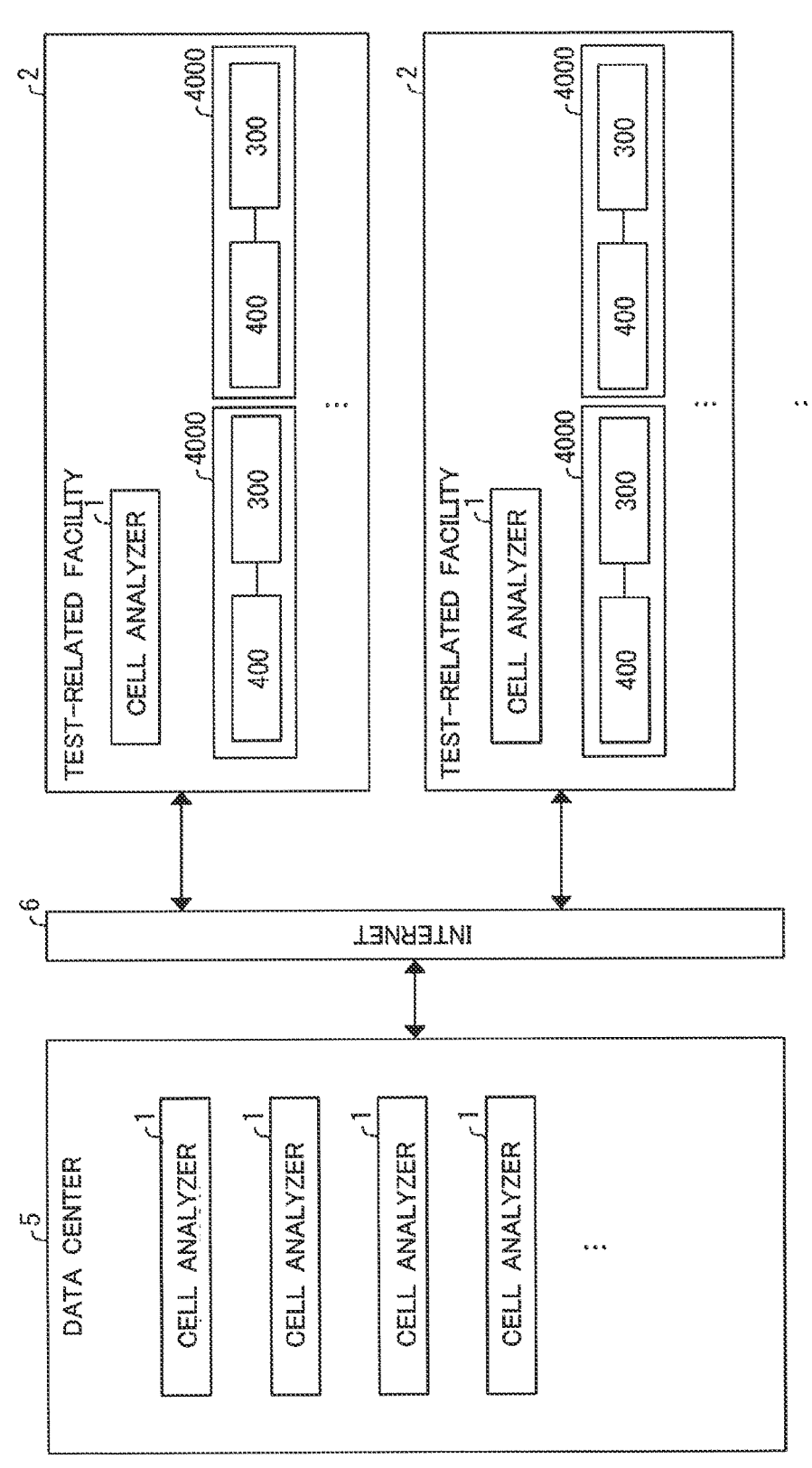
FIG. 9 shows another configuration example of the system including the cell analyzer.

FIG. 9 shows another configuration example of the cell
analyzer 1 and the cell measuring apparatuses 4000, 4000'.
The test-related facility 2 shown in FIG. 9 is identical to the
test-related facility 2 shown in FIG. 6 or FIG. 7. In the
test-related facility 2 shown in FIG. 9, the cell analyzer 1 is
connected to the cell measuring apparatuses 4000, 4000' via
the intra-network 3 or an interface such as a USB. In the
example shown in FIG. 9, for example, the cell analyzer 1
installed in the test-related facility 2 analyzes waveform data
obtained from the cell measuring apparatus 4000, 4000', and
determines the cell type of a cell corresponding to the
waveform data. Meanwhile, the cell analyzer 1 installed in
the data center 5 updates the algorithm for analyzing wave-
form data, through learning based on training data, for
example. That is, in the example shown in FIG. 9, the cell
analyzer 1 in the test-related facility 2 and the cell analyzer
1 in the data center 5 are assigned different roles.

According to the configuration example shown in FIG. 6
to FIG. 9, the cell analyzer 1 can obtain waveform data from
a plurality of cell measuring apparatuses 4000, 4000' in the
same test-related facility 2. In addition, the cell analyzer 1
can obtain waveform data from a plurality of cell measuring
apparatuses 4000, 4000' installed in each of different test-
related facilities 2. The waveform data is obtained for each
cell in a biological sample tested in each of the test-related
facilities 2. Therefore, if the waveform data is not appro-
priately managed, mix-up of data may occur between
patients, between biological samples, or between test-related
facilities 2, for example. Therefore, the measurement unit
400 or the processing unit 300 transmits, to the cell analyzer
1, waveform data and identification information in associa-
tion with each other. The cell analyzer 1 associates an
analysis result with the identification information.

Examples of the identification information include: (1)
identification information of a biological sample corre-
sponding to the waveform data; (2) identification informa-
tion of a cell corresponding to the waveform data; (3)
identification information of a patient corresponding to the
waveform data; (4) identification information of a test
corresponding to the waveform data; (5) identification infor-
mation of a cell analyzer by which the waveform data has
been measured; and (6) identification information of a
test-related facility 2 where the waveform data has been
measured. It should be noted that (1) identification infor-
mation of a biological sample corresponding to the wave-
form data can include information for determining the priority of parallel processing such as: information regarding the time at which a measurement order for the biological sample has been registered; information regarding the time at which the analyzer has identified the biological sample; information regarding the time at which the analyzer has started measurement of the biological sample; information for identifying whether the biological sample is an urgent specimen or a routine specimen; and information for identifying whether measurement of the biological sample is re-measurement or new measurement. When the cell analyzer 1 receives a measurement order from, for example, an LIS (Laboratory Information System), the processing unit 300, or the measurement unit 400, the cell analyzer 1 can obtain at least one of the above identification information (1) to (6) or a combination thereof from the LIS, the processing unit 300, or the measurement unit 400. For example, at least one of (1) to (6) shown as examples is transmitted to the cell analyzer 1 in association with the waveform data. A plurality of combinations of (1) to (6) shown as examples may be transmitted to the cell analyzer 1 in association with the waveform data.

As described above, according to the present embodiment, analysis, according to the deep learning algorithm 60, of the data measured by the plurality of cell measuring apparatuses 4000, 4000' is not performed in each of the cell measuring apparatuses 4000, 4000', but is collectively performed in the cell analyzer 1. The cell analyzer 1, as described later, is a device (computer) that has high-spec information processing capability and includes a processor 11 (also referred to as a host processor) which is a CPU, for example, and a parallel-processing processor 12 which is a GPU, for example. The cell analyzer 1 can perform highly accurate cell classification according to the deep learning algorithm 60, without requiring the cell measuring apparatuses 4000, 4000' to have such high-spec information processing capability. Furthermore, since each analysis result generated in the cell analyzer 1 is associated with identification information, mix-up of analysis results is prevented from occurring. Therefore, according to the present embodiment, as compared to the case where analysis is performed with an analysis computer and an analysis program constructed in each of the cell measuring apparatuses 4000, 4000', labor and cost required for system construction and operation can be reduced while ensuring manageability for data. For example, since update of the analysis program can be performed in the cell analyzer 1, labor and cost required for update can be reduced.

<First Cell Measuring Apparatus, and Preparation of Measurement Sample>
(Configuration of Measurement Unit)

A configuration example in which the measurement unit 400 is a blood analyzer including an FCM detector being a flow cytometer for detecting each cell in a blood sample, more specifically, the measurement unit 400 is a blood cell counter, will be described.

Figure 10:
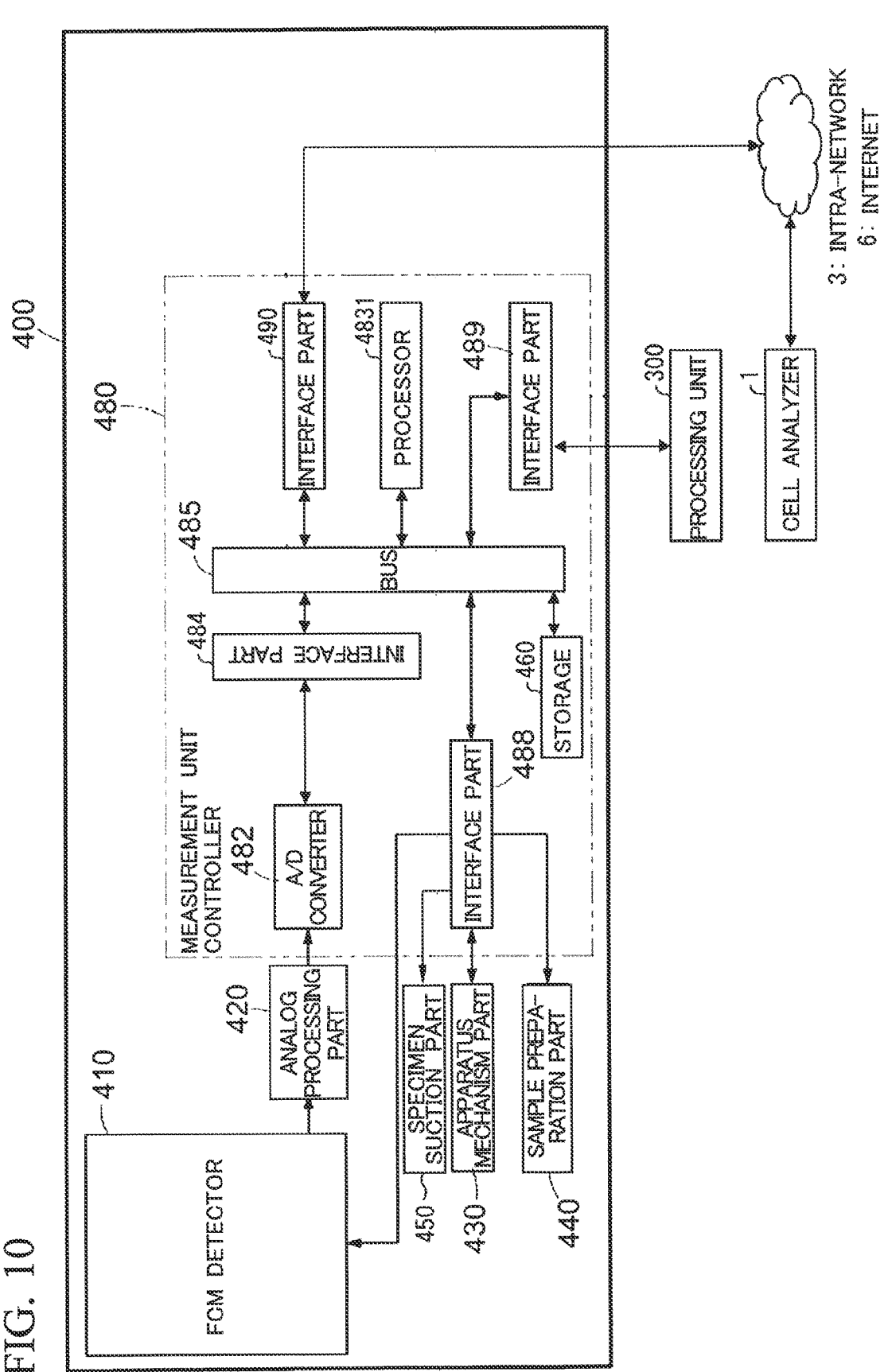
FIG. 10 shows an example of a block diagram of a measurement unit.

FIG. 10 shows an example of a block diagram of the measurement unit 400. As shown in FIG. 10, the measurement unit 400 includes: an FCM detector 410 for detecting blood cells; an analog processing part 420 for processing an output from the FCM detector 410; a measurement unit controller 480; a sample preparation part 440; and an apparatus mechanism part 430.

Figure 11:
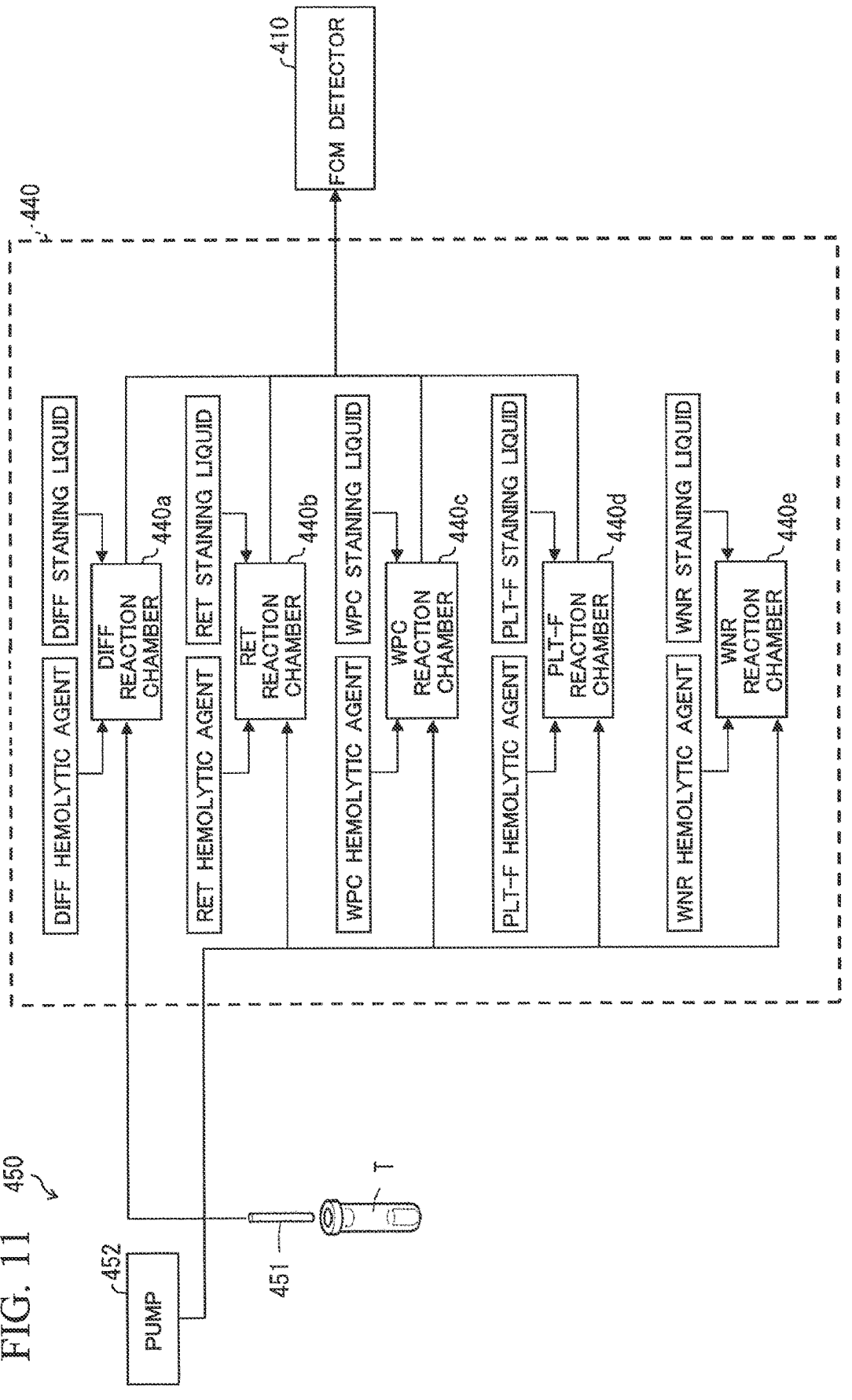
FIG. 11 shows an example of a specimen suction part and a sample preparation part.

FIG. 11 is a schematic diagram for describing the specimen suction part 450 and the sample preparation part 440. The specimen suction part 450 includes: a nozzle 451 for suctioning a blood specimen (whole blood) from a blood collection tube T; and a pump 452 for providing a negative pressure/positive pressure to the nozzle. The nozzle 451 is moved upwardly and downwardly by the apparatus mechanism part 430, to be inserted into the blood collection tube T. When the pump 452 provides a negative pressure in a state where the nozzle 451 is inserted in the blood collection tube T, the blood specimen is suctioned via the nozzle 451. The apparatus mechanism part 430 may include a hand member for inverting and stirring the blood collection tube T before suctioning the blood from the blood collection tube T.

The sample preparation part 440 includes five reaction chambers 440a to 440e. The reaction chambers 440a to 440e are used in measurement channels of DIFF, RET, WPC, PLT-F, and WNR, respectively. Each reaction chamber has connected thereto, via flow paths, a hemolytic agent container containing a hemolytic agent and a staining liquid container containing a staining liquid, which serve as reagents for the corresponding measurement channel. One reaction chamber and reagents (a hemolytic agent and a staining liquid) connected thereto form a measurement channel. For example, the DIFF measurement channel is composed of a DIFF hemolytic agent and a DIFF staining liquid which serve as DIFF measurement reagents, and the DIFF reaction chamber 440a. The other measurement channels are configured in similar manners. Here, an example of a configuration in which one measurement channel includes one hemolytic agent and one staining liquid is shown. However, one measurement channel need not necessarily include both of a hemolytic agent and a staining liquid, and a plurality of measurement channels may share one reagent.

Through horizontal and up-down movement by the apparatus mechanism part 430, the nozzle 451 having suctioned a blood specimen accesses, from above, a reaction chamber, among the reaction chambers 440a to 440e, that corresponds to a measurement channel that corresponds to an order, and the nozzle 451 discharges the suctioned blood specimen. The sample preparation part 440 supplies a corresponding hemolytic agent and a corresponding staining liquid to the reaction chamber having the blood specimen discharged therein, to mix the blood specimen, the hemolytic agent, and the staining liquid in the reaction chamber, thereby preparing a measurement sample. The prepared measurement sample is supplied from the reaction chamber to the FCM detector 410 via a flow path, to be subjected to measurement of cells by flow cytometry.

Figure 12:
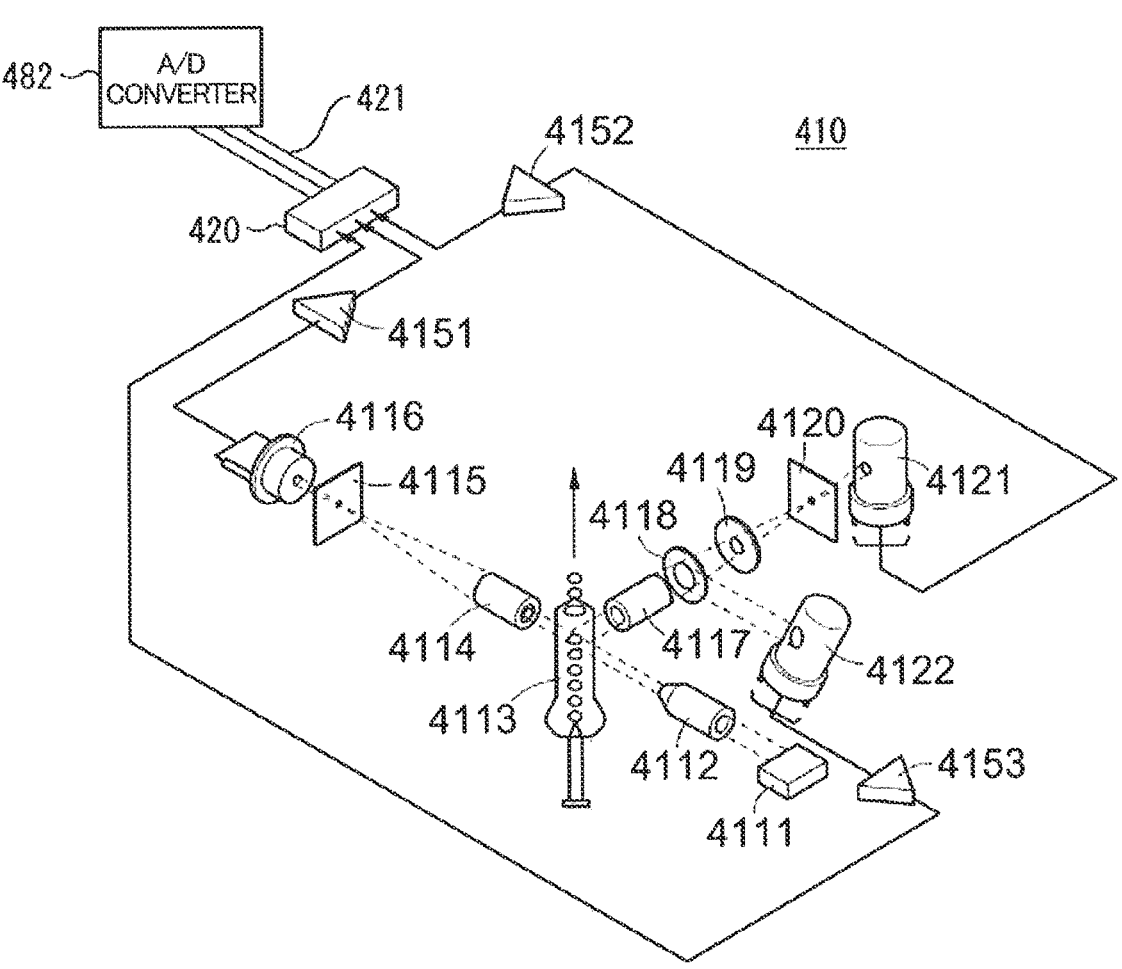
FIG. 12 shows a configuration example of an optical system of an FCM detector.

FIG. 12 shows a configuration example of an optical system of the FCM detector 410. As shown in FIG. 12, in measurement by a flow cytometer, when each cell contained in a measurement sample passes through a flow cell (sheath flow cell) 4113 provided in the flow cytometer, a light source 4111 applies light to the flow cell 4113, and scattered light and fluorescence emitted from the cell in the flow cell 4113 due to this light are detected.

In FIG. 12, light emitted from a laser diode being the light source 4111 is applied via a light application lens system 4112 to each cell passing through the flow cell 4113.

In the present embodiment, the light source 4111 of the flow cytometer is not limited in particular, and a light source 4111 that has a wavelength suitable for excitation of the fluorescent dye is selected. As such a light source 4111, a semiconductor laser light source including a red semiconductor laser light source and/or a blue semiconductor laser light source, a gas laser light source such as an argon laser light source or a helium-neon laser, a mercury arc lamp, or the like is used, for example. In particular, a semiconductor laser light source is suitable because the semiconductor laser light source is very inexpensive when compared with a gas laser light source.

As shown in FIG. 12, forward scattered light emitted from a particle passing through the flow cell 4113 is received by a forward scattered light receiving element 4116 via a condenser lens 4114 and a pin hole part 4115. The forward scattered light receiving element 4116 is a photodiode. Side scattered light is received by a side scattered light receiving element 4121 via a condenser lens 4117, a dichroic mirror 4118, a bandpass filter 4119, and a pin hole part 4120. The side scattered light receiving element 4121 is a photodiode. Side fluorescence is received by a side fluorescence receiving element 4122 via the condenser lens 4117 and the dichroic mirror 4118. The side fluorescence receiving element 4122 is an avalanche photodiode. As the forward scattered light receiving element 4116, the side scattered light receiving element 4121, and the side fluorescence receiving element 4122, a photomultiplier may be used.

Reception light signals outputted from the respective light receiving elements 4116, 4121, 4122 are inputted to the analog processing part 420 via amplifiers 4151, 4152, 4153, respectively.

With reference back to FIG. 10, the analog processing part 420 performs processes including noise removal onto electric signals as analog signals inputted from the FCM detector 410, and outputs the processed results as electric signals to the measurement unit controller 480.

As shown in FIG. 10, the measurement unit controller 480 includes an A/D converter 482, a digital value calculation part 483, and an interface part 489 connected to the processing unit 300. Furthermore, the measurement unit controller 480 includes an interface part 488 connected to the apparatus mechanism part 430.

The digital value calculation part 483 is connected to the interface part 489 via the interface part 484 and a bus 485. The interface part 489 is connected to the FCM detector 410, the apparatus mechanism part 430, the sample preparation part 440, and the specimen suction part 450 via the bus 485 and the interface part 488. The measurement unit 400 is connected to the processing unit 300 and the cell analyzer 1 via the interface part 489. The interface part 489 is a USB interface, for example. The measurement unit 400 may include an interface part 490. The interface part 490 is an interface having a transfer rate of not less than 10 Gbps, for example. The measurement unit 400 is connectable to the intra-network 3 and the Internet 6 via the interface part 490. The measurement unit 400 is connectable to the cell analyzer 1 via the intra-network 3 or the Internet 6.

The A/D converter 482 converts an electric signal as an analog signal outputted from the analog processing part 420 into a digital signal, and outputs the digital signal after the conversion to the digital value calculation part 483. The A/D converter 482 samples the electric signal at a predetermined sampling rate (e.g., sampling at 1024 points at a 10 nanosecond interval, sampling at 128 points at an 80 nanosecond interval, sampling at 64 points at a 160 nanosecond interval, or the like), thereby generating a digital signal.

The digital value calculation part 483 performs predetermined arithmetic processes on the digital signal outputted from the A/D converter 482. Examples of the predetermined arithmetic processes include, but are not limited to: a process in which, during a time period from the start, upon forward scattered light reaching a predetermined threshold, of obtainment of the signal intensity of forward scattered light, the signal intensity of side scattered light, and the signal intensity of side fluorescence, until the end of the obtainment after a predetermined time period, each piece of waveform data is obtained for a single training target cell at a plurality of time points at a certain interval; a process of extracting a peak value of the waveform data; and the like. The arithmetic process of obtaining waveform data from the digital signal obtained in the A/D converter 482 may be executed by the A/D converter 482.

FIG. 13 shows a configuration of the processing unit 300. The processing unit 300 includes a processor 3001, a bus 3003, a storage 3004, interface parts 3006*a* to 3006*d*, a display part 3015, and an operation part 3016. The processing unit 300 as hardware is implemented by a general personal computer, and functions as a processing unit of the cell analyzer 4000, by executing a dedicated program stored in the storage 3004.

The processor 3001 is a CPU, and can execute a program stored in the storage 3004.

The storage 3004 includes a hard disk device. The storage 3004 stores at least a program 60 for processing the classification information of each cell transmitted from the cell analyzer 1 and for generating a test result of the specimen. The test result of a specimen means, as described later, a result of counting blood cells contained in the specimen, on the basis of classification information 82 of each individual cell obtained by the measurement unit 400.

The display part 3015 includes a computer screen. The display part 3015 is connected to the processor 3001 via the interface part 3006*a* and the bus 3003. The display part 3015 can receive an image signal inputted from the processor 3001, and can display the measurement result (cell classification information) received from the cell analyzer 1 and a test result obtained by the processor 3001 analyzing the measurement result.

The operation part 3016 includes a pointing device including a keyboard, a mouse, or a touch panel. The operation part 3016 is connected to the processor 3001 via the interface part 3006*b* and the bus 3003. A user such as a doctor or a laboratory technician operates the operation part 3016 to input a measurement order to the cell analyzer 4000, thereby being able to input a measurement instruction in accordance with the measurement order. The operation part 3016 can also receive an instruction of displaying a test result from the user. By operating the operation part 3016, the user can view various types of information regarding the test result, such as a graph, a chart, or flag information, of the specimen.

The processor 3001 is connected to the measurement unit 400 via the bus 3003 and the interface part 3006*c*. The processor 3001 is connected to the intra-network 3 or the Internet 6 via the bus 3003 and the interface part 3006*d*, and is connected to the cell analyzer 1 via the intra-network 3 or the Internet 6.

(Configuration of Cell Analyzer)

Figure 14:
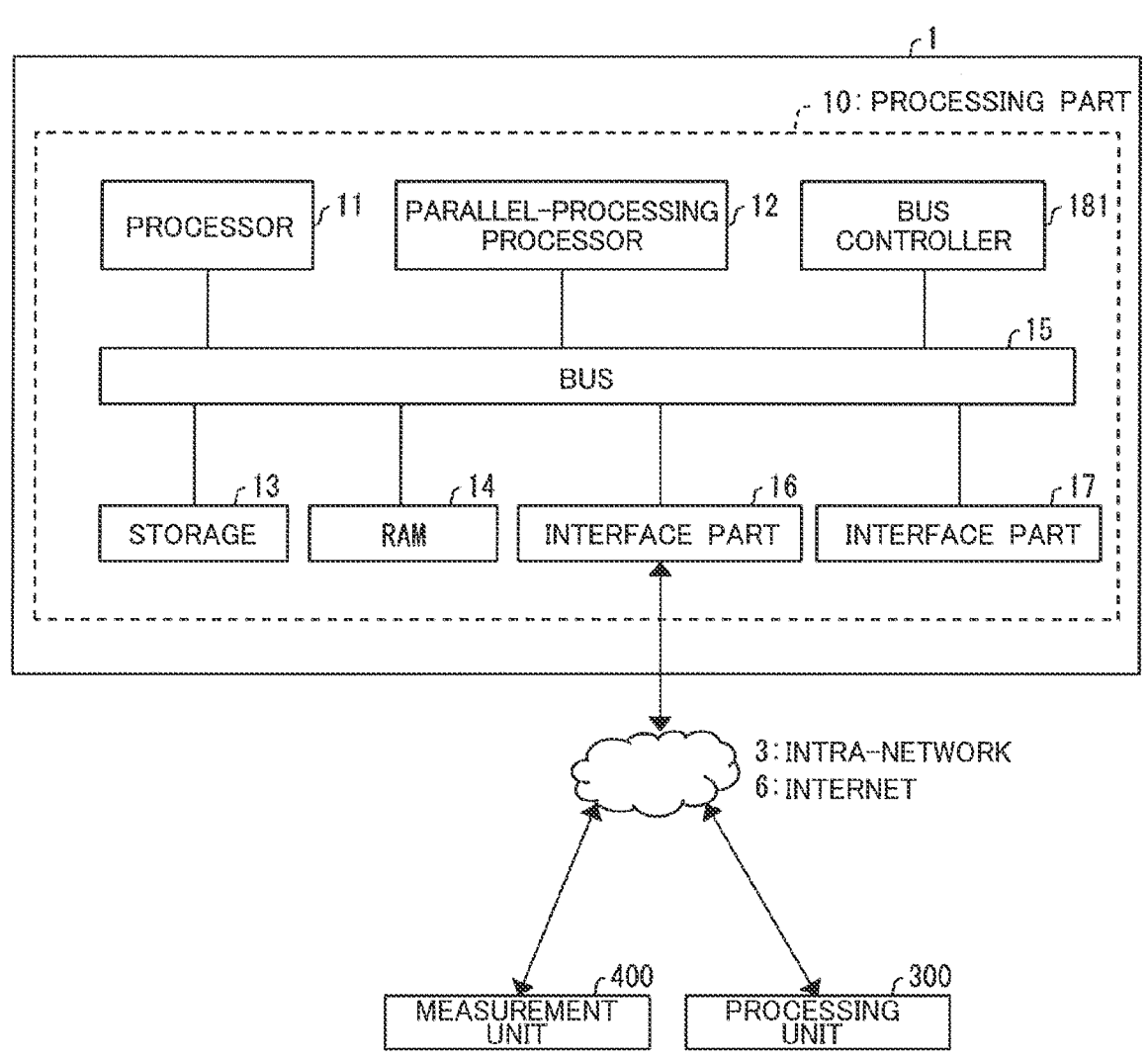
FIG. 14 is a block diagram of a cell analyzer.

FIG. 14 shows an example of a block diagram of the cell analyzer 1. The cell analyzer 1 includes a processing part 10. The processing part 10 includes, for example, a processor 11, a parallel-processing processor 12, a storage 13, a RAM 14, an interface part 16, and an interface part 17. The processor 11, the parallel-processing processor 12, the storage 13, the RAM 14, the interface part 16, and the interface part 17 are electrically connected to each other via a bus 15. The bus 15 is a transmission line having a data transfer rate of not less than several hundred MB/s, for example. The bus 15 may be a transmission line having a data transfer rate of not less than 1 GB/s. The bus 15 performs data transfer on the basis of the PCI-Express or PCI-X standard, for example.

The cell analyzer 1 is connectable to the measurement unit 400 and the processing unit 300 via the interface part 16. The interface part 16 may be the interface part 4 shown in FIG. 7. The cell analyzer 1 is connectable to the intra-network 3 or the Internet 6 via the interface part 17. The cell analyzer 1 is connected to the measurement unit 400 or the processing unit 300 via the intra-network 3 or the Internet 6, and obtains waveform data regarding each individual cell in the biological sample, from the measurement unit 400 or the processing unit 300. The cell analyzer 1 obtains a plurality of pieces of waveform data (e.g., FSC, SSC, SFL) regarding each individual cell in the biological sample, for example.

The cell analyzer 1 has previously stored, in the storage 13 and, for example, in an executable form, a deep learning algorithm 50 composed of a program and a neural network before being trained according to the present embodiment. The executable form is a form generated through conversion of a programming language by a compiler, for example. The cell analyzer 1 uses the program stored in the storage 13, to perform training processes on the neural network 50 before being trained.

The cell analyzer 1 has previously stored, in the storage 13 and, for example, in an executable form, a deep learning algorithm 60 composed of a program and a neural network before being trained according to the present embodiment, for the purpose of analyzing waveform data. The executable form is a form generated through conversion of a programming language by a compiler, for example. The processor 11 and the parallel-processing processor 12 use the program and the deep learning algorithm 60 stored in the storage 13, to perform processes. That is, in other words, the processor 11 of the cell analyzer 1 is programmed to analyze data of each cell on the basis of the deep learning algorithm 60.

The processor 11 executes analysis of waveform data according to the deep learning algorithm 60 by using the parallel-processing processor 12. The processor 11 is a CPU (Central Processing Unit), for example. The parallel-processing processor 12 executes in parallel a plurality of arithmetic processes being at least a part of processing regarding analysis of waveform data. The parallel-processing processor 12 is a GPU (Graphics Processing Unit), an FPGA (Field Programmable Gate Array), or an ASIC (Application Specific Integrated Circuit), for example. When the parallel-processing processor 12 is an FPGA, the parallel-processing processor 12 may have been programmed so as to correspond to an arithmetic process regarding the trained deep learning algorithm 60, for example. When the parallel-processing processor 12 is an ASIC, the parallel-processing processor 12 may have incorporated therein in advance a circuit for executing the arithmetic process regarding the trained deep learning algorithm 60, or may have a programmable module built therein in addition to such an incorporated circuit, for example. The parallel-processing processor 12 may be implemented by using Jetson manufactured by NVIDIA Corporation, for example.

The processor 11 executes a calculation process regarding control of the cell analyzer 1, for example. For example, the processor 11 executes processes regarding reading out of program data from the storage 13, developing of a program onto the RAM 14, and transmission/reception of data with respect to the RAM 14, for example. The above-described processes executed by the processor 11 are required to be executed in a predetermined sequential order, for example. For example, when processes needed for a predetermined control are assumed to be A, B, and C, the processes are required to be executed in the sequential order of B, A, and C, in some cases. Since the processor 111 often executes such continuous processes that depend on a sequential order, even when the number of arithmetic units (each may be referred to as a "processor core", a "core", or the like) is increased, the processing speed is not always increased.

Meanwhile, the parallel-processing processor 12 executes a large number of regular calculation processes such as arithmetic operations on matrix data including a large number of elements, for example. In the present embodiment, the parallel-processing processor 12 executes parallel processing in which at least a part of processes of analyzing waveform data in accordance with the deep learning algorithm 60 are parallelized. The deep learning algorithm 60 includes a large number of matrix operations, for example. For example, the deep learning algorithm 60 may include at least 100 matrix operations, or may include at least 1000 matrix operations. The parallel-processing processor 12 has a plurality of arithmetic units, and the respective arithmetic units can simultaneously execute matrix operations. That is, the parallel-processing processor 12 can execute, in parallel, matrix operations by a plurality of respective arithmetic units, as parallel processing. For example, a matrix operation included in the deep learning algorithm 60 can be divided into a plurality of arithmetic processes that are not dependent on a sequential order with each other. The thus divided arithmetic processes can be executed in parallel by a plurality of arithmetic units, respectively. These arithmetic units may be each referred to as a "processor core", a "core", or the like.

As a result of execution of such parallel processing, speed up of arithmetic processing in the entirety of the cell analyzer 1 can be realized. A process such as a matrix operation included in the deep learning algorithm 60 may be referred to as "Single Instruction Multiple Data (SIMD) processing", for example. The parallel-processing processor 12 is suitable for such an SIMD operation, for example. Such a parallel-processing processor 12 may be referred to as a vector processor.

As described above, the processor 11 is suitable for executing diverse and complicated processes. Meanwhile, the parallel-processing processor 12 is suitable for executing in parallel a large number of regular processes. Through parallel execution of a large number of regular processes, the TAT (Turn Around Time) required for a calculation process is shortened.

The parallel processing to be executed by the parallel-processing processor 12 is not limited to matrix operations. For example, when the parallel-processing processor 12 executes a learning process in accordance with the deep learning algorithm 50, differential operations or the like regarding the learning process can be the target of the parallel processing.

As for the number of arithmetic units of the processor 11, a dual core (the number of cores: 2), a quad core (the number of cores: 4), or an octa core (the number of cores: 8) is adopted, for example. Meanwhile, the number (core number) of arithmetic units of the parallel-processing processor 12 is at least ten (the number of cores: 10), and ten matrix operations can be executed in parallel, for example. The parallel-processing processor 12 that has, for example, several-ten arithmetic units also exists. The parallel-processing processor 12 that has, for example, at least 100 arithmetic units (the number of cores: 100) and that can execute 100 matrix operations in parallel also exists. The parallel-processing processor 12 that has, for example, several hundred arithmetic units also exists. The parallel-processing processor 12 that has, for example, at least 1000 arithmetic units (the number of cores: 1000) and that can execute 1000 matrix operations in parallel also exists. The parallel-processing processor 12 that has, for example, several thousand arithmetic units also exists.

Figure 15:
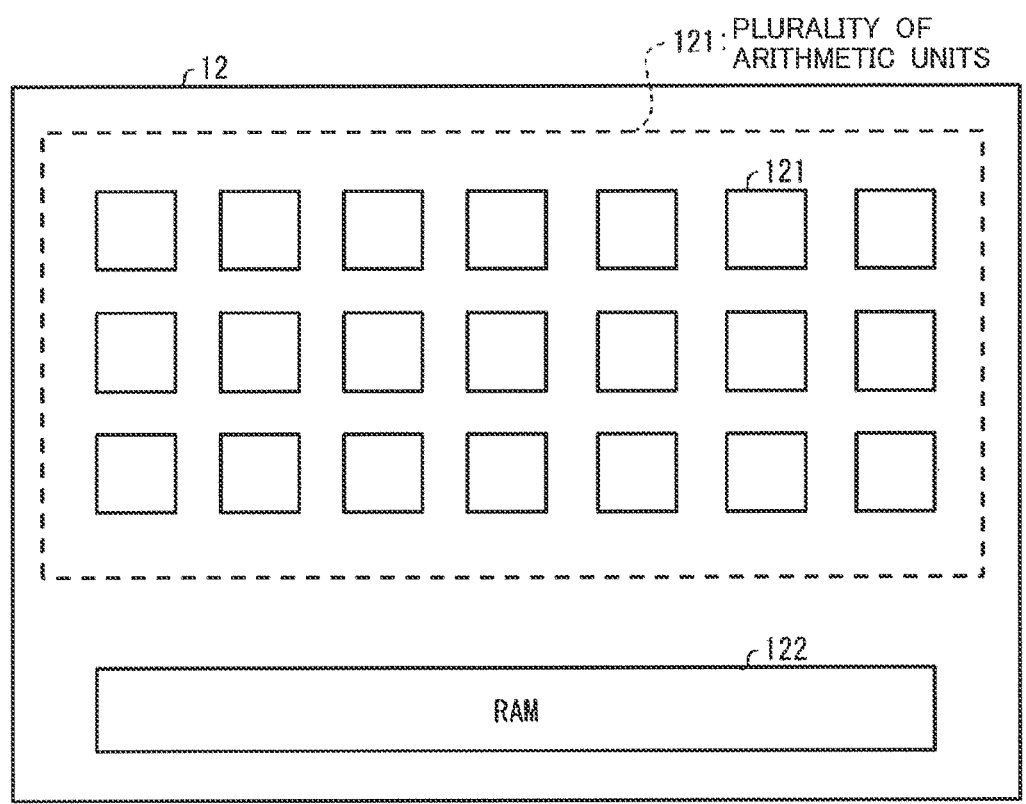
FIG. 15 shows a configuration example of a parallel-processing processor.

FIG. 15 shows a configuration example of the parallel-processing processor 12. The parallel-processing processor 12 includes a plurality of arithmetic units 121 and a RAM 122. The respective arithmetic units 121 execute arithmetic processes on matrix data in parallel. The RAM 122 stores data regarding the arithmetic processes executed by the arithmetic units 121. The RAM 122 is a memory that has a capacity of at least 1 gigabyte. The RAM 122 may be a memory that has a capacity of 2 gigabytes, 4 gigabytes, 6 gigabytes, 8 gigabytes, 10 gigabytes, or more. Each arithmetic unit 121 obtains data from the RAM 122 and executes an arithmetic process. The arithmetic unit 121 may be referred to as a "processor core", a "core", or the like.

Figure 16:
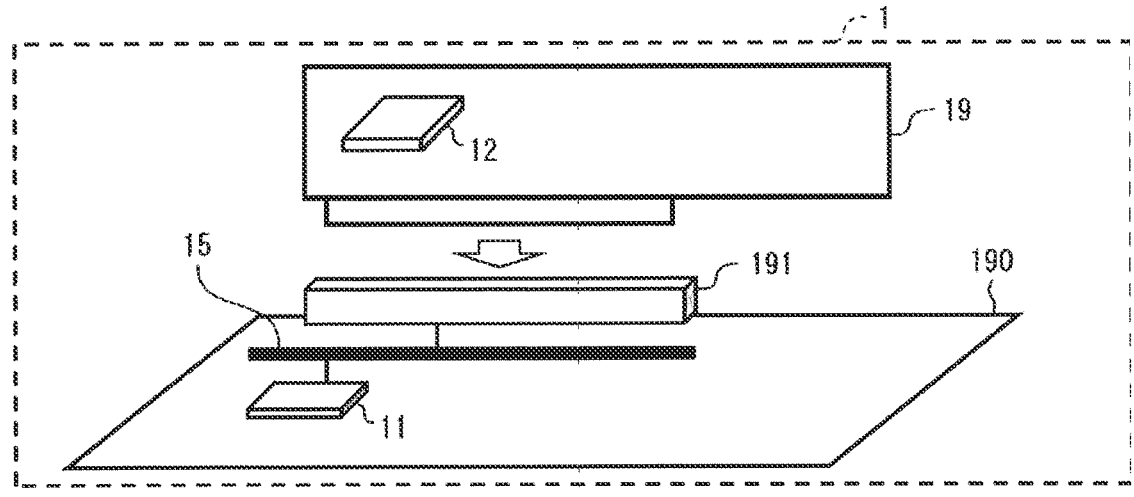
FIG. 16 shows an implementation example of the parallel-processing processor to the cell analyzer.
Figure 17:
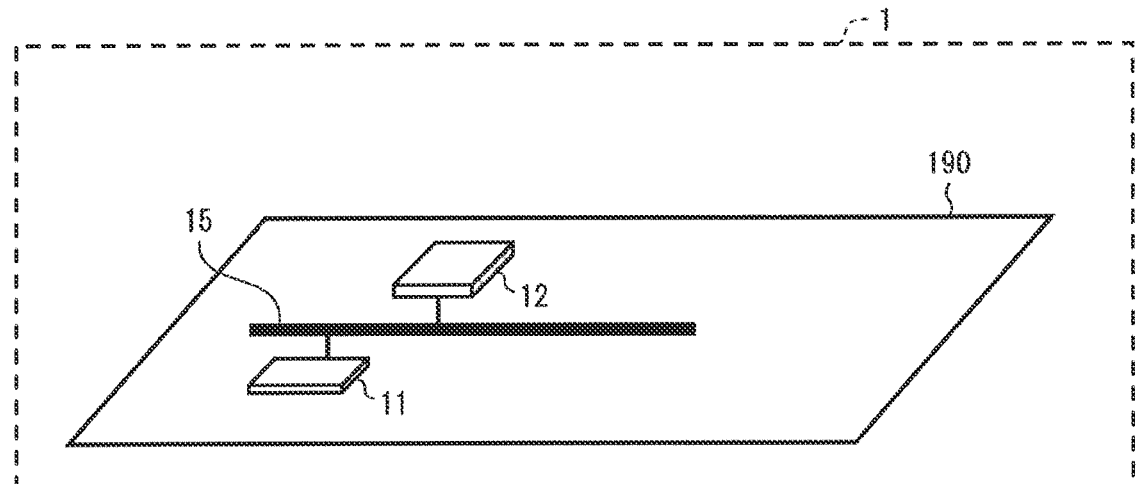
FIG. 17 shows another implementation example of the parallel-processing processor to the cell analyzer.
Figure 18:
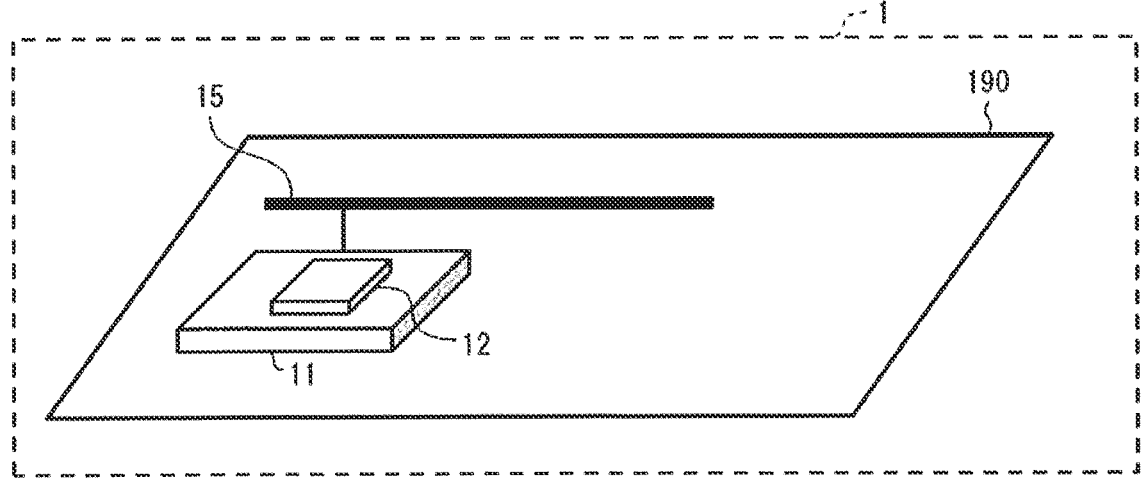
FIG. 18 shows another implementation example of the parallel-processing processor to the cell analyzer.

FIG. 16 to FIG. 18 each show an installation example of the parallel-processing processor 12 to the cell analyzer 1. FIG. 16 and FIG. 17 each show an installation example in which the processor 11 and the parallel-processing processor 12 are provided as separate bodies. As shown in FIG. 16, the parallel-processing processor 12 is installed on a substrate 190, for example. The parallel-processing processor 12 is installed on a graphic board 19, and the graphic board 19 is connected to the substrate 190 via a connector 191, for example. The processor 11 is connected to the parallel-processing processor 12 via the bus 15. As shown in FIG. 17, the parallel-processing processor 12 may be directly installed on the substrate 190, and connected to the processor 11 via the bus 15, for example. FIG. 18 shows an installation example in which the processor 11 and the parallel-processing processor 12 are integrally provided. As shown in FIG. 18, the parallel-processing processor 12 may be built in the processor 11 installed on the substrate 190, for example.

Figure 19:
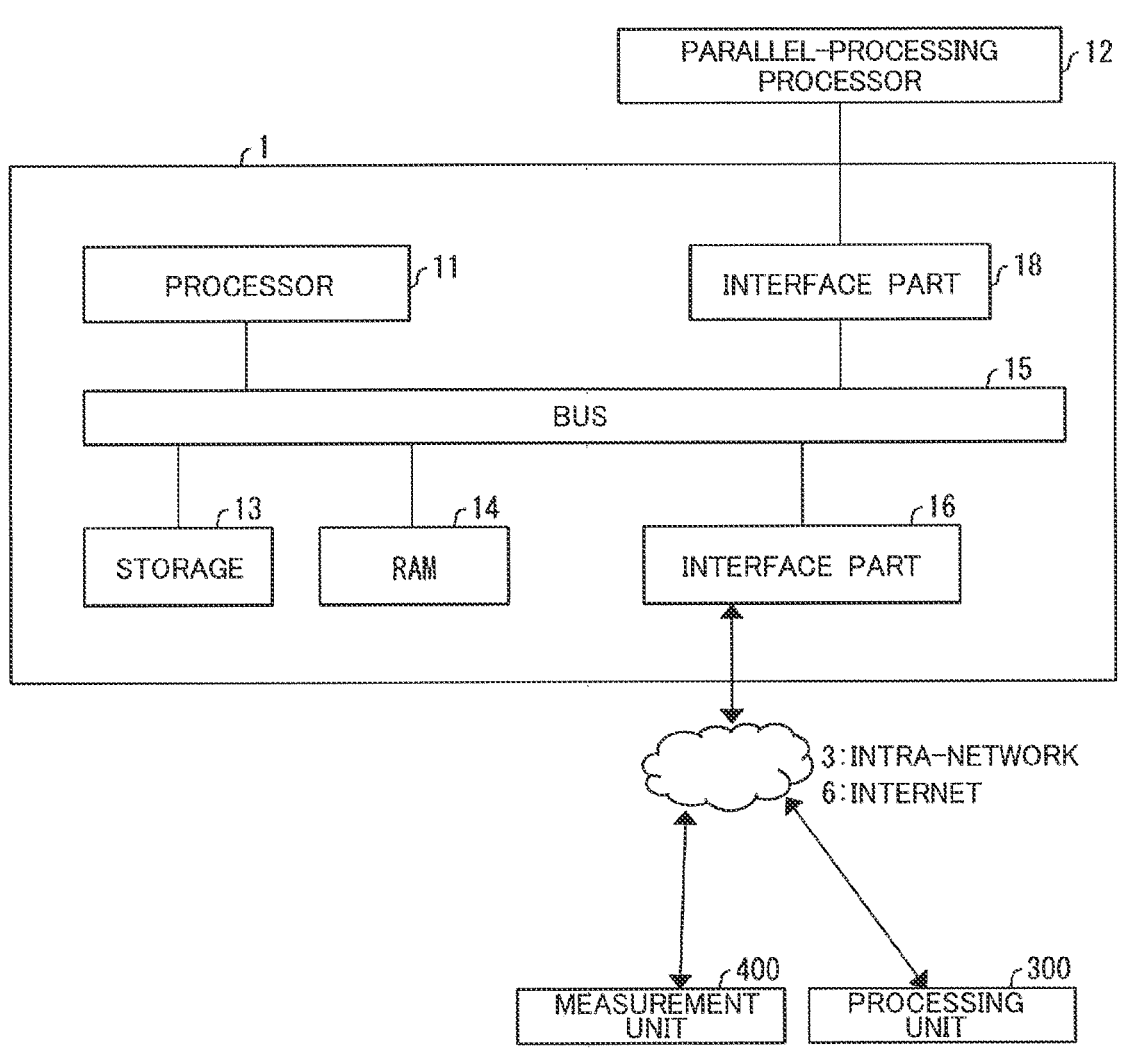
FIG. 19 shows another implementation example of the parallel-processing processor to the cell analyzer.

FIG. 19 is a block diagram showing another installation example of the parallel-processing processor 12 to the cell analyzer 1. FIG. 19 shows an example in which the parallel-processing processor 12 is installed to an external apparatus connected to the cell analyzer 1. For example, the parallel-processing processor 12 is mounted on a USB (Universal Serial Bus) device, and this USB device is connected to the bus 15 via an interface part 18. The USB device may be a small device such as a USB dongle, for example. The interface part 18 is a USB interface having a transfer rate of several hundred Mbps, for example, and more preferably, is a USB interface having a transfer rate of several Gbps to several ten Gbps or higher.

A plurality of USB devices each having the parallel-processing processor 12 mounted thereon may be connected to the interface part 18. The parallel-processing processor 12 on one USB device has a smaller number of arithmetic units 121 than a GPU or the like in some cases. Therefore, if a plurality of USB devices are connected to the cell analyzer 1, scale-up of the number of cores can be realized.

As shown in FIG. 19, for example, when a small device such as a USB dongle, in which a parallel-processing processor 12 having a deep learning algorithm 60 is incorporated, is connected to the interface part 18, the deep learning algorithm 60 may be replaced by replacing the small device. Furthermore, by replacing the small device, the measurement unit controller 480 may update the program and the deep learning algorithm 60 stored in the storage 13.

Figure 20:
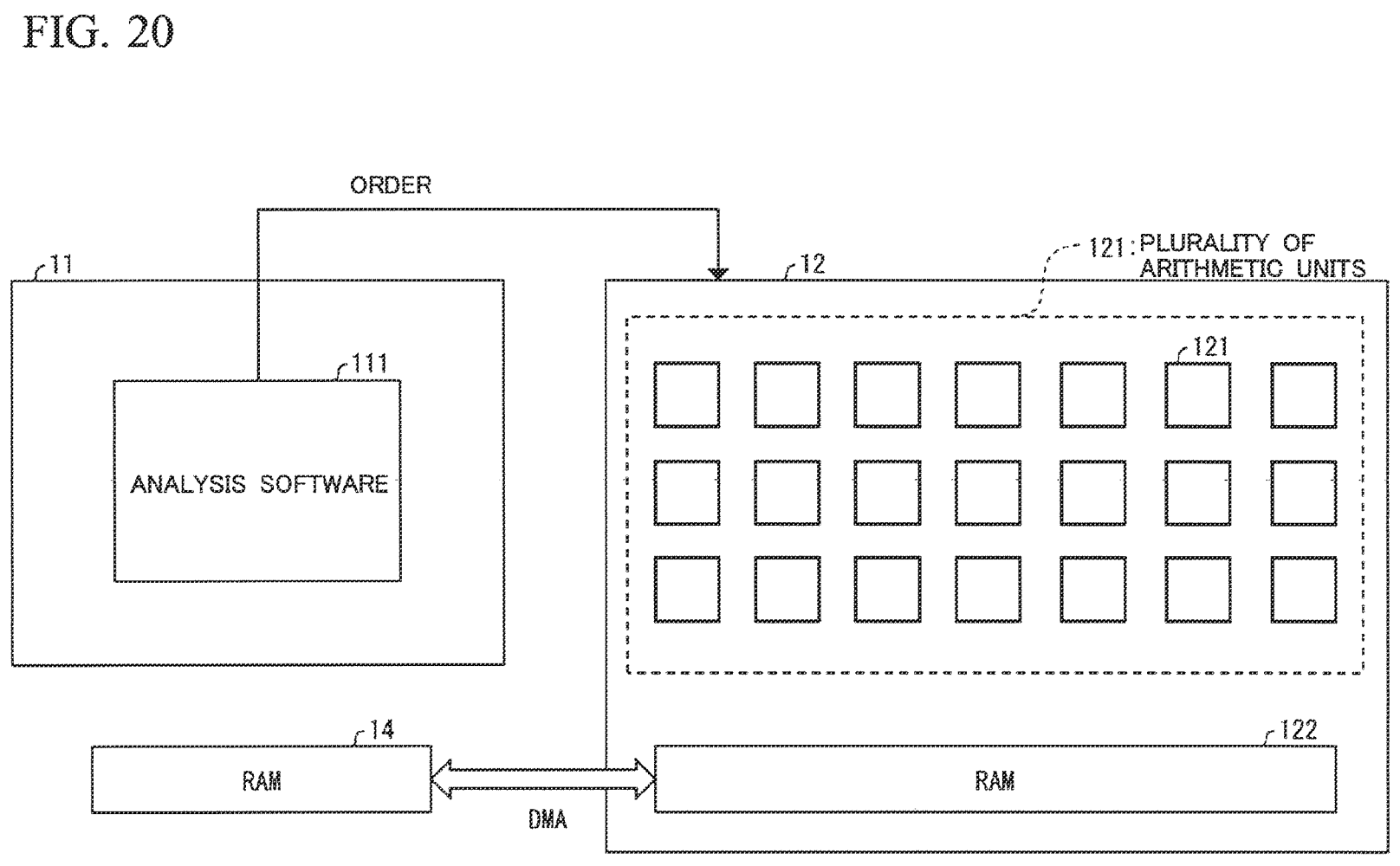

FIG. 20 shows an outline of operation in which the processor 11 executes arithmetic processes of matrix data by using the parallel-processing processor 12. The processor 11 can issue an order to the parallel-processing processor 12 to cause the parallel-processing processor 12 to execute at least a part of arithmetic processes necessary for analysis of waveform data according to the deep learning algorithm 60. Analysis software 111 of the processor 11 orders the parallel-processing processor 12 to execute arithmetic processes regarding waveform data analysis based on the deep learning algorithm 60. All or at least a part of waveform data corresponding to the signals detected by the FCM detector 410 is stored in the RAM 14. The data stored in the RAM 14 is transferred to the RAM 122 of the parallel-processing processor 12. The data stored in the RAM 14 is transferred to the RAM 122 by a DMA (Direct Memory Access) method, for example. The plurality of arithmetic units 121 of the parallel-processing processor 12 respectively execute in parallel arithmetic processes with respect to the data stored in the RAM 122. Each of the plurality of arithmetic units 121 obtains necessary data from the RAM 122, to execute an arithmetic process. Data corresponding to the arithmetic result is stored into the RAM 122 of the parallel-processing processor 12. The data corresponding to the arithmetic result is transferred from the RAM 122 to the RAM 14 by a DMA method, for example.

FIG. 21 shows an outline of a matrix operation executed by the parallel-processing processor 12. Prior to analyzing waveform data in accordance with the deep learning algorithm 60, calculation of the product of a matrix (matrix operation) is executed. The parallel-processing processor 12 executes in parallel the matrix operations, for example. FIG. 21A shows a calculation formula of the product of a matrix. In the calculation formula shown in FIG. 21A, a matrix c is obtained by a product of a matrix a of n rows×n columns and a matrix b of n rows×n columns. As shown as an example in FIG. 21, the calculation formula is described in a hierarchical loop syntax. FIG. 21B shows an example of arithmetic processes executed in parallel in the parallel-processing processor 12. The calculation formula shown as an example in FIG. 21A can be divided into n×n arithmetic processes, n×n being the number of combinations of a loop variable i for the first hierarchical level and a loop variable j for the second hierarchical level, for example. Such divided arithmetic processes are arithmetic processes that are not dependent on each other, and thus can be executed in parallel.

Figure 22:
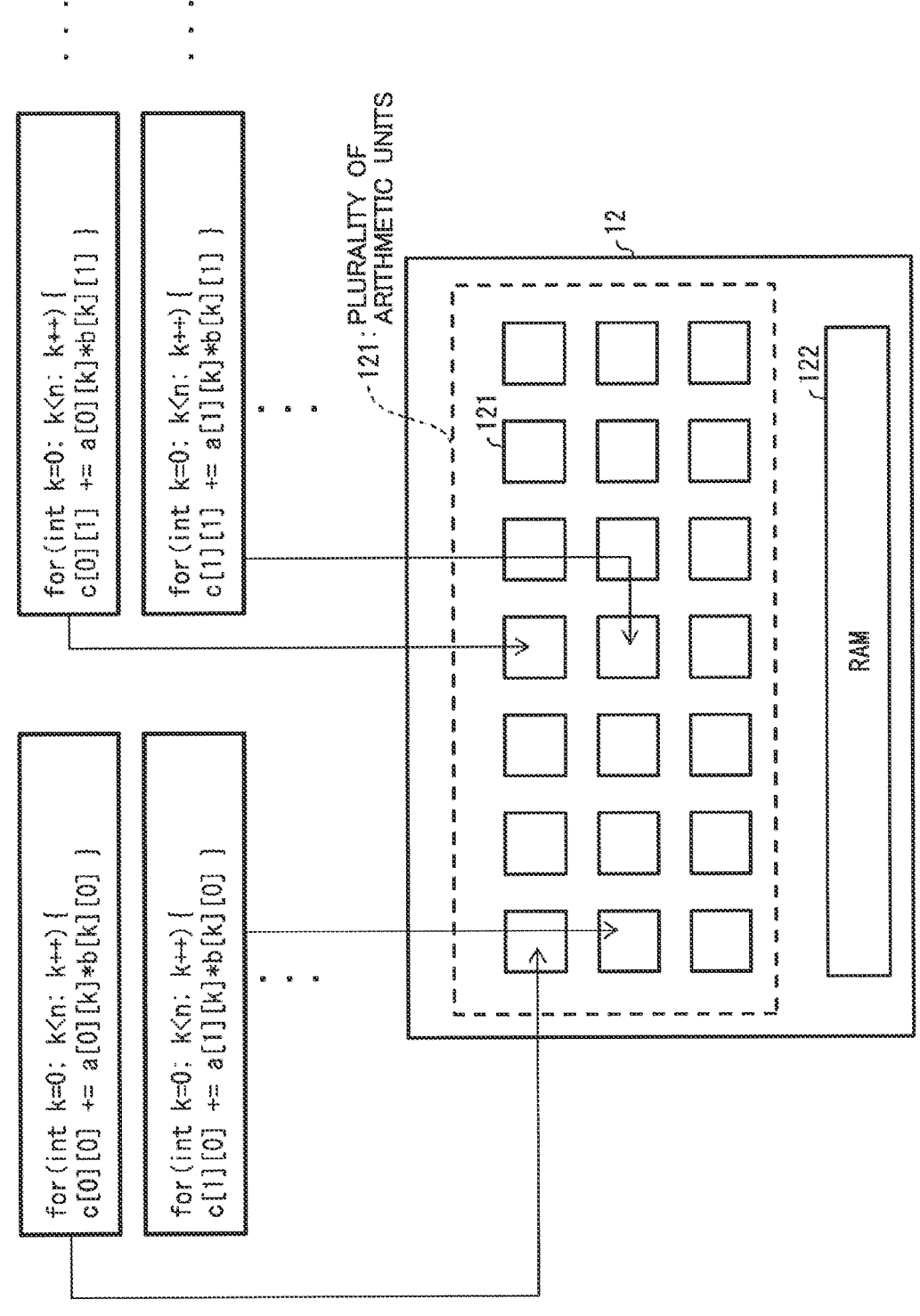
FIG. 22 shows how arithmetic processes are executed in the parallel-processing processor.

FIG. 22 is a conceptual diagram showing that a plurality of arithmetic processes shown as an example in FIG. 21B are executed in the parallel-processing processor 12. As shown in FIG. 22, each of the plurality of arithmetic processes is assigned to one of the plurality of arithmetic units 121 of the parallel-processing processor 12. The respective arithmetic units 121 execute in parallel the assigned arithmetic processes. That is, the respective arithmetic units 121 simultaneously execute the divided arithmetic processes.

As the results of the operations shown as an example in FIG. 21 and FIG. 22, through the operations performed by the parallel-processing processor 12, information regarding the probability at which a cell corresponding to the waveform data belongs to each of a plurality of cell types is obtained, for example. On the basis of the results of the operations, the processor 11, which executes the analysis software 111, performs analysis regarding the cell type of the cell that corresponds to the waveform data. The arithmetic results are stored in the RAM 122 of the parallel-processing processor 12, to be transferred from the RAM 122 to the RAM 14. Then, the processor 11 transmits a measurement result calculated based on the arithmetic results stored in the RAM 14, to the processing unit 300 or the measurement unit 400 via the bus 15 and the interface part 16.

The calculation of the probability at which a cell belongs to each of a plurality of cell types may be performed by a processor different from the parallel-processing processor 12. For example, the arithmetic results may be transferred from the RAM 122 to the RAM 14, and on the basis of the arithmetic results read out from the RAM 14, the processor 11 may calculate the information regarding the probability at which the cell corresponding to each piece of waveform data belongs to each of a plurality of cell types. Alternatively, the arithmetic results may be transferred from the RAM 122 to the processing unit 300, and a processor installed in the processing unit 300 may calculate the information regarding the probability at which the cell corresponding to each piece of waveform data belongs to each of a plurality of cell types.

In the present embodiment, the processes shown in FIG. 21 and FIG. 22 are applied to an arithmetic process (also referred to as a filtering process) regarding a convolution layer in the deep learning algorithm 60, for example.

Figures 23A, 23B:
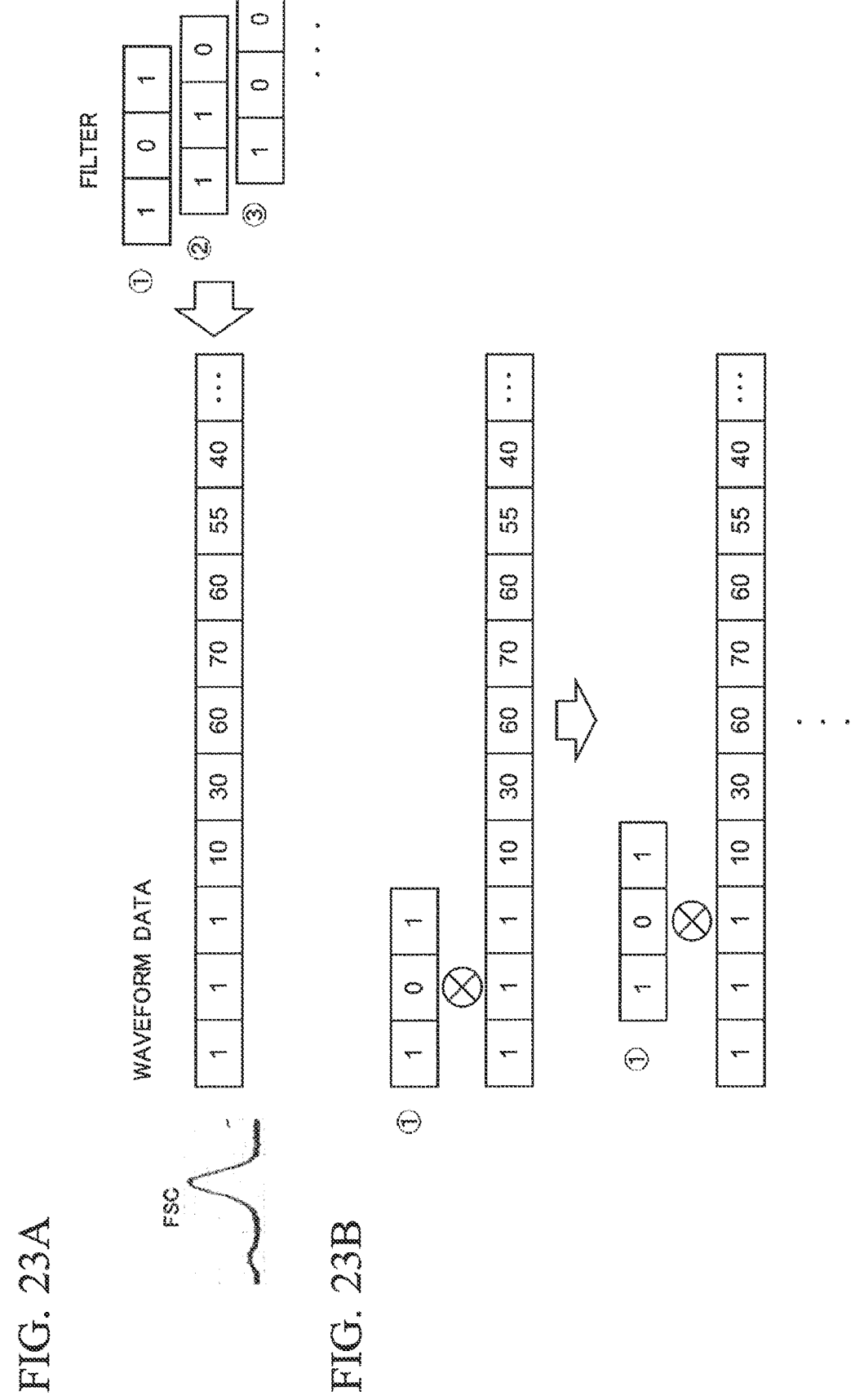
FIG. 23A shows an example of waveform data of forward scattered light as waveform data inputted to a deep learning algorithm.
FIG. 23B shows an outline of a matrix operation between waveform data and a filter.

FIG. 23 shows an outline of an arithmetic process regarding a convolution layer. FIG. 23A shows an example of waveform data of forward scattered light (FSC), as waveform data to be inputted to the deep learning algorithm 60. The waveform data is one-dimensional matrix data (i.e., one-dimensional array data). In the present embodiment, the number of elements of the waveform data is assumed to be n (n is an integer of 1 or greater). FIG. 23A shows a plurality of filters. Each filter is generated through a learning process of the deep learning algorithm 50. Each of the plurality of filters is one-dimensional matrix data indicating features of the waveform data. Although each filter shown in FIG. 23A is matrix data of 1 row×3 columns, the number of columns is not limited to three. A matrix operation is performed on each filter and the waveform data that is inputted to the deep learning algorithm 60, whereby features corresponding to the cell type of the waveform data are calculated. FIG. 23B shows an outline of a matrix operation between waveform data and a filter. As shown in FIG. 23B, a matrix operation is executed while each filter is shifted with respect to the elements of the waveform data, one by one. Calculation of the matrix operation is executed according to Formula 1 below:

$$\sum_{P=0}^{L-1}\sum_{q=0}^{M-1} h_{pq}x_{i+p,j+q} \qquad \text{(Formula 1)}$$

In Formula 1, the suffixes of x are variables that indicate the row number and the column number of the waveform data. The suffixes of h are variables that indicate the row number and the column number of the filter. In the example shown in FIG. 23, the waveform data is one-dimensional matrix data, and the filter is matrix data of 1 row×3 columns, and thus, L=1, M=3, p=0, q=0, 1, 2, i=0, and j=0, 1, ..., n−1.

The parallel-processing processor 12 executes in parallel the matrix operation represented by Formula 1, by means of the plurality of respective arithmetic units 121. On the basis of the arithmetic processes executed by the parallel-processing processor 12, classification information regarding the cell type of each cell is generated. The generated information is transmitted to the processing unit 300 or the measurement unit 400.

The cell analyzer 1 can process the waveform data and identification information so as to be associated with each other. Specifically, the cell analyzer 1 can generate an analysis result (i.e., classification information regarding the cell type of each cell) of the waveform data and identification information so as to be associated with each other. The cell analyzer 1 transmits, to the processing unit 300 or the measurement unit 400, the classification information regarding the cell type of each cell and identification information in association with each other, for example. A plurality of combinations of the identification information (1) to (6) described above may be transmitted to the processing unit 300 or the measurement unit 400 in association with the classification information.

With reference back to FIG. 10, the processing unit 300 is connected to the digital value calculation part 483 via the interface part 489, the bus 485, and the interface part 484, and can receive arithmetic results outputted from the digital value calculation part 483. The interface part 489 is a USB interface, for example. The processing unit 300 can obtain arithmetic results by the processor 11 and the parallel-processing processor 12 from the cell analyzer 1, and can display measurement results based on the arithmetic results. A user such as a doctor or a laboratory technician can analyze the measurement results by operating the processing unit 300. The user can analyze the measurement results by operating the processing unit 300 and generating various types of information regarding the measurement results (e.g., a graph, a chart, and information in addition to the measurement results). The user can analyze the measurement results for each identification information described above while viewing a graph and a chart for each biological sample, or a graph and a chart for each test-related facility 2, for example. In addition, the processing unit 300 may perform control of the apparatus mechanism part 430 including a sampler (not shown) that automatically supplies sample containers, a fluid system for preparation/measurement of a sample, and the like; and other controls.

<Operation of Cell Analyzer>

Figure 24:
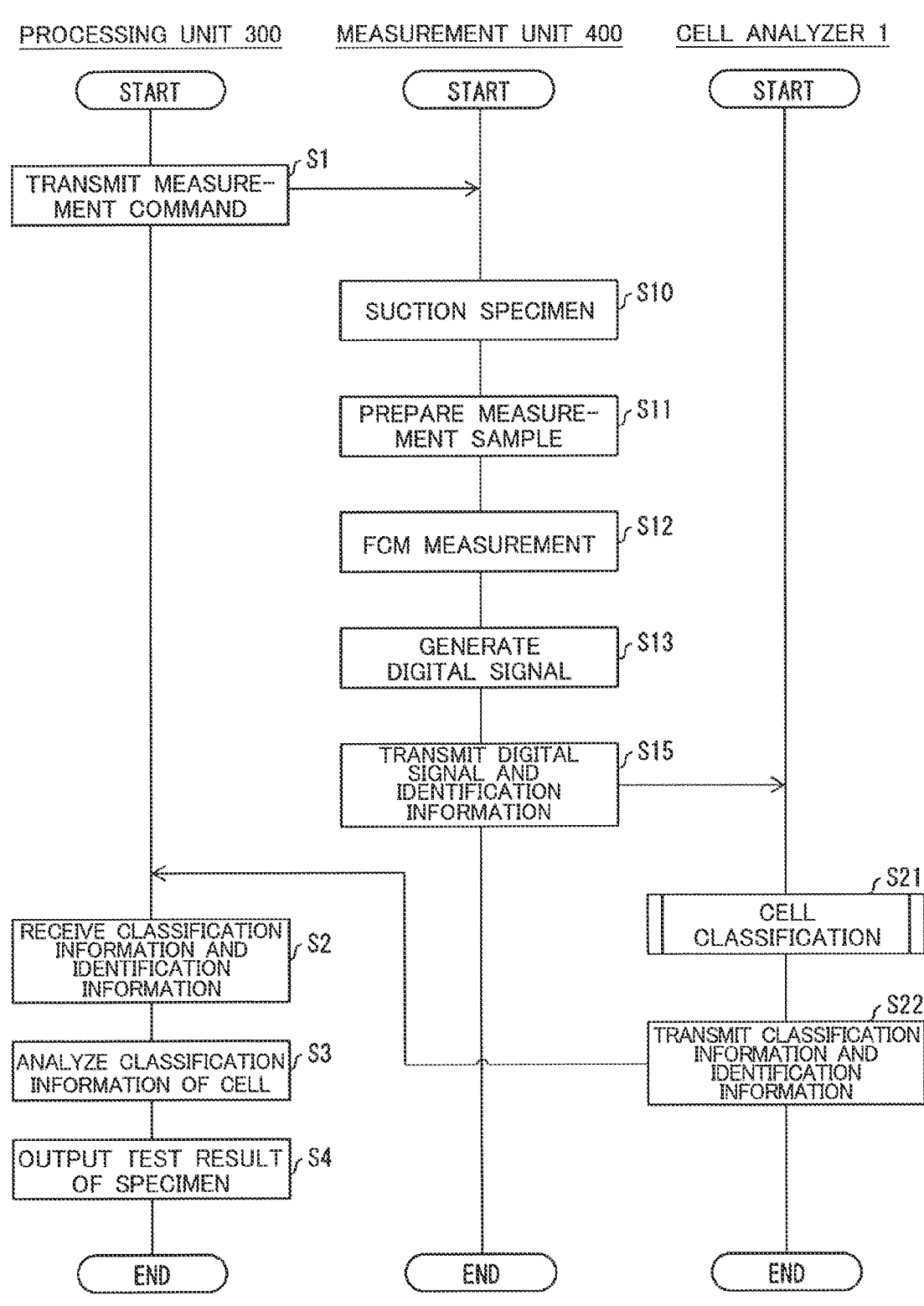
FIG. 24 shows an example of a specimen analysis operation performed by the cell analyzer.
Figure 25:
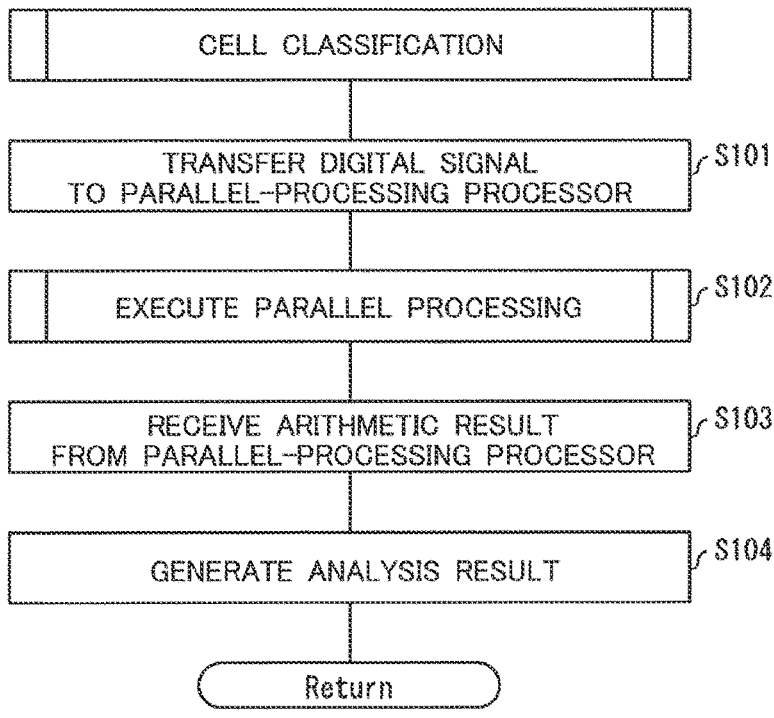
FIG. 25 shows an example of a cell analysis process.
Figure 26:
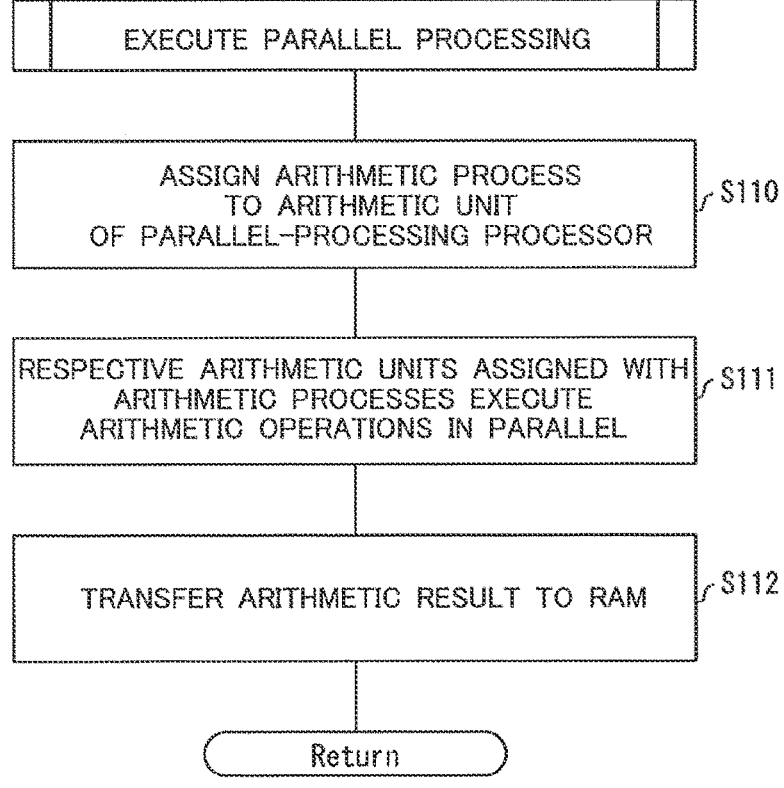
FIG. 26 shows an example of parallel processing.

With reference to FIG. 24 to FIG. 26, a specimen analysis operation performed by the cell analyzer 4000 will be described.

When the processor 3001 of the processing unit 300 has received a measurement instruction including a measurement order from the user via the operation part 3016, the processor 3001 transmits a measurement command to the measurement unit 400 (step S1). The measurement order that the processor 3001 receives from the user includes: a specimen ID of a specimen to be measured; a patient ID corresponding to the specimen; and information of a measurement item (measurement channel) for which measurement is requested. The processor 3001 adds the specimen ID, the patient ID, and the information of the measurement channel into the measurement command, and transmits the measurement command to the measurement unit 400.

Upon receiving the measurement command, the processor 4831 of the measurement unit 400 starts measurement of a specimen. The processor 4831 causes the specimen suction part 450 to suction the specimen from a blood collection tube T (step S10). Next, the processor 4831 causes the specimen suction part 450 to dispense the suctioned specimen into one of the reaction chambers 440a to 440e of the sample preparation part 440. As described above, the measurement command transmitted from the processing unit 300 in step S1 includes the information of the measurement channel for which measurement is requested by the measurement order. On the basis of the information of the measurement channel included in the measurement command, the processor 4831 controls the specimen suction part

450 so as to discharge the specimen into the reaction chamber of the corresponding measurement channel.

The processor 4831 causes the sample preparation part 440 to prepare a measurement sample (step S11). Specifically, upon receiving an order from the processor 4831, the sample preparation part 440 supplies the reagents (hemolytic agent and staining liquid) into the reaction chamber having the specimen discharged therein, to mix the specimen with the reagents. Accordingly, a measurement sample in which red blood cells are hemolyzed by the hemolytic agent and in which cells, such as white blood cells or reticulocytes, serving as the target of the measurement channel are stained by the staining liquid, is prepared in the reaction chamber.

The processor 4831 causes the FCM detector 410 to measure the prepared measurement sample (step S12). Specifically, the processor 4831 controls the apparatus mechanism part 430 to send the measurement sample in the reaction chamber of the sample preparation part 440, to the FCM detector 410. The reaction chamber and the FCM detector 410 are connected to each other by a flow path, and the measurement sample sent from the reaction chamber flows in the flow cell 4113, and is irradiated with laser light by the light source 4111 (see FIG. 12). When a cell contained in the measurement sample passes through the flow cell 4113, light is applied to the cell. Forward scattered light, side scattered light, and side fluorescence generated from the cell are detected by the light receiving elements 4116, 4121, 4122, respectively, and analog signals corresponding to the intensities of the received lights are outputted. The analog signals are outputted to the A/D converter 482 via the analog processing part 420.

The A/D converter 482 samples each analog signal at a predetermined rate, to generate a digital signal including waveform data of each individual cell (step S13). The generation methods for the waveform data and the digital signal have been described above. The processor 4831 stores the digital signal generated by the A/D converter 482 into storage 460.

The processor 4831 transmits the digital signal stored in the storage 460 and identification information to the cell analyzer 1 (step S14). The processor 4831 adds, to the digital signal stored in the storage 460, identification information corresponding to the digital signal, and transmits the digital signal with the identification information to the cell analyzer 1 via the interface part 490, the intra-network 3, or the Internet 9. The identification information includes, in addition to the patient ID, the specimen ID, and the information of the measurement channel, an apparatus ID that is information unique to the cell measuring apparatus 4000.

Upon receiving the digital signal and the identification information from the processor 4831 of the measurement unit 400, the processor 11 of the cell analyzer 1 performs cell classification on the received digital signal on the basis of the deep learning algorithm 60 (step S21). The cell classification will be described later in detail. The processor 11 transmits an analysis result 83 including classification information 82 of each individual cell obtained as a result of step S21, to the processing unit 300 together with the identification information (step S22). More specifically, the processor 11 transmits the analysis result 83 to the processing unit 300 of the cell measuring apparatus 4000 specified by the apparatus ID included in the identification information. The identification information transmitted to the processing unit 300 together with the analysis result 83 may include the patient ID, the specimen ID, and the information of the measurement channel, but may not necessarily include the apparatus ID. As for the analysis result 83, an analysis result

83 of each of a plurality of cells contained in one specimen is sent, in association with the above-described identification information, to the processing unit 300.

Upon receiving the analysis results 83 from the cell analyzer 1, the processor 3001 of the processing unit 300 analyzes the analysis results 83 by using a program stored in the storage 3004, and generates a test result of the specimen (step S3). In the process of S3, for example, on the basis of the label values included in the analysis results 83 of the individual cells, the number of cells is counted for each cell type. For example, with respect to one specimen, when there are N pieces of classification information provided with a label value "1" which indicates neutrophil, a counting result that the number of neutrophils=N, is obtained as a test result of the specimen.

The processor 3001 obtains a counting result regarding a measurement item corresponding to the measurement channel on the basis of the analysis results 83, and stores the counting result, together with the identification information, into the storage 3004. The measurement item corresponding to the measurement channel is an item of which the counting result is requested by the measurement order. For example, a measurement item corresponding to the DIFF channel is the numbers of five classifications of white blood cells, i.e., monocytes, neutrophils, lymphocytes, eosinophils, and basophils. A measurement item corresponding to the RET channel is the number of reticulocytes. A measurement item corresponding to PLT-F is the number of platelets. A measurement item corresponding to WPC is the number of hematopoietic progenitor cells. A measurement item corresponding to WNR is the numbers of white blood cells and nucleated erythrocytes. The counting result is not limited to that of an item (also referred to as "reportable item") for which measurement as listed above is requested, and can include a counting result of another cell of which measurement can be performed in the same measurement channel. For example, when the measurement channel is DIFF, as shown in FIG. 4, immature granulocytes (IG) and abnormal cells are also included in the counting result in addition to the five classifications of white blood cells. Further, the processor 3001 analyzes the obtained counting result to generate a test result of the specimen, and stores the result into the storage 3004. The analysis of the counting result includes performing determination as to, for example, whether the counting result is in a normal value range, whether any abnormal cell has been detected, whether difference from the previous test result is in an allowable range, and the like.

The processor 3001 displays the generated test result on the display part 3015 (step S4). The test result is displayed together with the identification information that is associated with the analysis result 83 being the source of the test result. Specifically, the test result is displayed together with the patient ID, the specimen ID, the measurement channel, and the apparatus ID. The identification information to be displayed with the test result may be at least one of them.

Next, with reference to FIG. 25, a process of cell classification in step S21 will be described. The process of cell classification in step S21 is a process performed by the processor 11 in accordance with operation of the analysis software 111. The processor 11 causes each digital signal taken into the RAM 14 in step S13, to be transferred to the parallel-processing processor 12 (S101). As shown in FIG. 20, the processor 11 causes the digital signal to be DMA-transferred from the RAM 14 to the RAM 122. For example, the processor 11 controls the bus controller 181 to DMA-transfer the digital signal from the RAM 14 to the RAM 122.

The processor 11 instructs the parallel-processing processor 12 to execute parallel processing onto the waveform data included in the digital signal (S102). The processor 11 instructs the execution of parallel processing by calling a kernel function of the parallel-processing processor 12, for example. The process executed by the parallel-processing processor 12 will be described later with reference to a flowchart shown as an example in FIG. 26. The processor 11 instructs the parallel-processing processor 12 to execute a matrix operation regarding the deep learning algorithm 60, for example. The digital signal is decomposed into a plurality of pieces of waveform data, to be sequentially inputted to the deep learning algorithm 60. An index corresponding to each cell and included in the digital signal is not inputted to the deep learning algorithm 60. The waveform data inputted to the deep learning algorithm 60 is subjected to operations performed by the parallel-processing processor 12.

The processor 11 receives results of arithmetic operations executed by the parallel-processing processor 12 (S103). The arithmetic results are DMA-transferred from the RAM 122 to the RAM 14 as shown in FIG. 20, for example.

On the basis of the arithmetic results by the parallel-processing processor 12, the processor 11 generates an analysis result of the cell type of each measured cell (S104).

FIG. 26 shows an operation example of the arithmetic processes of the parallel-processing processor 12 executed on the basis of an instruction from the analysis software 111.

The processor 11, which executes the analysis software 111, causes the parallel-processing processor 12 to execute assignment of arithmetic processes to the arithmetic units 121 (S110). For example, the processor 11 causes the parallel-processing processor 12 to execute assignment of arithmetic processes to the arithmetic units 121 by calling a kernel function of the parallel-processing processor 12. As shown in FIG. 20, for example, a matrix operation regarding the deep learning algorithm 60 is divided into a plurality of arithmetic processes, and the respective divided arithmetic processes are assigned to the arithmetic units 121. A plurality of pieces of waveform data are sequentially inputted to the deep learning algorithm 60. A matrix operation corresponding to the waveform data is divided into a plurality of arithmetic processes, to be assigned to the arithmetic units 121.

The arithmetic processes are processed in parallel by a plurality of arithmetic units 121 (S111). The arithmetic processes are executed on the plurality of pieces of waveform data.

Arithmetic results generated through the parallel processing by the plurality of arithmetic units 121 are transferred from the RAM 122 to the RAM 14 (S112). For example, the arithmetic results are DMA-transferred from the RAM 122 to the RAM 14.

<Second Cell Measuring Apparatus, and Measurement of Biological Sample in Second Cell Measuring Apparatus>

As a configuration example of the second cell measuring apparatus 4000', an example of a block diagram of a urine particle analyzer or a body fluid analyzer in which the measurement unit 500 is a flow cytometer for measuring a urine sample or a body fluid sample, is shown.

Figure 27:
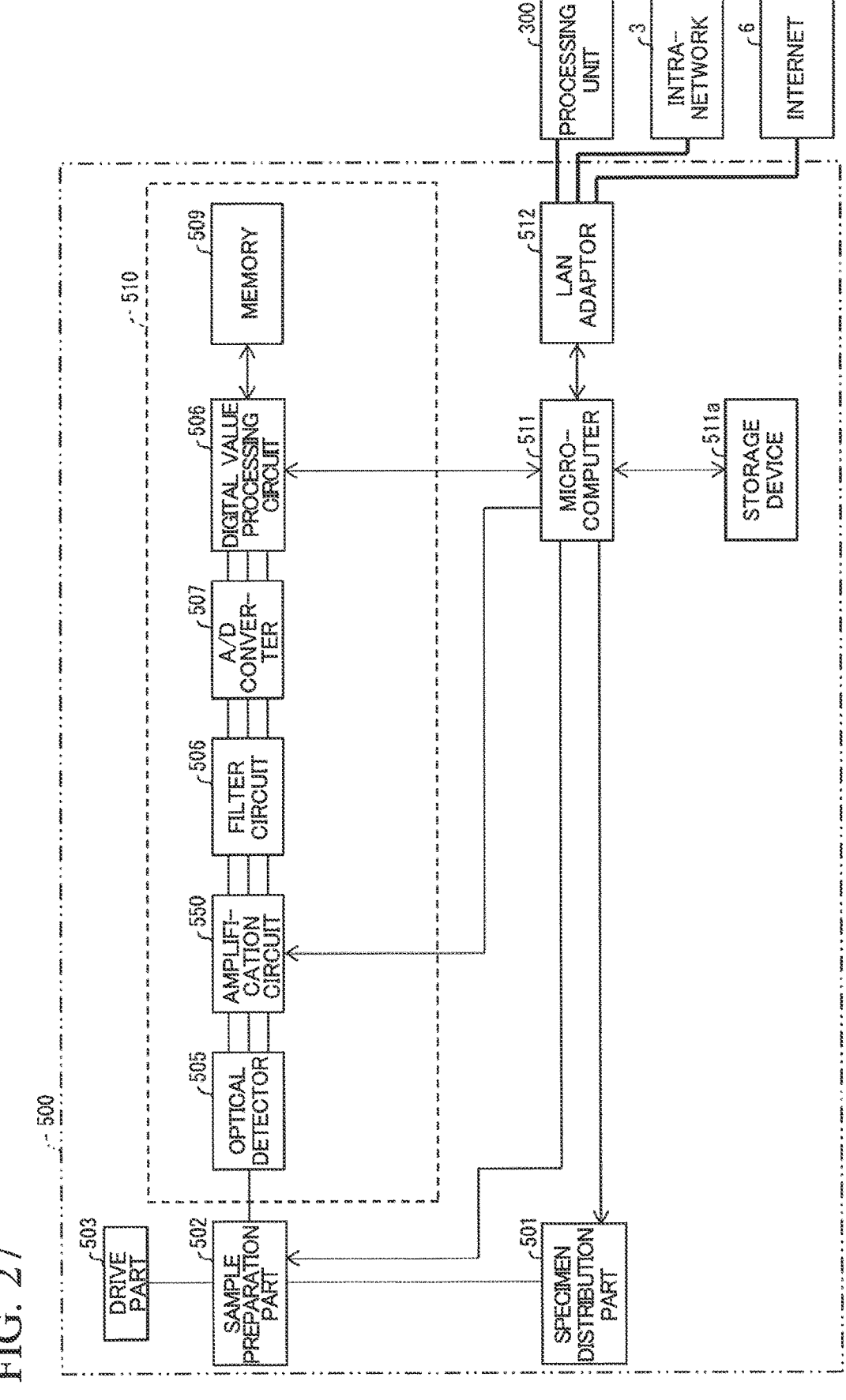
FIG. 27 shows an example of a block diagram of a measurement unit.

FIG. 27 is an example of a block diagram of the measurement unit 500. In FIG. 27, the measurement unit 500 includes: a specimen distribution part 501; a sample preparation part 502; an optical detector 505; an amplification circuit 550 which amplifies an output signal (an output signal amplified by a preamplifier) of the optical detector 505; a filter circuit 506 which performs a filtering process on the output signal from the amplification circuit 550; an A/D converter 507 which converts an output signal (analog signal) of the filter circuit 506 into a digital signal; a digital value processing circuit 508 which performs a predetermined process on the digital signal; a memory 509 connected to the digital value processing circuit 508; a microcomputer 511 connected to the specimen distribution part 501, the sample preparation part 502, the amplification circuit 550, the digital value processing circuit 508, and a storage device 511*a*; and a LAN (Local Area Network) adaptor 512 connected to the microcomputer 511.

The processing unit 300 is connected to the measurement unit 500 by a LAN cable via the LAN adaptor 512, for example. By this processing unit 300, analysis of measurement data obtained by the measurement unit 500 is performed. The optical detector 505, the amplification circuit 550, the filter circuit 506, the A/D converter 507, the digital value processing circuit 508, and the memory 509 form an optical measurement part 510 which measures a measurement sample and generates measurement data.

The measurement unit 500 can access the intra-network 3 or the Internet 6 via the LAN adaptor 512 to communicate with the cell analyzer 1. The measurement unit 500 transmits the obtained waveform data to the cell analyzer 1. The measurement unit 500 or the processing unit 300 transmits, to the cell analyzer 1, the waveform data and identification information in association with each other. Examples of the identification information include: (1) identification information of a biological sample corresponding to the waveform data; (2) identification information of a cell corresponding to the waveform data; (3) identification information of a patient corresponding to the waveform data; (4) identification information of a test corresponding to the waveform data; (5) identification information of a cell analyzer by which the waveform data has been measured; and (6) identification information of a test-related facility 2 where the waveform data has been measured. When the measurement unit 500 receives a test order from, for example, an LIS or the processing unit 300, the measurement unit 500 can obtain at least one of the above identification information (1) to (6) or a combination thereof from the LIS or the processing unit 300. For example, at least one of (1) to (6) shown as examples is transmitted to the cell analyzer 1 in association with the waveform data. A plurality of combinations of (1) to (6) shown as examples may be transmitted to the cell analyzer 1 in combination with the waveform data.

Figures 28, 29:
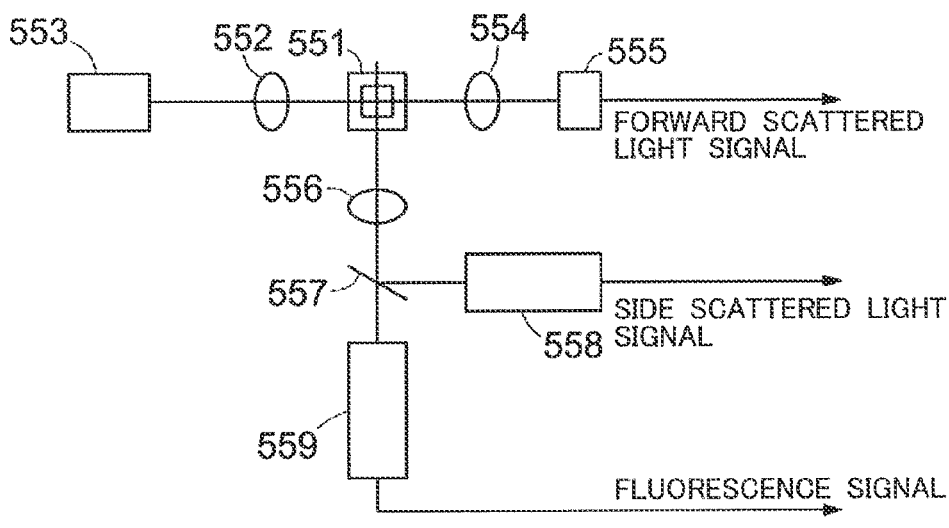
FIG. 28 shows a schematic example of an outline of an optical system of a flow cytometer.
FIG. 29 shows a schematic example of an outline of a sample preparation part of a measurement unit.

FIG. 28 shows a configuration of the optical detector 505 of the measurement unit 500. In FIG. 28, a condenser lens 552 condenses, to a flow cell 551, laser light emitted from a semiconductor laser light source 553 serving as a light source, and a condenser lens 554 condenses, to a forward scattered light receiving part 555, forward scattered light emitted from a particle in a measurement sample. Another condenser lens 556 condenses, to a dichroic mirror 557, side scattered light and fluorescence emitted from the particle. The dichroic mirror 557 reflects the side scattered light to a side scattered light receiving part 558, and allows the fluorescence to pass therethrough toward a fluorescence receiving part 559. These light signals reflect characteristics of the particle in the measurement sample. The forward scattered light receiving part 555, the side scattered light receiving part 558, and the fluorescence receiving part 559 convert the light signals into electric signals, and output a forward scattered light signal, a side scattered light signal, and a fluorescence signal, respectively. These outputs are amplified by a preamplifier, and then subjected to the subsequent processing. As for each of the forward scattered light receiving part 555, the side scattered light receiving part 558, and the fluorescence receiving part 559, a low sensitivity output and a high sensitivity output can be switched through switching of the drive voltage. Switching of these sensitivities is performed by the microcomputer 511. In the present embodiment, a photodiode may be used as the forward scattered light receiving part 555, photomultiplier tubes may be used as the side scattered light receiving part 558 and fluorescence receiving part 559, or photodiodes may be used as the side scattered light receiving part 558 and the fluorescence receiving part 559. The fluorescence signal outputted from the fluorescence receiving part 559 is amplified by a preamplifier, and then provided to branched two signal channels. The two signal channels are connected to the amplification circuit 550 described above with reference to FIG. 27. The fluorescence inputted to one of the signal channels is amplified by the amplification circuit 550 so as to have a high sensitivity.

(Preparation of Measurement Sample)

FIG. 29 is a schematic diagram showing a function configuration of the sample preparation part 502 and the optical detector 505 shown in FIG. 27. The specimen distribution part 501 shown in FIG. 27 and FIG. 29 includes a suction tube 517 and a syringe pump. The specimen distribution part 501 suctions a specimen (urine or body fluid) 00b via the suction tube 517, and dispenses the specimen into the sample preparation part 502. The sample preparation part 502 includes a reaction chamber 512u and a reaction chamber 512b. The specimen distribution part 501 distributes a quantified measurement sample to each of the reaction chamber 512u and the reaction chamber 512b.

In the reaction chamber 512u, the distributed biological sample is mixed with a first reagent 519u as a diluent and a third reagent 518u that contains a dye. Due to the dye contained in the third reagent 518u, particles in the biological sample are stained. When the biological sample is urine, the sample prepared in the reaction chamber 512u is used as a first measurement sample for analyzing urine particles that are relatively large, such as red blood cells, white blood cells, epithelial cells, or tumor cells. When the biological sample is body fluid, the sample prepared in the reaction chamber 512u is used as a third measurement sample for analyzing red blood cells in the body fluid.

Meanwhile, in the reaction chamber 512b, the distributed biological sample is mixed with a second reagent 519b as a diluent and a fourth reagent 518b that contains a dye. As described later, the second reagent 519b has a hemolytic action. Due to the dye contained in the fourth reagent 518b, particles in the biological sample are stained. When the biological sample is urine, the sample prepared in the reaction chamber 512b serves as a second measurement sample for analyzing bacteria in the urine. When the biological sample is body fluid, the sample prepared in the reaction chamber 512b serves as a fourth measurement sample for analyzing nucleated cells (white blood cells and large cells) and bacteria in the body fluid.

A tube extends from the reaction chamber 512u to the flow cell 551 of the optical detector 505, whereby the measurement sample prepared in the reaction chamber 512u can be supplied to the flow cell 551. A solenoid valve 521u is provided at the outlet of the reaction chamber 512u. A tube also extends from the reaction chamber 512b, and this tube is connected to a portion of the tube extending from the reaction chamber 512u. Accordingly, the measurement sample prepared in the reaction chamber 512b can be supplied to the flow cell 551. A solenoid valve 521b is provided at the outlet of the reaction chamber 512b.

The tube extended from the reaction chambers 512u, 512b to the flow cell 551 is branched before the flow cell 551, and a branched tube is connected to a syringe pump 520a. A solenoid valve 521c is provided between the syringe pump 520a and the branch point.

Between the connection point of the tubes extending from the respective reaction chambers 512u, 512b and the branch point, the tube is further branched, and a branched tube is connected to a syringe pump 520b. Between the branch point of the tube extending to the syringe pump 520b and the connection point, a solenoid valve 521d is provided.

The sample preparation part 502 has connected thereto a sheath liquid storing part 522 which stores a sheath liquid, and the sheath liquid storing part 522 is connected to the flow cell 551 by a tube. The sheath liquid storing part 522 has connected thereto a compressor 522a, and when the compressor 522a is driven, compressed air is supplied to the sheath liquid storing part 522, and the sheath liquid is supplied from the sheath liquid storing part 522 to the flow cell 551.

As for the two kinds of suspensions (measurement samples) prepared in the respective reaction chambers 512u, 512b, the suspension (the first measurement sample when the biological sample is urine; the third measurement sample when the biological sample is body fluid) in the reaction chamber 512u is led to the optical detector 505, to form a thin flow enveloped by the sheath liquid in the flow cell 551, and laser light is applied to the thin flow. Then, in a similar manner, the suspension (the second measurement sample when the biological sample is urine; the fourth measurement sample when the biological sample is body fluid) in the reaction chamber 512b is led to the optical detector 505, to form a thin flow in the flow cell 551, and laser light is applied to the thin flow. Such operations are automatically performed by causing the solenoid valves 521a, 521b, 521c, 521d, a drive part 503, and the like to operate by control of the microcomputer 511 (controller).

The first reagent to the fourth reagent will be described in detail. The first reagent 519u is a reagent having a buffer as a main component, contains an osmotic pressure compensation agent so as to allow obtainment of a stable fluorescence signal without hemolyzing red blood cells, and is adjusted to have 100 to 600 mOsm/kg so as to realize an osmotic pressure suitable for classification measurement. Preferably, the first reagent 519u does not have a hemolytic action on red blood cells in urine.

Different from the first reagent 519u, the second reagent 519b has a hemolytic action. This is for facilitating passage of the later-described fourth reagent 518b through cell membranes of bacteria so as to promote staining. Further, this is also for contracting contaminants such as mucus fibers and red blood cell fragments. The second reagent 519b contains a surfactant in order to acquire a hemolytic action. As the surfactant, a variety of anionic, nonionic, and cationic surfactants can be used, but a cationic surfactant is particularly suitable. Since the surfactant can damage the cell membranes of bacteria, nucleic acids of bacteria can be efficiently stained by the dye contained in the fourth reagent 518b. As a result, bacteria measurement can be performed through a short-time staining process.

As still another embodiment, the second reagent 519b may acquire a hemolytic action not by a surfactant but by being adjusted to be acidic or to have a low pH. Having a low pH means that the pH is lower than that of the first reagent 519u. When the first reagent 519u is in a range of neutral or weakly acidic to weakly alkaline, the second reagent 519*b* is acidic or strongly acidic. When the pH of the first reagent 519*u* is 6.0 to 8.0, the pH of the second reagent 519*b* is lower than that, and is preferably 2.0 to 6.0.

The second reagent 519*b* may contain a surfactant and be adjusted to have a low pH.

As still another embodiment, the second reagent 519*b* may acquire a hemolytic action by having a lower osmotic pressure than the first reagent 519*u*.

Meanwhile, the first reagent 519*u* does not contain any surfactant. In another embodiment, the first reagent 519*u* may contain a surfactant, but the kind and concentration thereof need to be adjusted so as not to hemolyze red blood cells. Therefore, preferably, the first reagent 519*u* does not contain the same surfactant as that of the second reagent 519*b*, or even if the first reagent 519*u* contains the same surfactant as that of the second reagent 519*b*, the concentration of the surfactant in the first reagent 519*u* is lower than that in the second reagent 519*b*.

The third reagent 518*u* is a staining reagent for use in measurement of urine particles (red blood cells, white blood cells, epithelial cells, casts, or the like). As the dye contained in the third reagent 518*u*, a dye that stains membranes is selected in order to also stain particles that do not have nucleic acids. Preferably, the third reagent 518*u* contains an osmotic pressure compensation agent for the purpose of preventing hemolysis of red blood cells and for the purpose of obtaining a stable fluorescence intensity, and is adjusted to have 100 to 600 mOsm/kg so as to realize an osmotic pressure suitable for classification measurement. The cell membrane and nucleus (membrane) of urine particles are stained by the third reagent 518*u*. As the staining reagent containing a dye that stains membranes, a condensed benzene derivative is used, and a cyanine-based dye can be used, for example. The third reagent 518*u* stains not only cell membranes but also nuclear membranes. When the third reagent 518*u* is used in nucleated cells such as white blood cells and epithelial cells, the staining intensity in the cytoplasm (cell membrane) and the staining intensity in the nucleus (nuclear membrane) are combined, whereby the staining intensity becomes higher than in the urine particles that do not have nucleic acids. Accordingly, nucleated cells such as white blood cells and epithelial cells can be discriminated from urine particles that do not have nucleic acids such as red blood cells. As the third reagent, the reagents described in US Patent Publication No. 5891733 can be used. US Patent Publication No. 5891733 is incorporated herein by reference. The third reagent 518*u* is mixed with urine or body fluid, together with the first reagent 519*u*.

The fourth reagent 518*b* is a staining reagent that can accurately measure bacteria even when the specimen contains contaminants having sizes equivalent to those of bacteria and fungi. The fourth reagent 518*b* is described in detail in EP Patent Application Publication No. 1136563. As the dye contained in the fourth reagent 518*b*, a dye that stains nucleic acids is suitably used. As the staining reagent containing a dye that stains nuclei, the cyanine-based dye of U.S. Pat. No. 7,309,581 can be used, for example. The fourth reagent 518*b* is mixed with urine or a specimen, together with the second reagent 519*b*. EP Patent Application Publication No. 1136563 and U.S. Pat. No. 7,309,581 are incorporated herein by reference. Therefore, preferably, the third reagent 518*u* contains a dye that stains cell membranes, whereas the fourth reagent 518*b* contains a dye that stains nucleic acids. Urine particles may include those that do not have a nucleus, such as red blood cells. Therefore, by the third reagent 518*u* containing a dye that stains cell membranes, urine particles including those that do not have a nucleus can be detected. Since the second reagent can damage cell membranes of bacteria, nucleic acids of bacteria and fungi can be efficiently stained by the dye contained in the fourth reagent 518*b*. As a result, bacteria measurement can be performed through a short-time staining process.

As shown in FIG. 12 and FIG. 28, the measurement unit 400 or the measurement unit 500 includes the flow cell 4113, 551. In the measurement unit 400 or the measurement unit 500, a biological sample is sent to the flow cell 4113, 551. The biological sample supplied to the flow cell 4113, 551 is irradiated with light from the light source 4112, 553, and forward scattered light, side scattered light, and side fluorescence emitted from each cell in the biological sample are detected by the light detectors (4116, 4121, 4122, 555, 558, 559). Signals may be transmitted from the light detectors (4116, 4121, 4122, 555, 558, 559) to the cell analyzer 1. The cell analyzer 1 obtains waveform data from the forward scattered light, the side scattered light, and the side fluorescence detected by the light detectors (4116, 4121, 4122, 555, 558, 559).

<Function Block and Processing Procedure>

(Deep Learning Process)

Figure 30:
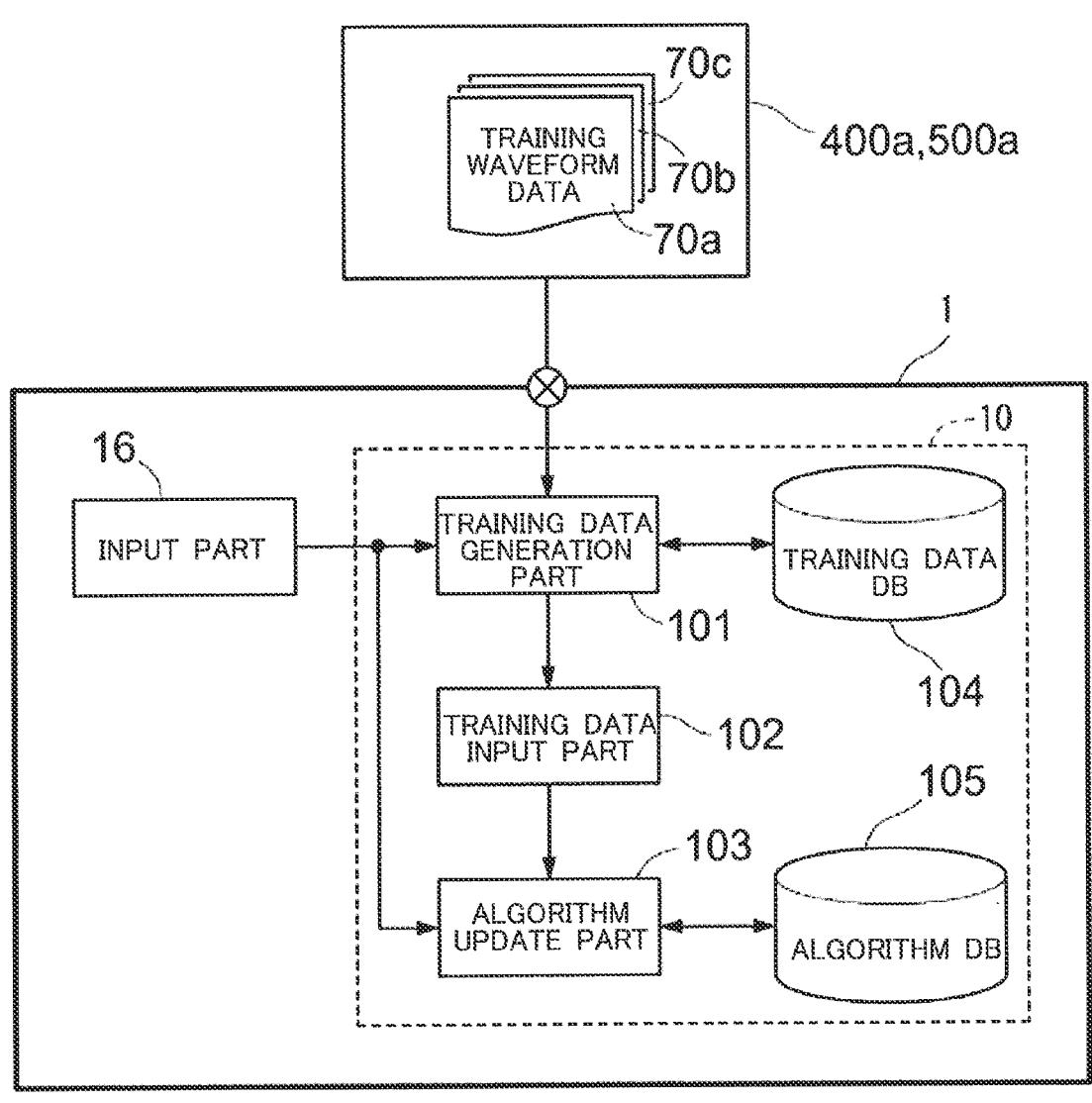
FIG. 30 shows an example of a function block diagram of a cell analyzer performing deep learning.

FIG. 30 shows an example of a function block of the cell analyzer 1 performing deep learning. With reference to FIG. 30, the processing part 10 of the cell analyzer 1 according to the present embodiment includes a training data generation part 101, a training data input part 102, and an algorithm update part 103. These function blocks are realized when a program for causing a computer to execute the deep learning process is installed in the storage 13 of the processing part 10, and the program is executed by the processor 11 and the parallel-processing processor 12. A training data database (DB) 104 and an algorithm database (DB) 105 are stored in the storage 13 or the memory 12 of the processing part 10. A training data database (DB) 104 and an algorithm database (DB) 105 are stored in the storage 13 or the RAM 14 of the processing part 10.

Training waveform data 72*a*, 72*b*, 72*c* is obtained in advance by the measurement unit 400, 500, for example, and is stored in advance in the storage 13 or the RAM 14 of the processing part 10.

Figure 31:
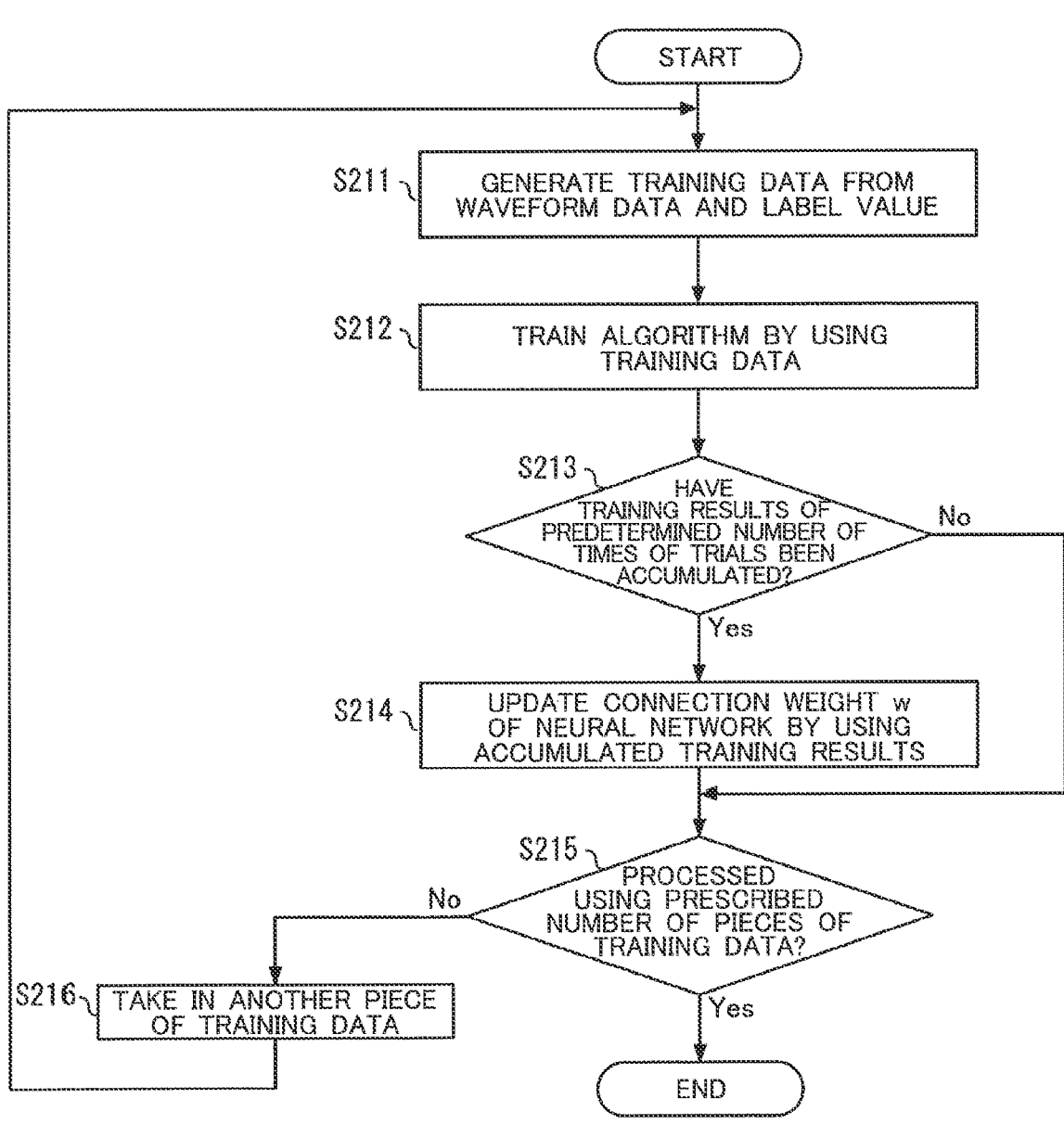
FIG. 31 shows an example of a flowchart of operation of a processing part for generating training data.

The processing part 10 performs the processes shown in FIG. 31. With reference to the function blocks shown in FIG. 30, the processes of steps S211, S214, and S216 shown in FIG. 31 are performed by the training data generation part 101. The process of step S212 is performed by the training data input part 102. The processes of steps S213 and S215 are performed by the algorithm update part 103.

With reference to FIG. 31, an example of the deep learning process performed by the processing part 10 will be described. First, the processing part 10 obtains the training waveform data 70*a*, 70*b*, 70*c*. The training waveform data 70*a* is waveform data of forward scattered light, the training waveform data 70*b* is waveform data of side scattered light, and the training waveform data 70*c* is waveform data of side fluorescence. The training waveform data 70*a*, 70*b*, 70*c* is obtained, for example, through operation by an operator, from the measurement unit 400, 500, from the storage medium, or via the interface part 490 through a communication network. When the training waveform data 70*a*, 70*b*, 70*c* is obtained, information regarding which cell type the training waveform data 70*a*, 70*b*, 70*c* indicates is also obtained. The information regarding which cell type is indicated may be associated with the training waveform data 70*a*, 70*b*, 70*c*, or may be inputted by the operator.

In step S211, the processing part 10 generates the training data 75 from the waveform data 72a, 72b, 72c and the label value 77.

In step S212, the processing part 10 trains the neural network 50 by using the training data 75. The training result of the neural network 50 is accumulated every time training is performed by using a plurality of pieces of the training data 75.

In the cell type analysis method according to the present embodiment, a convolutional neural network is used, and a stochastic gradient descent method is used. Therefore, in step S213, the processing part 10 determines whether or not training results of a previously set predetermined number of times of trials have been accumulated. When the training results of the predetermined number of times of trials have been accumulated (YES), the processing part 10 advances to the process of step S214. When the training results of the predetermined number of times of trials have not been accumulated (NO), the processing part 10 advances to the process of step S215.

Next, when the training results of the predetermined number of times of trials have been accumulated, the processing part 10 updates, in step S214, connection weight w of the neural network 50, by using the training results accumulated in step S212. In the cell type analysis method according to the present embodiment, since the stochastic gradient descent method is used, the connection weight w of the neural network 50 is updated at the stage where the learning results of the predetermined number of times of trials have been accumulated. Specifically, the process of updating the connection weight w is a process of performing calculation according to the gradient descent method, represented by Formula 12 and Formula 13 described later.

In step S215, the processing part 10 determines whether or not the neural network 50 has been trained using a prescribed number of pieces of training data 75. When the training has been performed using the prescribed number of pieces of training data 75 (YES), the deep learning process ends.

When the neural network 50 has not been trained using the prescribed number of pieces of training data 75 (NO), the processing part 10 advances from step S215 to step S216, and performs the processes from step S211 to step S215 with respect to the next training waveform data.

In accordance with the processes described above, the neural network 50 is trained, whereby the deep learning algorithm 60 is obtained.

(Structure of Neural Network)

Figure 32A:
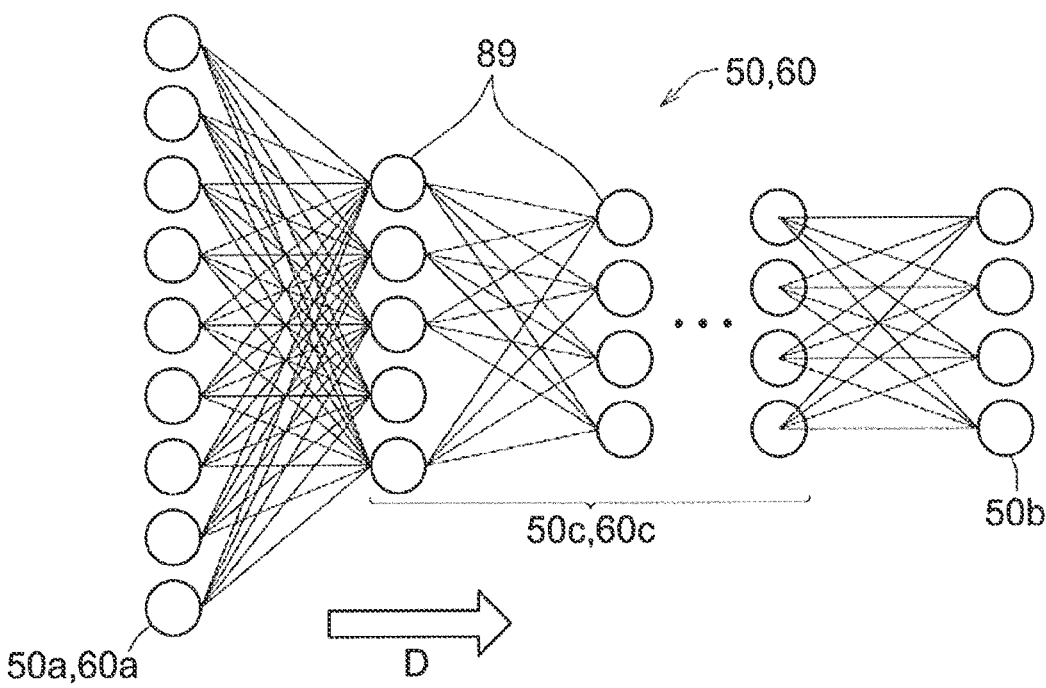
FIG. 32A shows a schematic diagram showing an outline of the neural network.

As described above, a convolutional neural network is used in the present embodiment. FIG. 32A shows an example of the structure of the neural network 50. The neural network 50 includes the input layer 50a, the output layer 50b, and the middle layer 50c between the input layer 50a and the output layer 50b. The middle layer 50c is composed of a plurality of layers. The number of layers forming the middle layer 50c can be, for example, 5 or greater, preferably 50 or greater, and more preferably 100 or greater.

In the neural network 50, a plurality of nodes 89 arranged in a layered manner are connected between the layers. Accordingly, information is propagated only in one direction indicated by an arrow D in the drawing, from the input-side layer 50a to the output-side layer 50b.

(Arithmetic Operation at Each Node)

Figure 32B:
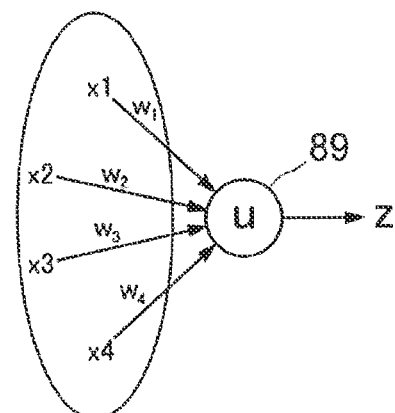
FIG. 32B shows a schematic diagram showing an arithmetic operation at each node.

FIG. 32B is a schematic diagram showing arithmetic operations performed at each node. Each node 89 receives a plurality of inputs, and calculates one output (z). In the case of the example shown in FIG. 32B, the node 89 receives four inputs. The total input (u) received by the node 89 is represented by Formula 2 below as an example. In the present embodiment, one-dimensional matrix data is used as the training data 75 and the analysis data 85. Therefore, when variables of the arithmetic expression correspond to two-dimensional matrix data, a process of converting the variables so as to correspond to one-dimensional matrix data is performed:

$$u = w_1 x_1 + w_2 x_2 + w_3 x_3 + w_4 x_4 + b \qquad \text{(Formula 2)}$$

Each input is multiplied by a different weight. In Formula 2, b is a value referred to as bias. The output (z) of the node serves as an output of a predetermined function f with respect to the total input (u) represented by Formula 2, and is represented by Formula 3 below. The function f is referred to as an activation function:

$$z = f(u) \qquad \text{(Formula 3)}$$

Figure 32C:
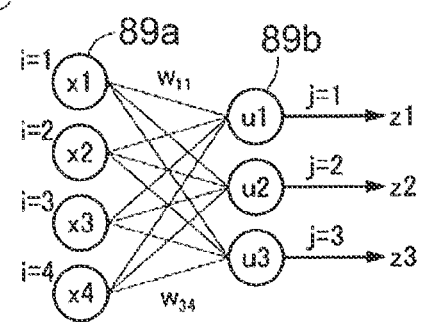
FIG. 32C shows a schematic diagram showing arithmetic operations between nodes.

FIG. 32C is a schematic diagram showing arithmetic operations between nodes. In the neural network 50, nodes that each output a result (z) represented by Formula 3, with respect to the total input (u) to the node 89 represented by Formula 2, are arranged in a layered manner. The outputs of the nodes of the previous layer serve as inputs to nodes of the next layer. In the example shown in FIG. 32C, the outputs of node 89a in the left layer serve as inputs to nodes 89b in the right layer. Each node 89b receives outputs from the nodes 89a. The connection between each node 89a and each node 89b is multiplied by a different weight. When the respective outputs from the plurality of nodes 89a are defined as x1 to x4, the inputs to the respective three nodes 89b are represented by Formula 4-1 to Formula 4-3 below:

$$u_1 = w_{11} x_1 + w_{12} x_2 + w_{13} x_3 + w_{14} x_4 + b_1 \qquad \text{(Formula 4-1)}$$

$$u_2 = w_{21} x_1 + w_{22} x_2 + w_{23} x_3 + w_{24} x_4 + b_1 \qquad \text{(Formula 4-2)}$$

$$u_3 = w_{31} x_1 + w_{32} x_2 + w_{33} x_3 + w_{34} x_4 + b_1 \qquad \text{(Formula 4-3)}$$

When Formula 4-1 to Formula 4-3 are generalized, Formula 4-4 is obtained. Here, i=1, . . . , I, j=1, . . . , J (I is the total number of inputs, and J is the total number of outputs):

$$u_j = \sum_{i=1}^{j} w_{ji} x_i + b_j \qquad \text{(Formula 4-4)}$$

When Formula 4-4 is applied to the activation function, an output is obtained. The output is represented by Formula 5 below:

$$z_j = f(u_j)(j=1,2,3) \qquad \text{(Formula 5)}$$

(Activation Function)

In the cell type analysis method according to the embodiment, a rectified linear unit function is used as the activation function. The rectified linear unit function is represented by Formula 6 below:

$$f(u) = \max(u,0) \qquad \text{(Formula 6)}$$

Formula 6 is a function obtained by setting u=0 to the part u<0 in the linear function with z=u. In the example shown in FIG. 32C, using Formula 6, the output from the node of j=1 is represented by the formula below:

$$z_1 = \max(w_{11} x_1 + w_{12} x_2 + w_{13} x_3 + w_{14} x_4 + b_1),0)$$

(Neural Network Learning)

If the function expressed by use of a neural network is defined as y(x:w), the function y(x:w) varies when a parameter w of the neural network is varied. Adjusting the function y(x:w) such that the neural network selects a more suitable parameter w with respect to the input x is referred to as neural network learning. It is assumed that a plurality of pairs of the input and an output of the function expressed by use of the neural network have been provided. If a desirable output for an input x is defined as d, the pairs of the input/output are given as {(x1,d1), (x2,d2), . . . , (xn,dn)}. The set of pairs each expressed as (x,d) is referred to as training data. Specifically, the set of pieces of waveform data (forward scattered light waveform data, side scattered light waveform data, fluorescence waveform data) shown in FIG. 3 is the training data shown in in FIG. 3.

The neural network learning means adjusting the weight w such that, with respect to any input/output pair (xn,dn), the output y(xn:w) of the neural network when given the input xn becomes close to the output dn as much as possible:

$$y(x_n{:}w) \cong d_n$$

An error function is a measure for closeness between the training data and the function expressed by use of the neural network. The error function is also referred to as a loss function. An error function E(w) used in the cell type analysis method according to the embodiment is represented by Formula 7 below. Formula 7 is referred to as cross entropy:

$$E(w) = -\sum_{n=1}^{N}\sum_{k=1}^{K} d_{nk}\log y_k(x_n{:}w) \qquad \text{(Formula 7)}$$

A method for calculating the cross entropy of Formula 7 will be described. In the output layer 50b of the neural network 50 used in the cell type analysis method according to the embodiment, i.e., in the last layer of the neural network, an activation function for classifying the input x into a finite number of classes in accordance with the contents, is used. The activation function is referred to as a softmax function, and represented by Formula 8 below. It is assumed that, in the output layer 50b, the nodes are arranged by the same number as the number of classes k. It is assumed that the total input u of each node k (k=1, . . . , K) of an output layer L is given as uk$^{(L)}$ from the outputs of the previous layer L−1. Accordingly, the output of the k-th node in the output layer is represented by Formula 8 below:

$$y_k \equiv z_k^{(L)} = \frac{\exp\left(u_k^{(L)}\right)}{\sum_{j=1}^{K}\exp\left(u_j^{(L)}\right)} \qquad \text{(Formula 8)}$$

Formula 8 is the softmax function. The sum of output y1, . . . , yK determined by Formula 8 is always 1.

When each class is expressed as C1, . . . , CK, output yK of node k in the output layer L (i.e., uk(L)) represents the probability at which the given input x belongs to class CK. See Formula 9 below. The input x is classified into a class in which the probability represented by Formula 9 becomes highest:

$$p(C_k \mid x) = y_k = z_k^{(L)} \qquad \text{(Formula 9)}$$

In the neural network learning, a function expressed by the neural network is considered as a model of the posterior probability of each class, and the likelihood of the weight w with respect to the training data is evaluated under such a probability model, and a weight w that maximizes the likelihood is selected.

It is assumed that the target output dn by the softmax function of Formula 8 is 1 only when the output is a correct class, and otherwise, the target output dn is 0. When the target output is expressed in a vector form dn=[dn1, . . . , dnK], if, for example, the correct class of input xn is C3, only target output dn3 becomes 1, and the other target outputs become 0. When coding is performed in this manner, the posterior distribution is represented by Formula 10 below:

$$p(d|x) = \prod_{k=1}^{K} p(C_k|x)^{d_k} \qquad \text{(Formula 10)}$$

Likelihood L(w) of the weight w with respect to the training data {(xn, dn)} (n=1, . . . , N) is represented by Formula 11 below. When the logarithm of the likelihood L(w) is taken and the sign is inverted, the error function of Formula 7 is derived:

$$L(w) = \prod_{n=1}^{N} p(d_n|x_n; w) = \qquad \text{(Formula 11)}$$
$$\prod_{n=1}^{N}\prod_{k=1}^{K} p(C_k|x_n)^{d_{nk}} = \prod_{n=1}^{N}\prod_{k=1}^{K} (y_k(x; w))^{d_{nk}}$$

Learning means minimizing the error function E(w) calculated on the basis of the training data, with respect to the parameter w of the neural network. In the cell type analysis method according to the embodiment, the error function E(w) is represented by Formula 7.

Minimizing the error function E(w) with respect to the parameter w has the same meaning as finding a local minimum point of the function E(w). The parameter w is a weight of connection between nodes. The local minimum point of the weight w is obtained by iterative calculation of repeatedly updating the parameter w from an arbitrary initial value used as a starting point. An example of such calculation is the gradient descent method.

In the gradient descent method, a vector represented by Formula 12 below is used:

$$\nabla E = \frac{\partial E}{\partial w} = \left[\frac{\partial E}{\partial w_1}, \dots, \frac{\partial E}{\partial w_M}\right]^T \qquad \text{(Formula 12)}$$

In the gradient descent method, a process of moving the value of the current parameter w in the negative gradient direction (i.e., −∇E) is repeated many times. When the current weight is w$^{(t)}$ and the weight after the moving is w$^{(t+1)}$, the arithmetic operation according to the gradient descent method is represented by Formula 13 below. The value t means the number of times the parameter w is moved:

$$w^{(t+1)} = w^{(t)} - \in \nabla E \qquad \text{(Formula 13)}$$

The symbol ∈ is a constant that determines the magnitude of the update amount of the parameter w, and is referred to as a learning coefficient. As a result of repetition of the arithmetic operation represented by Formula 13, an error function E(w$^{(t)}$) decreases in association with increase of the value t, and the parameter w reaches a local minimum point.

It should be noted that the arithmetic operation according to Formula 13 may be performed on all of the training data (n=1, . . . , N) or may be performed on only a part of the training data. The gradient descent method performed on only a part the training data is referred to as a stochastic gradient descent method. In the cell type analysis method according to the embodiment, the stochastic gradient descent method is used.

3. Construction of Deep Learning Model

Using Sysmex XN-1000, blood collected from a healthy individual was measured as a healthy blood sample, and XN CHECK Lv2 (control blood from Streck (having been subjected to processing such as fixation)) was measured as an unhealthy blood sample. As a fluorescence staining reagent, Fluorocell WDF manufactured by Sysmex Corporation was used. As a hemolytic agent, Lysercell WDF manufactured by Sysmex Corporation was used. For each cell contained in each biological sample, waveform data of forward scattered light, side scattered light, and side fluorescence was obtained at 1024 points at a 10 nanosecond interval from the measurement start of forward scattered light. With respect to the healthy blood sample, waveform data of cells in bloods collected from 8 healthy individuals was pooled in the form of digital data. With respect to the waveform data of each cell, classification of neutrophil (NEUT), lymphocyte (LYMPH), monocyte (MONO), eosinophil (EO), basophil (BASO), and immature granulocyte (IG) was manually performed, and each piece of waveform data was provided with annotation (labelling) of cell type. The time point at which the signal intensity of forward scattered light exceeded a threshold was defined as the measurement start time point, and the time points of obtainment of pieces of waveform data of forward scattered light, side scattered light, and side fluorescence were synchronized to each other, to generate training data. In addition, the control blood was provided with annotation "control blood-derived cell (CONT)". The training data was inputted to the deep learning algorithm so as to be learned.

With respect to blood cells of another healthy individual different from the healthy individual from whom the learned cell data was obtained, analysis waveform data was obtained by Sysmex XN-1000 in a manner similar to that for training data. Waveform data derived from the control blood was mixed, to create analysis data. With respect to this analysis data, blood cells derived from the healthy individual and blood cells derived from the control blood overlapped each other on the scattergram, and were not able to be discerned at all by a conventional method. This analysis data was inputted to the constructed deep learning algorithm and data of individual cell types was obtained.

FIG. 33 shows the result as a mix matrix. The horizontal axis represents the determination result by the constructed deep learning algorithm, and the vertical axis represents the determination result manually (reference method) obtained by a human. With respect to the determination result by the constructed deep learning algorithm, although slight confusion was observed between basophil and lymphocyte and between basophil and ghost, the determination result by the constructed deep learning algorithm exhibited a matching rate of 98.8% with the determination result by the reference method.

Figure 34A:
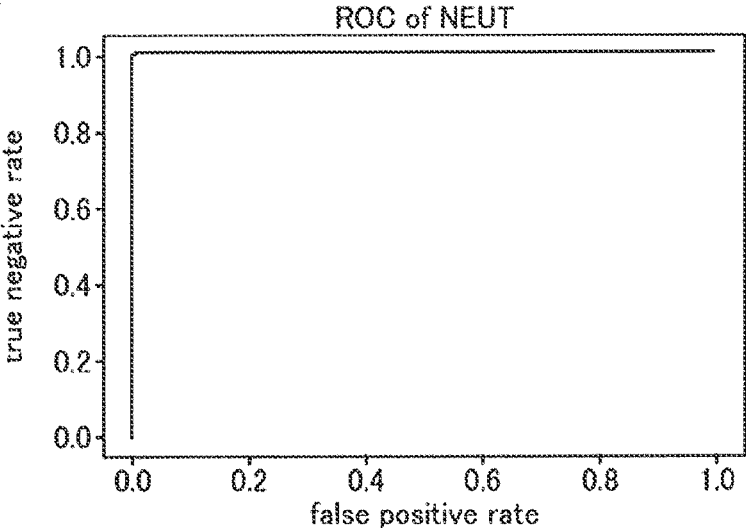
FIG. 34A shows an ROC curve of neutrophil.
Figure 34B:
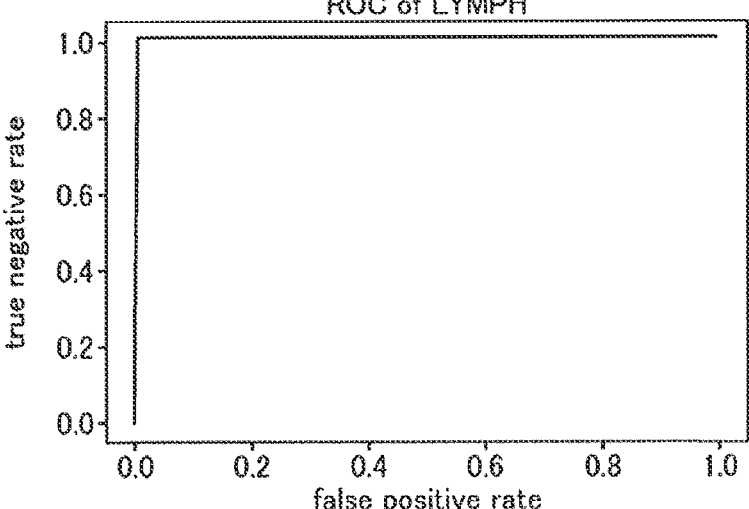
FIG. 34B shows an ROC curve of lymphocyte.
Figure 34C:
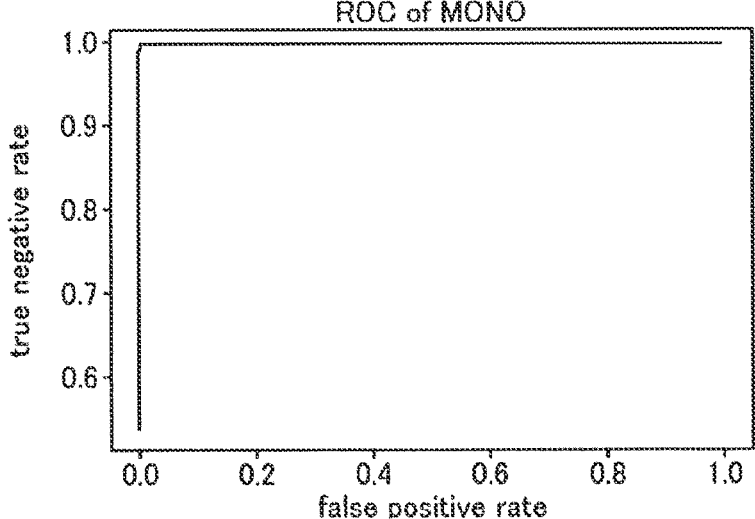
FIG. 34C shows an ROC curve of monocyte.
Figure 35A:
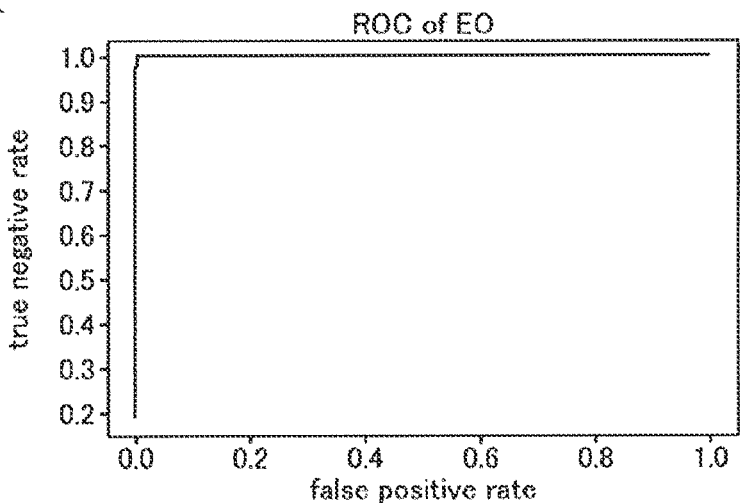
FIG. 35A shows an ROC curve of eosinophil.
Figure 35B:
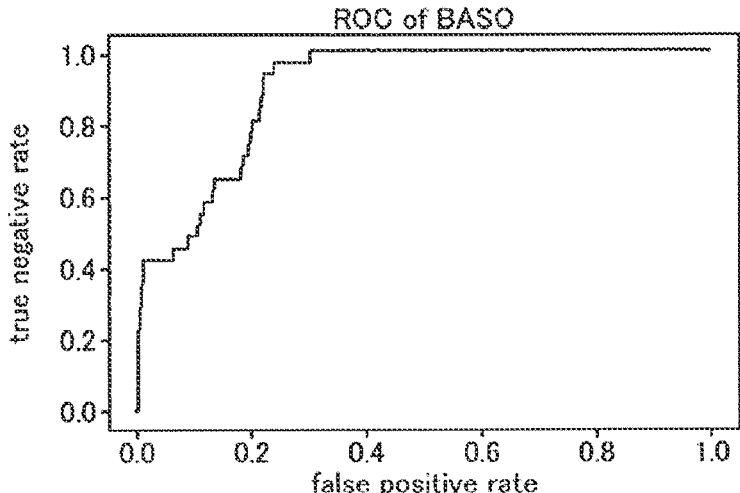
FIG. 35B shows an ROC curve of basophil.
Figure 35C:
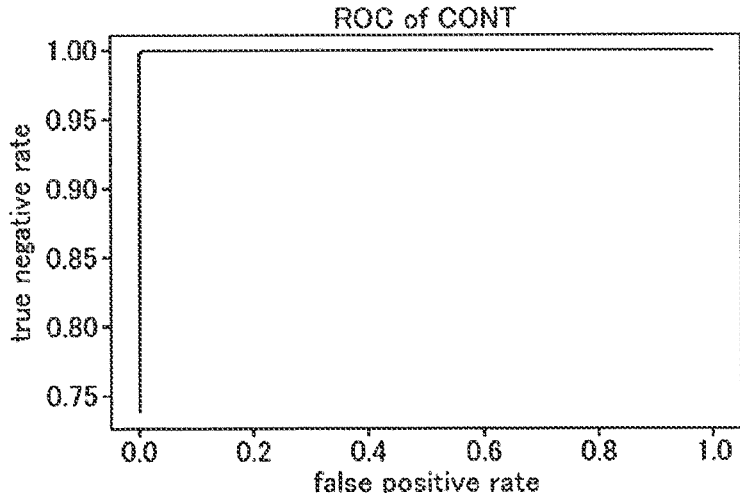
FIG. 35C shows an ROC curve of control blood (CONT)

Next, with respect to each cell type, ROC analysis was performed, and sensitivity and specificity were evaluated. FIG. 34A shows an ROC curve of neutrophil, FIG. 34B shows an ROC curve of lymphocyte, FIG. 34C shows an ROC curve of monocyte, FIG. 35A shows an ROC curve of eosinophil, FIG. 35B shows an ROC curve of basophil, and FIG. 35C shows an ROC curve of control blood (CONT). Sensitivity and specificity were, respectively, 99.5% and 99.6% for neutrophil, 99.4% and 99.5% for lymphocyte, 98.5% and 99.9% for monocyte, 97.9% and 99.8% for eosinophil, 71.0% and 81.4% for basophil, and 99.8% and 99.6% for control blood (CONT). These were good results.

From the results above, it has been clarified that cell types can be determined with high classification accuracy by using the deep learning algorithm on the basis of signals obtained from cells contained in a biological sample and on the basis of waveform data.

Further, in some cases where unhealthy blood cells such as of a control blood are mixed with healthy blood cells, it has been difficult for a conventional scattergram to determine the cell types. However, it has been shown that, when the deep learning algorithm of the present embodiment is used, even when unhealthy blood cells are mixed with healthy blood cells, these cells can be determined.

4. Analysis System Using Image Analyzer

An embodiment in which an image analyzer is used as a cell measuring apparatus will be described. A cell measuring apparatus 4000" being an image analyzer analyzes captured image data, thereby estimating the cell type of each cell of which an image has been captured.

The cell measuring apparatus 4000" is connected to the cell analyzer 1, as in the example of the system configuration shown in FIG. 6 to FIG. 9. The cell measuring apparatus 4000" is connected to the cell analyzer 1 via the intra-network 3, for example. The cell measuring apparatus 4000" is connected to the cell analyzer 1 via the interface part 4, for example. The cell measuring apparatus 4000" installed in each of the test-related facilities 2 may be connected to the cell analyzer 1 via the Internet 6.

Figure 36:
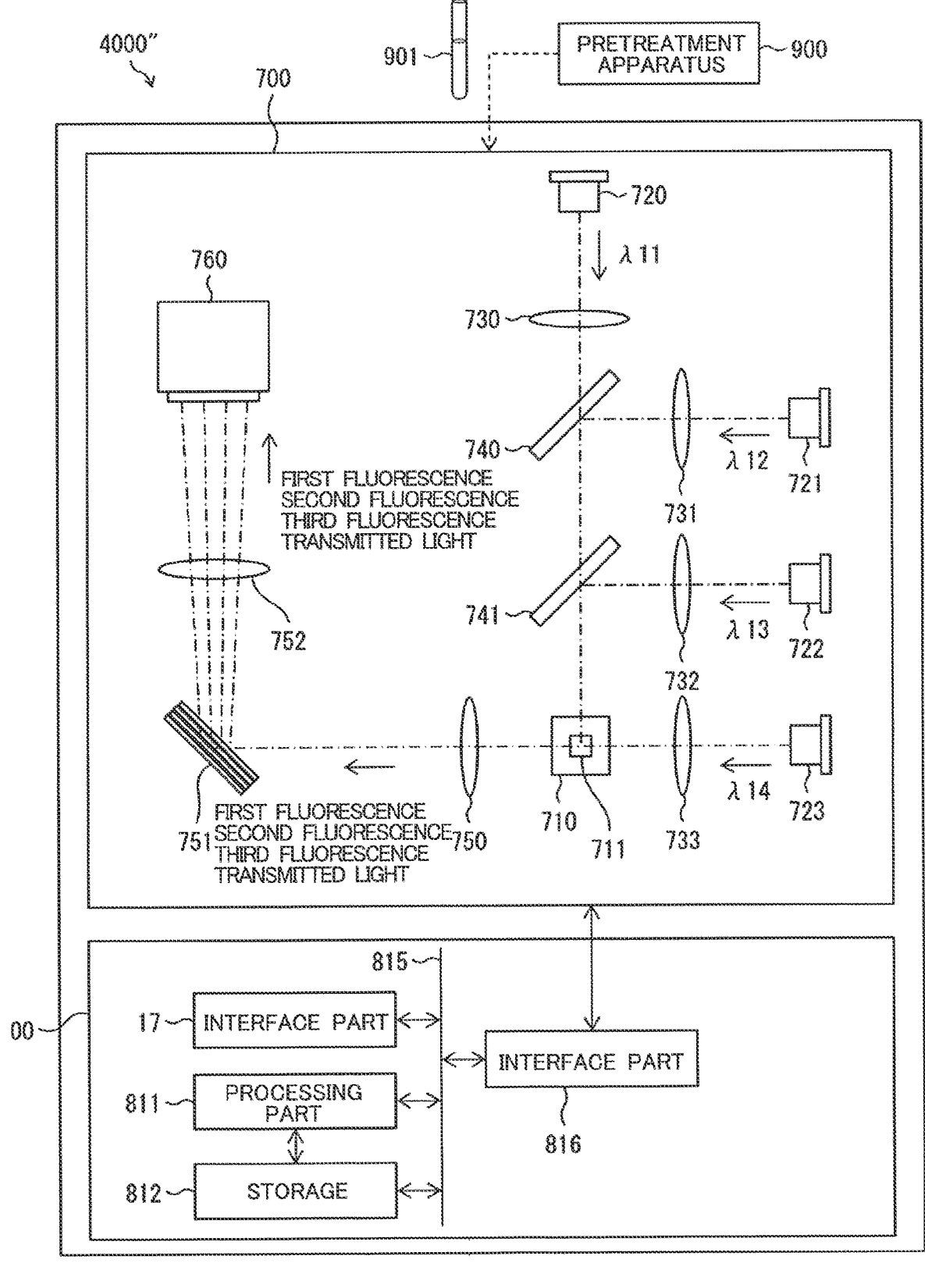
FIG. 36 shows a configuration example of a cell measuring apparatus as an image analyzer.

FIG. 36 shows an example of a configuration of the cell measuring apparatus 4000". The cell measuring apparatus 4000" shown in FIG. 36 includes a measurement unit 700 and a processing unit 800, measures a sample 901 prepared through pretreatment by a pretreatment apparatus 900, and performs analysis.

The measurement unit 700 includes a flow cell 710, light sources 720 to 723, condenser lenses 730 to 733, dichroic mirrors 740 to 741, a condenser lens 750, an optical unit 751, a condenser lens 752, and an imaging part 760. A sample 901 is caused to flow in a flow path 711 of the flow cell 710.

The light sources 720 to 723 each apply light to the sample 901 flowing in the flow cell 710. The light sources 720 to 723 are each implemented by a semiconductor laser light source, for example. Lights having wavelengths λ11 to 214 are emitted from the light sources 720 to 723, respectively. The condenser lens 730 to 733 condense lights having the wavelengths λ11 to λ14 emitted from the light sources 720 to 723, respectively. The dichroic mirror 740 allows light having the wavelength 211 to pass therethrough, and refracts light having the wavelength λ12. The dichroic mirror 741 allows lights having the wavelength λ11 and λ12 to pass therethrough, and refracts light having the wavelength λ13. In this manner, lights having the wavelengths λ11 to λ14 are applied to the sample 901 flowing in the flow path 711 of the flow cell 710. The number of semiconductor laser light sources of the measurement unit 700 is not particularly limited as long as the number is 1 or greater. The number of semiconductor laser light sources can be selected from 1, 2, 3, 4, 5, or 6, for example.

In a case where the sample 901 flowing in the flow cell 710 has been stained by a fluorescent dye, when lights having the wavelengths $\lambda 11$ to $\lambda 13$ are applied to the sample 901, fluorescence is generated from the fluorescent dye staining each cell. For example, fluorescences having wavelengths $\lambda 21$, $\lambda 22$, $\lambda 23$ respectively corresponding to the wavelengths $\lambda 11$, 212, 213 are generated. When light having the wavelength $\lambda 14$ is applied to the sample 901 flowing in the flow cell 710, this light passes through each cell. The transmitted light having the wavelength $\lambda 14$ and having passed through the cell is used in generation of a bright field image.

The condenser lens 750 condenses the fluorescences generated from the sample 901 flowing in the flow path 711 of the flow cell 710, and the transmitted light having passed through the sample 901 flowing in the flow path 711 of the flow cell 710. The optical unit 751 has a configuration in which four dichroic mirrors are combined. The four dichroic mirrors of the optical unit 751 reflect the fluorescences and the transmitted light at angles slightly different from each other, to be separated on the light receiving surface of the imaging part 760. The condenser lens 752 condenses the fluorescences and the transmitted light.

The imaging part 760 is implemented by a TDI (Time Delay Integration) camera. The imaging part 760 can capture images of the fluorescences and the transmitted light and output, to the processing unit 800, a fluorescence image corresponding to the fluorescences and a bright field image corresponding to the transmitted light, as imaging signals.

The processing unit 800 includes a processing part 811, a storage 812, an interface part 816, an interface part 817, and a bus 815, as a hardware configuration. The processing part 811, the storage 812, the interface part 816, and the interface part 817 are connected to the bus 815. Image data (e.g., fluorescence image, bright field image) formed by imaging signals captured by the imaging part 760 of the measurement unit 700 is stored in the storage 812 via the interface part 816. The processing part 811 performs a process of reading out image data from the storage 812, and transmitting the image data to the cell analyzer 1 via the interface part 817. The interface part 817 is, for example, an interface for connecting the processing part 811 to the USB interface, the intra-network 3, or the Internet 6. The processing part 811 executes processes on the analysis result transmitted from the cell analyzer 1.

The cell analyzer 1 can obtain image data from a plurality of cell measuring apparatuses 4000" in the same test-related facility 2. In addition, the cell analyzer 1 can obtain image data from a plurality of cell measuring apparatuses 4000" installed in each of different test-related facilities 2. The image data is obtained for each cell in a biological sample tested in each of the test-related facilities 2. Therefore, if the image data is not appropriately managed, mix-up of data may occur between patients, between biological samples, or between test-related facilities 2, for example. Therefore, the processing unit 200 transmits, to the cell analyzer 1, image data and identification information in association with each other. Examples of the identification information include: (1) identification information of a biological sample corresponding to the imaging signal; (2) identification information of a cell corresponding to the imaging signal; (3) identification information of a patient corresponding to the imaging signal; (4) identification information of a test corresponding to the imaging signal; (5) identification information of an apparatus by which the imaging signal has been measured; and (6) identification information of a test-related facility 2 where the imaging signal has been measured. When the cell measuring apparatus 4000" receives a test order from, for example, an LIS or the processing unit 200, the cell measuring apparatus 4000" can obtain at least one of the above identification information (1) to (6) or a combination thereof from the LIS or the processing unit 200. For example, at least one of (1) to (6) shown as examples is transmitted to the cell analyzer 1 in association with the image data. A plurality of combinations of (1) to (6) shown as examples may be transmitted to the cell analyzer 1 in association with the image data.

5. Analysis System Using Image Analyzer

An embodiment in which an imaging apparatus is used as a cell measuring apparatus will be described. A cell analyzer 4000''' being an imaging apparatus analyzes captured image data, thereby estimating the cell type of each cell of which an image has been captured.

The cell measuring apparatus 4000''' is connected to the cell analyzer 1 by the example of the system configuration shown in FIG. 6 to FIG. 9. The cell measuring apparatus 4000''' is connected to the cell analyzer 1 via the intra-network 3, for example. The cell measuring apparatus 4000''' is connected to the cell analyzer 1 via the interface part 4, for example. The cell measuring apparatus 4000''' installed in each of the test-related facilities 2 may be connected to the cell analyzer 1 via the Internet 6.

Figure 37:
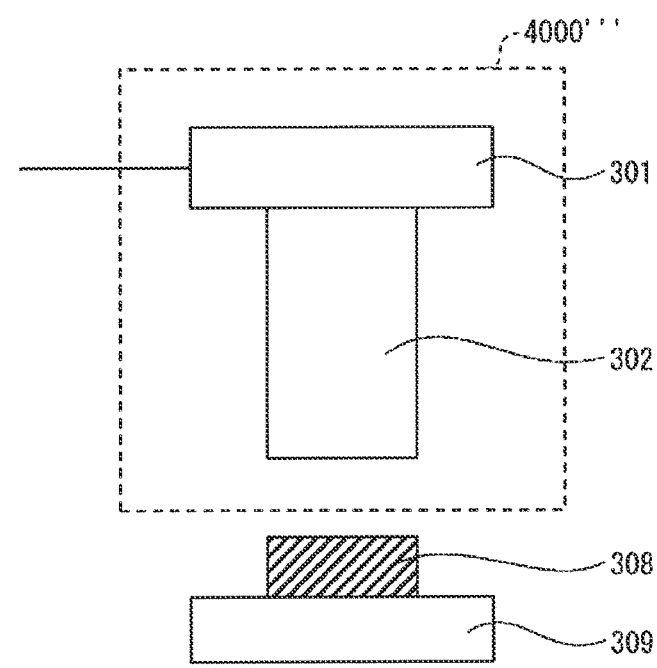
FIG. 37 shows a configuration example of a cell measuring apparatus as an imaging apparatus.

FIG. 37 shows a configuration example of the cell measuring apparatus 4000'''. The cell measuring apparatus 4000''' shown in FIG. 37 includes an image pickup device 301 and a fluorescence microscope 302, and captures a bright field image of a training preparation 308 set on a stage 309. The training preparation 308 has been subjected to staining. The cell analyzer 1 obtains the training image 70 captured by the cell measuring apparatus 4000'''. The cell analyzer 1 performs learning of the deep learning algorithm on the basis of the obtained training image 70. The cell analyzer 1 obtains an analysis target image 78 captured by the cell measuring apparatus 4000'''. The cell analyzer 1 analyzes the obtained analysis target image 78 on the basis of the deep learning algorithm.

As the cell measuring apparatus 4000''', a known light microscope, a known virtual slide scanner, or the like that has a function of capturing a preparation can be used.

The cell analyzer 1 can obtain an analysis target image 78 from a plurality of cell measuring apparatuses 4000''' in the same test-related facility 2. In addition, the cell analyzer 1 can obtain an analysis target image 78 from a plurality of cell measuring apparatuses 4000" installed in each of different test-related facilities 2. The analysis target image 78 is obtained for each cell in a biological sample tested in each of the test-related facilities 2. Therefore, if the analysis target image 78 is not appropriately managed, mix-up of data may occur between patients, between biological samples, or between test-related facilities 2, for example. Therefore, the cell measuring apparatus 4000" transmits, to the cell analyzer 1, the analysis target image 78 and identification information in association with each other. Examples of the identification information include: (1) identification information of a biological sample corresponding to the imaging signal; (2) identification information of a cell corresponding to the imaging signal; (3) identification information of a patient corresponding to the imaging signal; (4) identification information of a test corresponding to the imaging signal; (5) identification information of an apparatus by which the imaging signal has been measured; and (6) identification information of a facility where the imaging signal has been measured. When the cell measuring apparatus 4000''' receives a test order from, for example, an LSI or a user input, the cell measuring apparatus 4000''' can obtain at least one of the above identification information (1) to (6) or a combination thereof from the LIS or the user input. For example, at least one of (1) to (6) shown as examples is transmitted to the cell analyzer 1 in association with the imaging signal. A plurality of combinations of (1) to (6) shown as examples may be transmitted to the cell analyzer 1 in association with the imaging signal.

<Generation of Training Data>

Hereinafter, an example of generating training data in the present embodiment will be described.

Preferably, training images to be used for training the deep learning algorithm are captured in RGB colors, CMY colors, or the like. Preferably, as for a color image, the darkness/paleness or brightness of each of primary colors, such as red, green, and blue, or cyan, magenta, and yellow, is expressed by a 24 bit value (8 bits×3 colors). It is sufficient that each training image includes at least one hue, and the darkness/paleness or brightness of the hue, but more preferably, includes at least two hues and the darkness/paleness or brightness of each hue. Information including hue and the darkness/paleness or brightness of the hue is also referred to as tone.

Figure 38:
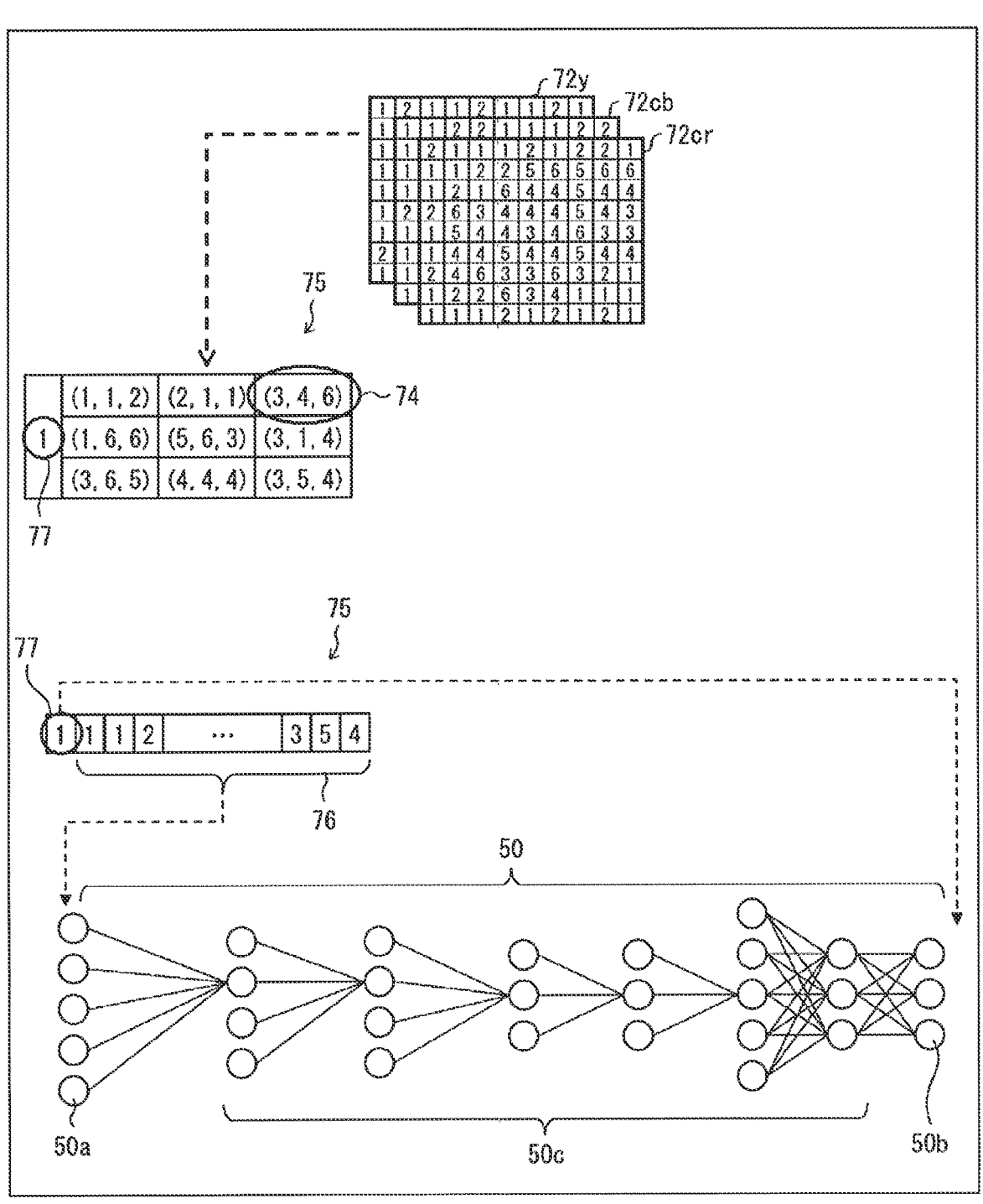
FIG. 38 shows an example of a generation method for training data.

Information of tone of each pixel in the training image is converted from, for example, RGB colors into a format that includes information of brightness and information of hue. Examples of the format that includes information of brightness and information of hue include YUV (YCbCr, YPbPr, YIQ, etc.). Here, an example of conversion to a YCbCr format will be described. A training image captured in RGB colors is converted into image data based on brightness, image data based on a first hue (e.g., bluish color), and image data based on a second hue (e.g., reddish color). Conversion from RGB to YCbCr can be performed by a known method. For example, conversion from RGB to YCbCr can be performed according to the international standard ITU-R BT.601. The image data based on the brightness, the image data based on the first hue, and the image data based on the second hue can be expressed as matrix data of gradation values as shown in FIG. 38 (hereinafter, also referred to as tone matrix data 72$y$, 72$cb$, 72$cr$). The image data based on the brightness, the image data based on the first hue, and the image data based on the second hue can be expressed in 256 gradations consisting of 0 to 255 gradations, for example. Here, instead of the brightness, the first hue, and the second hue, the training image may be converted into the three primary colors of red R, green G, and blue B, or the three primary colors of pigment of cyan C, magenta M, and yellow Y.

Next, on the basis of the tone matrix data 72$y$, 72$cb$, 72$cr$, for each pixel, tone vector data 74 is generated by combining three gradation values of the brightness 72$y$, the first hue 72$cb$, and the second hue 72$cr$.

Next, for example, assuming that an image of a segmented neutrophil has been captured in the training image, each piece of tone vector data 74 generated from the training image is provided with "1" as a label value 77 indicating segmented neutrophil, whereby training data 75 is obtained. In FIG. 38, for convenience, the training data 75 is expressed by 3 pixels×3 pixels. However, in actuality, tone vector data exists by the number of pixels with which the training image has been captured.

FIG. 39 shows an example of the label value 77. As for the label value, a label value 77 that is different according to the cell type and the presence or absence of a feature of each cell is provided.

<Outline of Deep Learning>

With reference FIG. 38 used as an example, an outline of training of the neural network will be described. The neural network 50 is preferably a convolutional neural network. The number of nodes of the input layer 50$a$ in the neural network 50 corresponds to the product of the number of pixels in the training data 75 to be inputted, and the number (e.g., in the above example, three, i.e., the brightness 72$y$, the first hue 72$cb$, and the second hue 72$cr$) of brightnesses and hues included in the image. The pieces of tone vector data 74 are inputted, as a set 72 thereof, to the input layer 50$a$ of the neural network 50. The neural network 50 is trained by using, for the output layer 50$b$ of the neural network, the label value 77 of each pixel of the training data 75.

On the basis of the training data 75, the neural network 50 extracts feature quantities with respect to morphological cell types and features of the cell. The output layer 50$b$ of the neural network outputs a result reflecting these feature quantities.

The reference character 50$c$ in FIG. 38 represents the middle layer.

The deep learning algorithm 60 having the thus trained neural network 60 is used as a discriminator for identifying which of a plurality of cell types that belong to a predetermined cell group and that are morphologically classified the analysis target cell corresponds to.

<Image Analysis Method>

Figure 40:
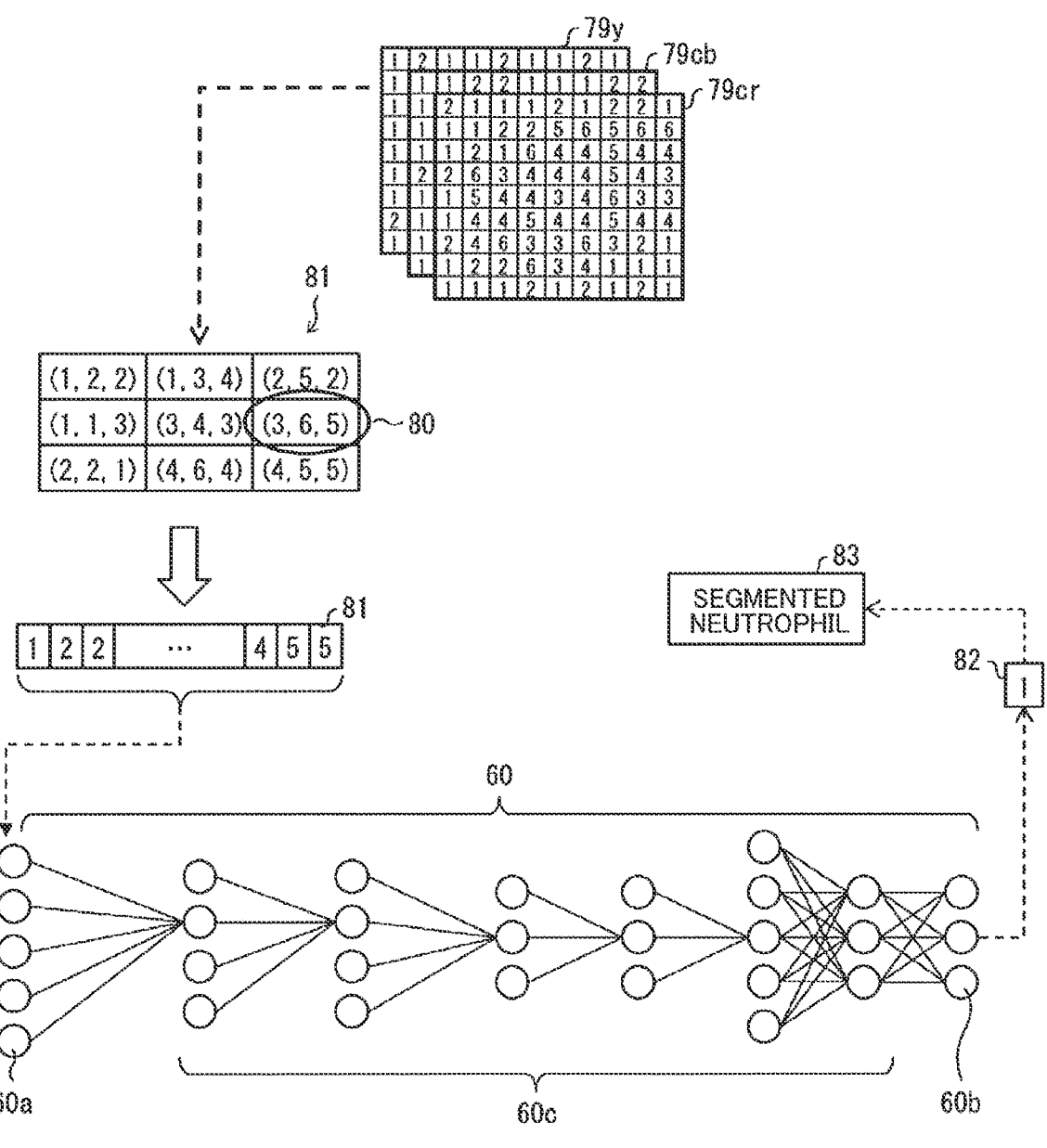
FIG. 40 shows an example of an image analysis method.

FIG. 40 shows an example of an image analysis method. In the image analysis method, analysis data 81 is generated from an analysis image obtained by capturing an image of an analysis target cell. The analysis image is an image obtained by capturing an image of the analysis target cell.

For example, preferably, in the present embodiment, image capturing by an imaging device is performed in RGB colors, CMY colors, and the like. Preferably, as for a color image, the darkness/paleness or brightness of each of primary colors, such as red, green, and blue, or cyan, magenta, and yellow, is expressed by a 24 bit value (8 bits×3 colors). It is sufficient that the analysis image includes at least one hue, and the darkness/paleness or brightness of the hue, but more preferably, includes at least two hues and the darkness/paleness or brightness of each hue. Information including hue and the darkness/paleness or brightness of the hue is also referred to as tone.

For example, conversion from RGB colors into a format that includes information of brightness and information of hue is performed. Examples of the format that includes information of brightness and information of hue include YUV (YCbCr, YPbPr, YIQ, etc.). Here, an example of conversion to a YCbCr format will be described. An analysis image in RGB colors is converted into image data based on brightness, image data based on a first hue (e.g., bluish color), and image data based on a second hue (e.g., reddish color). Conversion from RGB to YCbCr can be performed by a known method. For example, conversion from RGB to YCbCr can be performed according to the international standard ITU-R BT.601. The pieces of image data respectively corresponding to the brightness, the first hue, and the second hue can be expressed as matrix data of gradation values as shown in FIG. 40 (hereinafter, also referred to as tone matrix data 79$y$, 79$cb$, 79$cr$). The brightness, the first hue, and the second hue 79$cr$ can be expressed in 256 gradations consisting of 0 to 255 gradations. Here, instead of the brightness, the first hue, and the second hue, the analysis image may be converted into the three primary colors of red R, green G, and blue B, or the three primary colors of pigment of cyan C, magenta M, and yellow Y.

Next, on the basis of the tone matrix 79*y*, 79*cb*, 79*cr*, for each pixel, tone vector data 80 is generated by combining three gradation values of the brightness 79*y*, the first hue 79*cb*, and the second hue 79*cr*. A set of tone vector data 80 generated from a single analysis image is generated as the analysis data 81.

Preferably, the generation of the analysis data 81 and the generation of the training data 75 are performed at least under the same image capturing condition and the same generation condition of the vector data that is inputted from each image to the neural network.

The analysis data 81 is inputted to the input layer 60*a* of the neural network 60 forming the trained deep learning algorithm 60. The deep learning algorithm extracts feature quantities from the analysis data 81, and outputs the result from the output layer 60*b* of the neural network 60. The value outputted from the output layer 60*b* is the probability at which the analysis target cell included in the analysis image belongs to each of morphological cell classifications and features inputted as training data.

The analysis target cell included in the analysis image is determined to belong to the morphological classification that has the highest value among the probabilities, and a label value associated with the morphological cell type or the feature of the cell is outputted. The label value itself or data obtained by replacing the label value with information (e.g., a term) that indicates the morphological cell type or the presence or absence of the feature of the cell, is outputted as the analysis result 83 regarding the morphology of the cell. In FIG. 40, on the basis of the analysis data 81, a label value "1" is outputted, by the discriminator, as a label value 82 that has the highest possibility, and character data of "segmented neutrophil" corresponding to this label value is outputted as the analysis result 83 regarding the morphology of the cell.

The reference character 60*c* in FIG. 40 represents the middle layer.

5. Other Embodiments

Although the outlines and specific embodiments of the present invention have been described, the present invention is not limited to the outlines and embodiments described above.

In the above embodiments, the function blocks of the training data generation part 101, the training data input part 102, the algorithm update part 103, an analysis data generation part 201, an analysis data input part 202, and an analysis part 203 are executed in a single processor 11 and a single parallel-processing processor 12. However, these function blocks need not necessarily be executed in a single processor and a single parallel-processing processor, and may be executed in a distributed manner by a plurality of processors and a plurality of parallel-processing processors.

In the above embodiments, a program for performing the process of steps described with reference to FIG. 31 is stored in advance in the storage 13. Instead of this, the program may be installed to the storage 13 from the computer-readable non-transitory tangible storage medium 98 such as a DVD-ROM or a USB memory, for example. Alternatively, the cell analyzer 1 may be connected to the communication network 99, and the program may be downloaded and installed via the communication network 99 from, for example, an external server (not shown).

FIG. 41 shows an embodiment of the analysis result. FIG. 41 shows cell types of cells, contained in a biological sample measured by flow cytometry, that are provided with the label values shown in FIG. 4, and the number of cells of each cell type. Instead of the display of the number of cells, or together with the display of the number of cells, the proportion (e.g., %) of each cell type with respect to the total number of cells that have been counted, may be outputted. The count of the number of cells can be obtained by counting the number of label values (the number of the same label values) that correspond to each cell type that has been outputted. In the output result, a warning indicating that abnormal cells are contained in the biological sample may be outputted. FIG. 41 shows an example in which an exclamation mark is provided as a warning in the column of the abnormal cell, but such a warning is not limited thereto. Further, the distribution of each cell type may be plotted as a scattergram, and the scattergram may be outputted. When the scattergram is outputted, for example, the highest values at the time of obtainment of signal intensities may be plotted, with the vertical axis representing the side fluorescence intensity and the horizontal axis representing the side scattered light intensity, for example.

What is claimed is:

1. A cell analysis system to classify types of cells in a biological sample, comprising:

a cell measuring apparatus including (i) a flow cell through which cells in a measurement sample flows, (ii) a light source configured to irradiate the cells flowing through the flow cell for optical interrogation and (iii) a light detector configured to sense light from a respective one of optically interrogated cells, wherein the light sensed by the light detector carries an analog waveform signal indicative of a morphological feature of a respective one of cells optically sensed by the light detector, and wherein the cell measuring apparatus is further configured to sample the analog waveform signal at a predetermined sampling rate to convert the analog waveform signal into a matrix of cell feature values, which is a digital representation of the morphological feature of the respective one of the cells optically sensed by the light detector; and a cell analyzer including a host processor and a parallel processing processor, the parallel processing processor including a plurality of arithmetic units each operable to perform a calculation on an assigned subset of a matrix operation, one of the host processor or the parallel processing processor being programmed with an artificial intelligence (AI) algorithm that has a neural network structure trained in advance with training data for classification of types of cells, the training data obtained from cells of already determined types, the host processor being further programmed to perform a cell type identification process on respective target cells of unknown types, wherein the cell type identification process comprises:

receiving, from the cell measuring apparatus, the matrix of cell feature data representative of one target cell among the target cells of unknown types;

running the AI algorithm on the received matrix of cell feature values for calculation of a matrix operation to determine a type of said one target cell;

dividing the matrix operation into subsets of calculations and assigning the subsets of calculations to at least some of the arithmetic units of the parallel processing processor for parallel processing of the matrix operation; and analyzing a result of the matrix operation performed by the parallel processing processor to determine the type of said one target cell.

2. The cell analysis system according to claim 1, further comprising a data transfer network operable to transfer the matrix of cell feature values from the cell measuring apparatus to the cell analyzer over the data transfer network.

3. The cell analysis system according to claim 1, wherein the at least one light detector is configured to sense non-fluorescent light or fluorescent light from the optically interrogated cells.

4. The cell analysis system according to claim 3, wherein the at least one light detector is configured to sense a forward scattered light, a side scattered light or a side fluorescence light from the optically interrogated cells in the biological sample.

5. The cell analysis system according to claim 1, wherein the cell measuring apparatus is operable to add identification information to the matrix of cell feature values, wherein the identification information includes any of: (1) an identification of the biological sample; (2) an identification of the optically interrogated cells; (3) an identification of a patient from which the biological sample is obtained; (4) an identification of a test performed on the cells in the biological sample; (5) an identification of the cell measuring apparatus; and (6) an identification of a test-related facility where the cell measuring apparatus is situated.

6. The cell analysis system according to claim 5, wherein the host processor is programmed to output the determined type of said one target cell with the identification information.

7. The cell analysis system according to claim 1, wherein the host processor is programmed to apply a digital filter to the received matrix of cell feature values to calculate cell features represented by the received matrix of cell feature values.

8. The cell analysis system according to claim 1, wherein said one target cell is a white blood cell, and the cell analyzer is programmed to determine a subtype of the white blood cell.

9. A cell analysis method for classify types of cells in a biological sample, comprising:

irradiating the cells flowing through a flow cell for optical interrogation;

sensing by a light detector light from a respective one of optically interrogated cells, wherein the light sensed by the light detector carries an analog waveform signal indicative of a morphological feature of a respective one of cells optically sensed by the light detector;

sampling the analog waveform signal at a predetermined sampling rate to convert the analog waveform signal into a matrix of cell feature values, which is a digital representation of the morphological feature of the respective one of the cells optically sensed by the light detector; and performing a cell type identification process on respective target cells of unknown types, wherein the cell type identification process comprises:

receiving the matrix of cell feature values representative of one target cell among the target cells of unknown types;

running an artificial intelligence (AI) algorithm on the received matrix of cell feature values for calculation of a matrix operation to determine a type of said one target cell, wherein the AI algorithm has a neural network structure trained in advance with training data for classification types of cells, and the training data is obtained from cells of already determined types;

dividing the matrix operation into subsets of calculations and assigning the subsets of calculations to arithmetic units of a parallel processing processor for parallel processing of the matrix operation; and analyzing a result of the matrix operation performed by the parallel processing processor to determine the type of said one target cell.

10. The cell analysis method according to claim 9, wherein receiving the matrix of cell feature values representative of one target cell comprises receiving the matrix of cell feature values representative of said one target cell through a data transfer network.

11. The cell analysis method according to claim 9, wherein sensing light from optically interrogated cells comprises sensing non-fluorescent light or fluorescent light from the optically interrogated cells.

12. The cell analysis method according to claim 9, further comprising adding identification information to the matrix of cell feature values, wherein the identification information includes any of: (1) an identification of the biological sample; (2) an identification of the optically interrogated cells; (3) an identification of a patient from which the biological sample is obtained; (4) an identification of a test performed on the cells in the biological sample; (5) an identification of the cell measuring apparatus; and (6) an identification of a test-related facility where the cell measuring apparatus is situated.

13. The cell analysis method according to claim 11, wherein sensing light from optically interrogated cells comprises sensing a forward scattered light, a side scattered light or a side fluorescence light from optically interrogated cells.

14. The cell analysis method according to claim 9, further comprising applying a digital filter to the received matrix of cell feature values to calculate cell features represented by the set of matrix of cell feature values.

15. The cell analysis method according to claim 12, further comprising outputting the determined type of said one target cell with the identification information.

16. The cell analysis method according to claim 9, wherein said one target cell is a white blood cell, and determining the type of said one target cell comprising determining a subtype of the white blood cell.

* * * * *